United States Patent
Victor et al.

(10) Patent No.: US 10,962,302 B2
(45) Date of Patent: *Mar. 30, 2021

(54) HEAT EXCHANGERS IN A PETROCHEMICAL PLANT OR REFINERY

(71) Applicant: UOP LLC, Des Plaines, IL (US)

(72) Inventors: Sanford Allan Victor, Buffalo Grove, IL (US); Phillip F. Daly, Palatine, IL (US); Ian G. Horn, Streamwood, IL (US)

(73) Assignee: UOP LLC, Des Plaines, IL (US)

( * ) Notice: Subject to any disclaimer, the term of this patent is extended or adjusted under 35 U.S.C. 154(b) by 354 days.

This patent is subject to a terminal disclaimer.

(21) Appl. No.: 15/937,624

(22) Filed: Mar. 27, 2018

(65) Prior Publication Data

US 2019/0101336 A1 Apr. 4, 2019

Related U.S. Application Data

(60) Provisional application No. 62/477,528, filed on Mar. 28, 2017.

(51) Int. Cl.
*F28D 15/06* (2006.01)
*C10G 45/72* (2006.01)
(Continued)

(52) U.S. Cl.
CPC ............ *F28D 15/06* (2013.01); *C10G 11/187* (2013.01); *C10G 35/24* (2013.01); *C10G 45/72* (2013.01);
(Continued)

(58) Field of Classification Search
CPC ............... B01J 8/26; B01J 2208/00026; F28F 2009/226; F28F 27/006; F28F 2265/06;
(Continued)

(56) References Cited

U.S. PATENT DOCUMENTS

| 4,159,239 A | 6/1979 | Schwartz | 208/113 |
| 4,267,458 A | 5/1981 | Uram | 290/40 R |

(Continued)

FOREIGN PATENT DOCUMENTS

| EP | 0181744 A1 | 5/1986 | B65G 53/66 |
| EP | 2746884 A1 | 6/2014 | G05B 23/02 |

(Continued)

OTHER PUBLICATIONS

Bespalov A. V. et al., Control systems of chemical and technological processes, pp. 508-509 (2001) (Russian).

(Continued)

*Primary Examiner* — Shogo Sasaki

(57) ABSTRACT

A plant or refinery may include equipment such as reactors, heaters, heat exchangers, regenerators, separators, or the like. Types of heat exchangers include shell and tube, plate, plate and shell, plate fin, air cooled, wetted-surface air cooled, or the like. Operating methods may impact deterioration in equipment condition, prolong equipment life, extend production operating time, or provide other benefits. Mechanical or digital sensors may be used for monitoring equipment, and sensor data may be programmatically analyzed to identify developing problems. For example, sensors may be used in conjunction with one or more system components to detect and correct maldistribution, cross-leakage, strain, pre-leakage, thermal stresses, fouling, vibration, problems in liquid lifting, conditions that can affect air-cooled exchangers, conditions that can affect a wetted-surface air-cooled heat exchanger, or the like. An operating condition or mode may be adjusted to prolong equipment life or avoid equipment failure.

11 Claims, 25 Drawing Sheets

(51) Int. Cl.
*C10G 11/18* (2006.01)
*C10G 35/24* (2006.01)
*F28D 21/00* (2006.01)
*F28F 19/00* (2006.01)
*F28D 7/16* (2006.01)
*G05B 13/04* (2006.01)

(52) U.S. Cl.
CPC ............ *F28D 21/00* (2013.01); *F28F 19/00* (2013.01); *F28D 7/16* (2013.01); *F28D 2021/0059* (2013.01); *G05B 13/042* (2013.01)

(58) Field of Classification Search
CPC .. F28F 2265/00; F28F 2200/00; F28F 9/0239; F28F 9/0278; F28F 9/22; F28F 19/00; F28F 27/00; G05B 15/02; F28D 7/1607; F28D 9/0006; F28D 9/0068; F28D 2021/0022; F28D 2021/0059; C10G 11/187; C10G 35/24; C10G 45/72
See application file for complete search history.

(56) References Cited

U.S. PATENT DOCUMENTS

| | | | |
|---|---|---|---|
| 4,284,494 A | 8/1981 | Bartholic | 208/164 |
| 4,362,614 A | 12/1982 | Asdigian | 208/235 |
| 4,380,146 A | 4/1983 | Yannone | 60/39.281 |
| 4,385,985 A | 5/1983 | Gross | 208/113 |
| 4,411,773 A | 10/1983 | Gross | 208/159 |
| 4,709,546 A | 12/1987 | Weiler | 415/116 |
| 4,775,460 A | 10/1988 | Reno | |
| 4,795,545 A | 1/1989 | Schmidt | |
| 4,902,469 A | 2/1990 | Watson | 376/216 |
| 5,077,252 A | 12/1991 | Owen et al. | 502/43 |
| 5,227,121 A | 7/1993 | Scarola | 340/525 |
| 5,582,684 A | 12/1996 | Holmqvist et al. | 162/49 |
| 5,605,435 A | 2/1997 | Haugen | 137/514 |
| 5,616,214 A | 4/1997 | Leclerc | 162/49 |
| 5,642,296 A | 6/1997 | Saxena | 216/84 |
| 5,666,297 A | 9/1997 | Britt et al. | 364/578 |
| 5,817,517 A | 10/1998 | Perry et al. | 436/55 |
| 6,038,540 A | 3/2000 | Krist et al. | 705/8 |
| 6,081,230 A | 6/2000 | Hoshino | 342/357.32 |
| 6,230,486 B1 | 5/2001 | Yasui | 123/674 |
| 6,266,605 B1 | 7/2001 | Yasui | 60/276 |
| 6,271,845 B1 | 8/2001 | Richardson | 715/764 |
| 6,392,114 B1 | 5/2002 | Shields et al. | 582/719 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 6,982,032 B2 | 1/2006 | Shaffer et al. | 210/101 |
| 6,983,227 B1 | 1/2006 | Thalhammer-Reyero | |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,836,941 B2 * | 11/2010 | Song | F28G 7/00 165/95 |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,128,808 B2 | 3/2012 | Hassan et al. | 208/209 |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,354,081 B2 | 1/2013 | Wheat et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,630,962 B2 | 1/2014 | Maeda | 706/12 |
| 8,644,192 B2 | 2/2014 | Budampati et al. | 370/255 |
| 8,811,231 B2 | 8/2014 | Budampati et al. | 370/255 |
| 8,815,152 B2 | 8/2014 | Burgess et al. | |
| 8,923,882 B2 | 12/2014 | Gandhi et al. | 455/455 |
| 8,926,737 B2 | 1/2015 | Chatterjee et al. | |
| 9,053,260 B2 | 6/2015 | Romatier et al. | |
| 9,134,717 B2 | 9/2015 | Trnka | |
| 9,166,667 B2 | 10/2015 | Thanikachalam | |
| 9,176,498 B2 | 11/2015 | Baramov | |
| 9,354,631 B2 | 5/2016 | Mohideen et al. | |
| 9,571,919 B2 | 2/2017 | Zhang et al. | |
| 9,580,341 B1 | 2/2017 | Brown et al. | C02F 3/006 |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0036052 A1 | 2/2003 | Delwiche et al. | 435/4 |
| 2003/0105775 A1 | 6/2003 | Shimada | |
| 2003/0147351 A1 | 8/2003 | Greenlee | 370/232 |
| 2003/0223918 A1 | 12/2003 | Cammy | 422/144 |
| 2004/0079392 A1 | 4/2004 | Kuechler | 134/22.19 |
| 2004/0099572 A1 | 5/2004 | Evans | 208/113 |
| 2004/0109788 A1 * | 6/2004 | Li | C02F 1/006 422/3 |
| 2004/0122273 A1 | 6/2004 | Kabin | 585/639 |
| 2004/0122936 A1 | 6/2004 | Mizelle et al. | |
| 2004/0147036 A1 | 7/2004 | Krenn et al. | 436/119 |
| 2004/0148144 A1 | 7/2004 | Martin | |
| 2004/0204775 A1 | 10/2004 | Keyes | 705/30 |
| 2004/0204913 A1 | 10/2004 | Mueller et al. | |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0029163 A1 | 2/2005 | Letzsch | 208/113 |
| 2005/0098033 A1 | 5/2005 | Mallavarapu et al. | 95/96 |
| 2005/0133211 A1 | 6/2005 | Osborn et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0252642 A1 | 11/2006 | Kanazirev | |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2008/0086322 A1 | 4/2008 | Wallace | 705/1 |
| 2008/0130902 A1 | 6/2008 | Foo Kune et al. | 380/286 |
| 2008/0154434 A1 | 6/2008 | Galloway et al. | |
| 2008/0217005 A1 | 9/2008 | Stluka et al. | 166/250.01 |
| 2008/0282606 A1 * | 11/2008 | Plaza | C11C 3/003 44/308 |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0204245 A1 | 8/2009 | Sustaeta | 700/99 |
| 2009/0245286 A1 | 10/2009 | Kore et al. | 370/475 |

(56) References Cited

U.S. PATENT DOCUMENTS

| | | | |
|---|---|---|---|
| 2009/0268674 A1 | 10/2009 | Liu et al. | 370/329 |
| 2009/0281677 A1 | 11/2009 | Botich | 700/295 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0152900 A1 | 6/2010 | Gurciullo et al. | |
| 2010/0158764 A1 | 6/2010 | Hedrick | 422/134 |
| 2010/0230324 A1 | 9/2010 | Al-Alloush et al. | 208/82 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0259583 A1 | 10/2012 | Noboa et al. | |
| 2013/0029587 A1 | 1/2013 | Gandhi et al. | 455/7 |
| 2013/0031960 A1 | 2/2013 | Delrahim | 73/40.5 R |
| 2013/0079899 A1 | 3/2013 | Baramov | 700/32 |
| 2013/0090088 A1* | 4/2013 | Chevsky | H04W 12/06 455/411 |
| 2013/0094422 A1 | 4/2013 | Thanikachalam | 370/312 |
| 2013/0172643 A1 | 7/2013 | Pradeep | 585/310 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2013/0327052 A1 | 12/2013 | O'Neill | 60/772 |
| 2014/0008035 A1 | 1/2014 | Patankar et al. | |
| 2014/0026598 A1 | 1/2014 | Trawicki | 62/56 |
| 2014/0074273 A1 | 3/2014 | Mohideen et al. | 700/98 |
| 2014/0114039 A1 | 4/2014 | Benham et al. | 526/348.5 |
| 2014/0131027 A1 | 5/2014 | Chir | 165/300 |
| 2014/0163275 A1 | 6/2014 | Yanagawa et al. | 585/319 |
| 2014/0179968 A1 | 6/2014 | Yanagawa et al. | 585/476 |
| 2014/0212978 A1 | 7/2014 | Sharpe, Jr. et al. | 436/6 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2014/0337277 A1 | 11/2014 | Asenjo et al. | |
| 2015/0059714 A1 | 3/2015 | Bernards | 123/568.11 |
| 2015/0060331 A1 | 3/2015 | Sechrist et al. | |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158789 A1 | 6/2015 | Keusenkothen | 60/780 |
| 2015/0185716 A1 | 7/2015 | Wichmann et al. | 700/287 |
| 2015/0276274 A1 | 10/2015 | Maturana et al. | 700/274 |
| 2015/0284641 A1 | 10/2015 | Shi | 208/113 |
| 2015/0330571 A1 | 11/2015 | Beuneken | 141/4 |
| 2016/0033941 A1 | 2/2016 | T et al. | 700/81 |
| 2016/0048119 A1 | 2/2016 | Wojsznis | 700/11 |
| 2016/0098037 A1 | 4/2016 | Zornio et al. | 700/20 |
| 2016/0098234 A1 | 4/2016 | Weaver | 358/1.15 |
| 2016/0122663 A1 | 5/2016 | Pintart et al. | |
| 2016/0147204 A1 | 5/2016 | Wichmann et al. | 700/287 |
| 2016/0237023 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2016/0313653 A1 | 10/2016 | Mink | |
| 2016/0363315 A1 | 12/2016 | Colannino et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0107188 A1 | 4/2017 | Kawaguchi | |
| 2017/0284410 A1 | 10/2017 | Sharpe, Jr. | |
| 2017/0315543 A1 | 11/2017 | Horn et al. | |
| 2017/0323038 A1 | 11/2017 | Horn et al. | |
| 2017/0352899 A1 | 12/2017 | Asai | |
| 2018/0046155 A1 | 2/2018 | Horn et al. | |
| 2018/0081344 A1 | 3/2018 | Romatier et al. | |
| 2018/0082569 A1 | 3/2018 | Horn et al. | |
| 2018/0121581 A1 | 5/2018 | Horn et al. | |
| 2018/0122021 A1 | 5/2018 | Horn et al. | |
| 2018/0155638 A1 | 6/2018 | Al-Ghamdi | 208/79 |
| 2018/0155642 A1 | 6/2018 | Al-Ghamdi et al. | |
| 2018/0197350 A1 | 7/2018 | Kim | |
| 2018/0275690 A1 | 9/2018 | Lattanzio et al. | |
| 2018/0275691 A1 | 9/2018 | Lattanzio et al. | |
| 2018/0275692 A1 | 9/2018 | Lattanzio et al. | |
| 2018/0280914 A1 | 10/2018 | Victor et al. | |
| 2018/0280917 A1 | 10/2018 | Victor et al. | |
| 2018/0282633 A1 | 10/2018 | Van de Cotte et al. | |
| 2018/0282634 A1 | 10/2018 | Van de Cotte et al. | |
| 2018/0282635 A1 | 10/2018 | Van de Cotte et al. | |
| 2018/0283368 A1 | 10/2018 | Van de Cotte et al. | |
| 2018/0283392 A1 | 10/2018 | Van de Cotte et al. | |
| 2018/0283404 A1 | 10/2018 | Van de Cotte et al. | |
| 2018/0283811 A1 | 10/2018 | Victor et al. | |
| 2018/0283812 A1 | 10/2018 | Victor et al. | |
| 2018/0283813 A1 | 10/2018 | Victor et al. | |
| 2018/0283815 A1 | 10/2018 | Victor et al. | |
| 2018/0283816 A1 | 10/2018 | Victor et al. | |
| 2018/0283818 A1 | 10/2018 | Victor et al. | |
| 2018/0284705 A1 | 10/2018 | Van de Cotte et al. | |
| 2018/0286141 A1 | 10/2018 | Van de Cotte et al. | |
| 2018/0311609 A1 | 11/2018 | McCool et al. | |
| 2018/0362862 A1 | 12/2018 | Gellaboina et al. | |
| 2018/0363914 A1 | 12/2018 | Faiella et al. | |
| 2018/0364747 A1 | 12/2018 | Charr et al. | |
| 2019/0002318 A1 | 1/2019 | Thakkar et al. | |
| 2019/0003978 A1 | 1/2019 | Shi et al. | |
| 2019/0015806 A1 | 1/2019 | Gellaboina et al. | |
| 2019/0041813 A1 | 2/2019 | Horn et al. | |
| 2019/0083920 A1 | 3/2019 | Bjorklund et al. | |
| 2019/0101336 A1 | 4/2019 | Victor et al. | |
| 2019/0101342 A1 | 4/2019 | Victor et al. | |
| 2019/0101907 A1 | 4/2019 | Charr et al. | |
| 2019/0102966 A1 | 4/2019 | Lorenz | |
| 2019/0108454 A1 | 4/2019 | Banerjee et al. | |
| 2019/0120810 A1 | 4/2019 | Kumar KN et al. | |
| 2019/0151814 A1 | 5/2019 | Victor et al. | |
| 2019/0155259 A1 | 5/2019 | Romatier et al. | |

FOREIGN PATENT DOCUMENTS

| | | | | |
|---|---|---|---|---|
| EP | 2801937 A1 | 11/2014 | | G06Q 10/06 |
| GB | 1134439 A | 11/1968 | | G01N 31/22 |
| WO | WO 1990/010083 A1 | 9/1990 | | C12Q 1/04 |
| WO | WO 2001/060951 A1 | 8/2001 | | C10G 51/04 |
| WO | WO 2006/044408 A1 | 4/2006 | | F23D 14/72 |
| WO | WO 2007/095585 A2 | 8/2007 | | A61K 31/721 |
| WO | WO 2009/046095 A1 | 4/2009 | | G06F 11/00 |
| WO | WO 2014/042508 A1 | 3/2014 | | G06Q 50/04 |
| WO | WO 2014/123993 A1 | 8/2014 | | G06F 17/00 |
| WO | WO 2016/141128 A1 | 9/2016 | | G06Q 10/06 |
| WO | WO 2017/079058 A1 | 5/2017 | | B01D 1/14 |

OTHER PUBLICATIONS

Daniel Goebel, Dry Gas Seal Contamination During Operation and Pressurization Hold, [online], Feb. 2016, [retrieved on Jun. 19, 2019]. Retrieved from <https ://core.ac.uk/download/pdf/84815277. pdf> (Year: 2016).

EnergyMEDOR®, Product brochure (Nov. 2014).

Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD⇒ (Year: 2016).

Lotters, Real-time Composition Determination of Gas Mixtures, [online], 2015, [retrieved on Jun. 19, 2019]. Retrieved from <https://www .ama-science.org/proceedings/getFile/ZwNOZj⇒ (Year: 2015).

(56) References Cited

OTHER PUBLICATIONS

Maybeck, Peter S., "Stochastic models, estimation, and control," vol. 1, Academic Press (1979), 19 pages.
Jul. 12, 2018—(WO) International Search Report and Written Opinion—App 2018/024894.
Sep. 20, 2018 (US) Notice of Allowance—U.S. Appl. No. 15/937,579.

* cited by examiner

HEAT EXCHANGERS IN A PETROCHEMICAL PLANT OR REFINERY

CROSS-REFERENCE TO RELATED APPLICATION

This application claims the benefit of priority under 35 U.S.C. § 119(e) of U.S. Provisional Application No. 62/477,528, filed Mar. 28, 2017, which is incorporated by reference in its entirety.

FIELD

The present disclosure is related to a method and system for managing the operation of a plant, such as a chemical plant or a petrochemical plant or a refinery, and more particularly to a method for improving the performance of components that make up operations in a plant. Typical plants may be those that provide catalytic dehydrogenation or hydrocarbon cracking, or catalytic reforming, or other process units.

BACKGROUND

A plant or refinery may include one or more pieces of equipment for performing a process. Equipment may break down over time, and need to be repaired or replaced. Additionally, a process may be more or less efficient depending on one or more operating characteristics. There will always be a need for improving process efficiencies and improving equipment reliability.

SUMMARY

The following summary presents a simplified summary of certain features. The summary is not an extensive overview and is not intended to identify key or critical elements.

One or more embodiments may include a system that includes a reactor; a heater; a heat exchanger; a regenerator; a separator; one or more sensors associated with the heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data comprising the operation information associated with the heat exchanger; based on analyzing the sensor data comprising the operation information associated with the heat exchanger, determine an operating condition of the heat exchanger; based on the operating condition of the heat exchanger, determine a recommended adjustment to the operating condition of the heat exchanger; and send a command configured to cause the recommended adjustment to the operating condition of the heat exchanger.

One or more embodiments may include one or more non-transitory computer-readable media storing executable instructions that, when executed, cause a system to: receive sensor data comprising operation information associated with a heat exchanger; analyze the sensor data comprising the operation information associated with the heat exchanger; based on analyzing the sensor data comprising the operation information associated with the heat exchanger, determine an operating condition of the heat exchanger; based on the operating condition of the heat exchanger, determine a recommended adjustment to the operating condition of the heat exchanger; and send a command configured to cause the recommended adjustment to the operating condition of the heat exchanger.

One or more embodiments may include a method that includes receiving, by a data analysis computing device, sensor data comprising operation information associated with a heat exchanger; analyzing, by the data analysis computing device, the sensor data comprising the operation information associated with the heat exchanger; based on analyzing the sensor data comprising the operation information associated with the heat exchanger, determining, by the data analysis computing device, an operating condition of the heat exchanger; based on the operating condition of the heat exchanger, determining, by the data analysis computing device, a recommended adjustment to the operating condition of the heat exchanger; and sending, by the data analysis computing device, a command configured to cause the recommended adjustment to the operating condition of the heat exchanger.

One or more embodiments may include a system that includes a reactor; a heater; a heat exchanger; a regenerator; a separator; one or more sensors associated with the heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data comprising the operation information associated with the heat exchanger to determine whether there is maldistribution within the heat exchanger; based on determining that there is maldistribution within the heat exchanger, determine a recommended adjustment to an operating condition of the heat exchanger to alleviate the maldistribution within the heat exchanger; and send a command configured to cause the recommended adjustment to the operating condition of the heat exchanger to alleviate the maldistribution within the heat exchanger.

One or more embodiments may include one or more non-transitory computer-readable media storing executable instructions that, when executed, cause a system to: receive sensor data comprising operation information associated with a heat exchanger; analyze the sensor data comprising the operation information associated with the heat exchanger to determine whether there is maldistribution within the heat exchanger; based on determining that there is maldistribution within the heat exchanger, determine a recommended adjustment to an operating condition of the heat exchanger to alleviate the maldistribution within the heat exchanger; and send a command configured to cause the recommended adjustment to the operating condition of the heat exchanger to alleviate the maldistribution within the heat exchanger.

One or more embodiments may include a method that includes receiving, by a data analysis computing device, sensor data comprising operation information associated with a heat exchanger; analyzing, by a data analysis computing device, the sensor data comprising the operation information associated with the heat exchanger to determine whether there is maldistribution within the heat exchanger; based on determining that there is maldistribution within the heat exchanger, determining, by a data analysis computing device, a recommended adjustment to an operating condition of the heat exchanger to alleviate the maldistribution within the heat exchanger; and sending, by a data analysis computing device, a command configured to cause the recommended adjustment to the operating condition of the heat exchanger to alleviate the maldistribution within the heat exchanger.

One or more embodiments may include a system that includes a reactor; a heater; a heat exchanger; a regenerator; a separator; a valve associated with the heat exchanger; one or more sensors associated with the heat exchanger; a data collection platform; and a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data to determine whether cross-leakage is occurring within the heat exchanger; based on determining that cross-leakage is occurring within the heat exchanger, determine a recommended adjustment to an operating condition of the heat exchanger to mitigate the cross-leakage occurring within the heat exchanger; and send a command configured to cause the recommended adjustment to the operating condition of the heat exchanger to mitigate the cross-leakage occurring within the heat exchanger.

One or more embodiments may include one or more non-transitory computer-readable media storing executable instructions that, when executed, cause a system to: receive sensor data comprising operation information associated with a heat exchanger; analyze the sensor data to determine whether cross-leakage is occurring within the heat exchanger; based on determining that cross-leakage is occurring within the heat exchanger, determine a recommended adjustment to an operating condition of the heat exchanger to mitigate the cross-leakage occurring within the heat exchanger; and send a command configured to cause the recommended adjustment to the operating condition of the heat exchanger to mitigate the cross-leakage occurring within the heat exchanger.

One or more embodiments may include a method that includes receiving, by a data analysis computing device, sensor data comprising operation information associated with a heat exchanger; analyzing, by the data analysis computing device, the sensor data to determine whether cross-leakage is occurring within the heat exchanger; based on determining that cross-leakage is occurring within the heat exchanger, determining, by the data analysis computing device, a recommended adjustment to an operating condition of the heat exchanger to mitigate the cross-leakage occurring within the heat exchanger; and sending, by the data analysis computing device, a command configured to cause the recommended adjustment to the operating condition of the heat exchanger to mitigate the cross-leakage occurring within the heat exchanger.

One or more embodiments may include a system that includes a reactor; a heater; a heat exchanger; a regenerator; a separator; one or more sensors associated with the heat exchanger, the one or more sensors comprising a strain gauge; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data to determine whether strain is occurring within the heat exchanger; based on determining that strain is occurring within the heat exchanger, determine a recommended adjustment to an operating condition of the heat exchanger to mitigate the strain occurring within the heat exchanger; and send a command configured to cause the recommended adjustment to the operating condition of the heat exchanger to mitigate the strain occurring within the heat exchanger.

One or more embodiments may include one or more non-transitory computer-readable media storing executable instructions that, when executed, cause a system to: receive sensor data comprising operation information associated with a heat exchanger; analyze the sensor data to determine whether strain is occurring within the heat exchanger; based on determining that strain is occurring within the heat exchanger, determine a recommended adjustment to an operating condition of the heat exchanger to mitigate the strain occurring within the heat exchanger; and send a command configured to cause the recommended adjustment to the operating condition of the heat exchanger to mitigate the strain occurring within the heat exchanger.

One or more embodiments may include a method that includes receiving, by a data analysis computing device, sensor data comprising operation information associated with a heat exchanger; analyzing, by the data analysis computing device, the sensor data to determine whether strain is occurring within the heat exchanger; based on determining that strain is occurring within the heat exchanger, determining, by the data analysis computing device, a recommended adjustment to an operating condition of the heat exchanger to mitigate the strain occurring within the heat exchanger; and sending, by the data analysis computing device, a command configured to cause the recommended adjustment to the operating condition of the heat exchanger to mitigate the strain occurring within the heat exchanger.

One or more embodiments may include a system that includes a reactor; a heater; a heat exchanger; a regenerator; a separator; one or more sensors associated with the heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data to determine whether thermal stress is occurring within the heat exchanger; based on determining that the thermal stress is occurring within the heat exchanger, determine a recommended adjustment to an operating condition of the heat exchanger to mitigate the thermal stress occurring within the heat exchanger; and send a command configured to cause the recommended adjustment to the operating condition of the heat exchanger to mitigate the thermal stress occurring within the heat exchanger.

One or more embodiments may include one or more non-transitory computer-readable media storing executable instructions that, when executed, cause a system to: receive, from the data collection platform, the sensor data comprising the operation information associated with the heat exchanger; analyze the sensor data to determine whether thermal stress is occurring within the heat exchanger; based on determining that the thermal stress is occurring within the heat exchanger, determine a recommended adjustment to an operating condition of the heat exchanger to mitigate the thermal stress occurring within the heat exchanger; and send a command configured to cause the recommended adjustment to the operating condition of the heat exchanger to mitigate the thermal stress occurring within the heat exchanger.

One or more embodiments may include a method that includes receiving, by a data analysis computing device, sensor data comprising operation information associated with a heat exchanger; analyzing, by the data analysis computing device, the sensor data to determine whether thermal stress is occurring within the heat exchanger; based on determining that the thermal stress is occurring within the heat exchanger, determining, by the data analysis computing device, a recommended adjustment to an operating condition of the heat exchanger to mitigate the thermal stress occurring within the heat exchanger; and sending, by the data analysis computing device, a command configured to cause the recommended adjustment to the operating condition of the heat exchanger to mitigate the thermal stress occurring within the heat exchanger.

One or more embodiments may include a system that includes a reactor; a heater; a heat exchanger; a regenerator; a separator; one or more sensors associated with the heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data to determine whether fouling is occurring within the heat exchanger; based on determining that fouling is occurring within the heat exchanger, determine a recommended adjustment to an operating condition of the heat exchanger to mitigate the fouling occurring within the heat exchanger; and send a command configured to cause the recommended adjustment to the operating condition of the heat exchanger to mitigate the fouling occurring within the heat exchanger.

One or more embodiments may include one or more non-transitory computer-readable media storing executable instructions that, when executed, cause a system to: receive sensor data comprising operation information associated with a heat exchanger; analyze the sensor data to determine whether fouling is occurring within the heat exchanger; based on determining that fouling is occurring within the heat exchanger, determine a recommended adjustment to an operating condition of the heat exchanger to mitigate the fouling occurring within the heat exchanger; and send a command configured to cause the recommended adjustment to the operating condition of the heat exchanger to mitigate the fouling occurring within the heat exchanger.

One or more embodiments may include a method that includes receiving, by a data analysis computing device, sensor data comprising operation information associated with a heat exchanger; analyzing, by the data analysis computing device, the sensor data to determine whether fouling is occurring within the heat exchanger; based on determining that fouling is occurring within the heat exchanger, determining, by the data analysis computing device, a recommended adjustment to an operating condition of the heat exchanger to mitigate the fouling occurring within the heat exchanger; and sending, by the data analysis computing device, a command configured to cause the recommended adjustment to the operating condition of the heat exchanger to mitigate the fouling occurring within the heat exchanger.

One or more embodiments may include a system that includes a reactor; a heater; a heat exchanger; a regenerator; a separator; one or more sensors associated with the heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data to determine whether vibration is occurring within the heat exchanger; based on determining that the vibration is occurring within the heat exchanger, determine a recommended adjustment to an operating condition of the heat exchanger to mitigate the vibration occurring within the heat exchanger; and send a command configured to cause the recommended adjustment to the operating condition of the heat exchanger to mitigate the vibration occurring within the heat exchanger.

One or more embodiments may include one or more non-transitory computer-readable media storing executable instructions that, when executed, cause a system to: receive sensor data comprising operation information associated with a heat exchanger; analyze the sensor data to determine whether vibration is occurring within the heat exchanger; based on determining that the vibration is occurring within the heat exchanger, determine a recommended adjustment to an operating condition of the heat exchanger to mitigate the vibration occurring within the heat exchanger; and send a command configured to cause the recommended adjustment to the operating condition of the heat exchanger to mitigate the vibration occurring within the heat exchanger.

One or more embodiments may include a method that includes receiving, by a data analysis computing device, sensor data comprising operation information associated with a heat exchanger; analyzing, by the data analysis computing device, the sensor data to determine whether vibration is occurring within the heat exchanger; based on determining that the vibration is occurring within the heat exchanger, determining, by the data analysis computing device, a recommended adjustment to an operating condition of the heat exchanger to mitigate the vibration occurring within the heat exchanger; and sending, by the data analysis computing device, a command configured to cause the recommended adjustment to the operating condition of the heat exchanger to mitigate the vibration occurring within the heat exchanger.

One or more embodiments may include a system that includes a reactor; a heater; a heat exchanger; a regenerator; a separator; one or more sensors associated with the heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the heat exchanger, sensor data comprising operation information associated with the heat exchanger; correlate the sensor data from the one or more sensors with metadata comprising time data, the time data corresponding to the operation information associated with the heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the heat exchanger; analyze the sensor data to determine whether a problem with liquid lift is occurring within the heat exchanger; based on determining that the problem with liquid lift is occurring within the heat exchanger, determine a recommended adjustment to an operating condition of the heat exchanger to mitigate the problem with liquid lift occurring within the heat exchanger; and send a command configured to cause the recommended adjustment to the operating condition of the heat exchanger to mitigate the problem with liquid lift occurring within the heat exchanger.

One or more embodiments may include one or more non-transitory computer-readable media storing executable instructions that, when executed, cause a system to: receive sensor data comprising operation information associated with a heat exchanger; analyze the sensor data to determine whether a problem with liquid lift is occurring within the heat exchanger; based on determining that the problem with liquid lift is occurring within the heat exchanger, determine a recommended adjustment to an operating condition of the heat exchanger to mitigate the problem with liquid lift occurring within the heat exchanger; and send a command configured to cause the recommended adjustment to the operating condition of the heat exchanger to mitigate the problem with liquid lift occurring within the heat exchanger.

One or more embodiments may include a method that includes receiving, by a data analysis computing device, sensor data comprising operation information associated with a heat exchanger; analyzing, by the data analysis computing device, the sensor data to determine whether a problem with liquid lift is occurring within the heat exchanger; based on determining that the problem with liquid lift is occurring within the heat exchanger, determining, by the data analysis computing device, a recommended adjustment to an operating condition of the heat exchanger to mitigate the problem with liquid lift occurring within the heat exchanger; and sending, by the data analysis computing device, a command configured to cause the recommended adjustment to the operating condition of the heat exchanger to mitigate the problem with liquid lift occurring within the heat exchanger.

One or more embodiments may include a system that includes a reactor; a heater; an air-cooled heat exchanger; a regenerator; a separator; one or more sensors associated with the air-cooled heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the air-cooled heat exchanger, sensor data comprising operation information associated with the air-cooled heat exchanger; correlate the sensor data from the one or more sensors with metadata comprising time data, the time data corresponding to the operation information associated with the air-cooled heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the air-cooled heat exchanger; analyze the sensor data comprising the operation information associated with the air-cooled heat exchanger; based on analyzing the sensor data comprising the operation information associated with the air-cooled heat exchanger, determine a problem in an operating condition of the air-cooled heat exchanger; based on the problem in the operating condition of the air-cooled heat exchanger, determine a recommended adjustment to the operating condition of the air-cooled heat exchanger; and send a command configured to cause the recommended adjustment to the operating condition of the air-cooled heat exchanger.

One or more embodiments may include one or more non-transitory computer-readable media storing executable instructions that, when executed, cause a system to: receive sensor data comprising operation information associated with a heat exchanger; analyze the sensor data comprising the operation information associated with the air-cooled heat exchanger; based on analyzing the sensor data comprising the operation information associated with the air-cooled heat exchanger, determine a problem in an operating condition of the air-cooled heat exchanger; based on the problem in the operating condition of the air-cooled heat exchanger, determine a recommended adjustment to the operating condition of the air-cooled heat exchanger; and send a command configured to cause the recommended adjustment to the operating condition of the air-cooled heat exchanger.

One or more embodiments may include a method that includes receiving, by a data analysis computing device, sensor data comprising operation information associated with a heat exchanger; analyzing, by the data analysis computing device, the sensor data comprising the operation information associated with the air-cooled heat exchanger; based on analyzing the sensor data comprising the operation information associated with the air-cooled heat exchanger, determining, by the data analysis computing device, a problem in an operating condition of the air-cooled heat exchanger; based on the problem in the operating condition of the air-cooled heat exchanger, determining, by the data analysis computing device, a recommended adjustment to the operating condition of the air-cooled heat exchanger; and sending, by the data analysis computing device, a command configured to cause the recommended adjustment to the operating condition of the air-cooled heat exchanger.

One or more embodiments may include a system that includes a reactor; a heater; a wet-cooled heat exchanger; a regenerator; a separator; one or more sensors associated with the wet-cooled heat exchanger; a data collection platform; and/or a data analysis platform. The data collection platform may include one or more processors of the data collection platform; a communication interface of the data collection platform; and memory storing executable instructions that, when executed, cause the data collection platform to: receive, from the one or more sensors associated with the wet-cooled heat exchanger, sensor data comprising operation information associated with the wet-cooled heat exchanger; correlate the sensor data from the one or more sensors with metadata comprising time data, the time data corresponding to the operation information associated with the wet-cooled heat exchanger; and transmit the sensor data. The data analysis platform may include one or more processors of the data analysis platform; a communication interface of the data analysis platform; and memory storing executable instructions that, when executed, cause the data analysis platform to: receive, from the data collection platform, the sensor data comprising the operation information associated with the wet-cooled heat exchanger; analyze the sensor data comprising the operation information associated with the wet-cooled heat exchanger; based on analyzing the sensor data comprising the operation information associated with the wet-cooled heat exchanger, determine a problem in an operating condition of the wet-cooled heat exchanger; based on the problem in the operating condition of the wet-cooled heat exchanger, determine a recommended adjustment to the operating condition of the wet-cooled heat exchanger; and send a command configured to cause the recommended adjustment to the operating condition of the wet-cooled heat exchanger.

One or more embodiments may include one or more non-transitory computer-readable media storing executable instructions that, when executed, cause a system to: receive sensor data comprising operation information associated with a wet-cooled heat exchanger; analyze the sensor data comprising the operation information associated with the wet-cooled heat exchanger; based on analyzing the sensor data comprising the operation information associated with the wet-cooled heat exchanger, determine a problem in an operating condition of the wet-cooled heat exchanger; based on the problem in the operating condition of the wet-cooled heat exchanger, determine a recommended adjustment to the operating condition of the wet-cooled heat exchanger; and send a command configured to cause the recommended adjustment to the operating condition of the wet-cooled heat exchanger.

One or more embodiments may include a method that includes receiving, by a data analysis computing device, sensor data comprising operation information associated with a wet-cooled heat exchanger; analyzing, by the data analysis computing device, the sensor data comprising the operation information associated with the wet-cooled heat exchanger; based on analyzing the sensor data comprising the operation information associated with the wet-cooled heat exchanger, determining, by the data analysis computing device, a problem in an operating condition of the wet-cooled heat exchanger; based on the problem in the operating condition of the wet-cooled heat exchanger, determining, by the data analysis computing device, a recommended adjustment to the operating condition of the wet-cooled heat exchanger; and sending, by the data analysis computing device, a command configured to cause the recommended adjustment to the operating condition of the wet-cooled heat exchanger.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals to create one or more products. For example, catalytic dehydrogenation can be used to convert paraffins to the corresponding olefin, e.g., propane to propene, or butane to butene.

A multitude of process equipment may be utilized in the chemical, refining, and petrochemical industry including, but not limited to, slide valves, rotating equipment, pumps, compressors, heat exchangers, fired heaters, control valves, fractionation columns, reactors, and/or shut-off valves.

Elements of chemical and petrochemical/refinery plants may be exposed to the outside and thus can be exposed to various environmental stresses. Such stresses may be weather related, such as temperature extremes (hot and cold), high-wind conditions, and precipitation conditions such as snow, ice, and rain. Other environmental conditions may be pollution particulates, such as dust and pollen, or salt if located near an ocean, for example. Such stresses can affect the performance and lifetime of equipment in the plants. Different locations may have different environmental stresses. For example, a refinery in Texas may have different stresses than a chemical plant in Montana.

Process equipment may deteriorate over time, affecting the performance and integrity of the process. Such deteriorating equipment may ultimately fail, but before failing, may decrease efficiency, yield, and/or product properties.

Figure 1A:
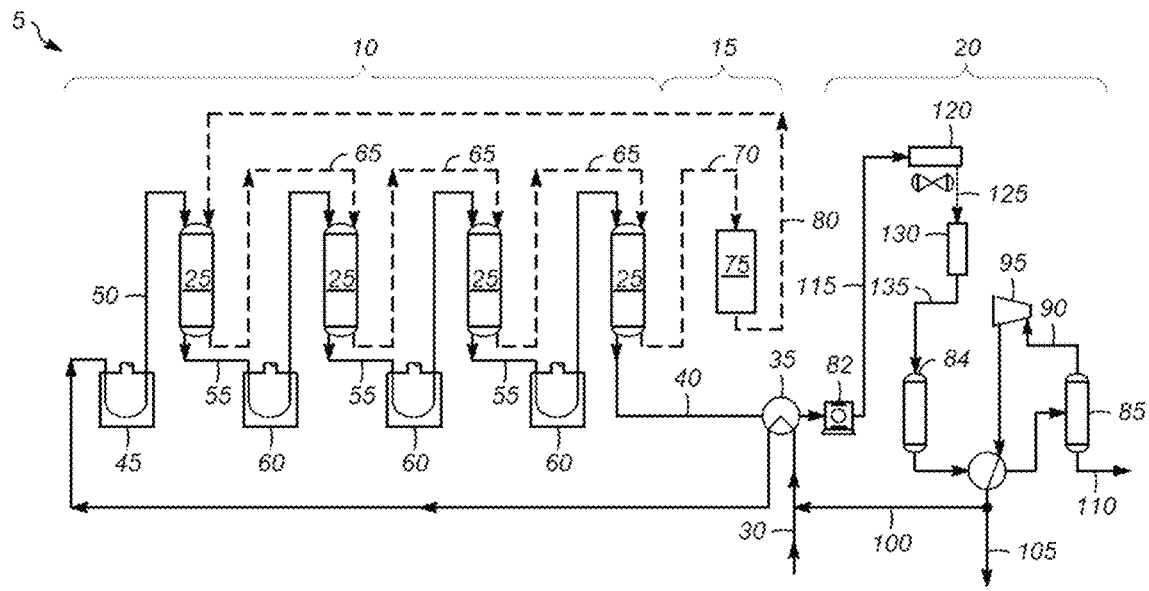
FIG. 1A depicts an illustrative arrangement for a catalytic dehydrogenation process in accordance with one or more example embodiments.

FIG. 1A shows one typical arrangement for a catalytic dehydrogenation process 5. The process 5 includes a reactor section 10, a catalyst regeneration section 15, and a product recovery section 20.

The reactor section 10 includes one or more reactors 25. A hydrocarbon feed 30 is sent to a heat exchanger 35 where it exchanges heat with a reactor effluent 40 to raise the feed temperature. The feed 30 is sent to a preheater 45 where it is heated to the desired inlet temperature. The preheated feed 50 is sent from the preheater 45 to the first reactor 25. Because the dehydrogenation reaction is endothermic, the temperature of the effluent 55 from the first reactor 25 is less than the temperature of the preheated feed 50. The effluent 55 is sent to interstage heaters 60 to raise the temperature to the desired inlet temperature for the next reactor 25.

After the last reactor, the reactor effluent 40 is sent to the heat exchanger 35, and heat is exchanged with the feed 30. The reactor effluent 40 is then sent to the product recovery section 20. The catalyst 65 moves through the series of reactors 25. When the catalyst 70 leaves the last reactor 25, it is sent to the catalyst regeneration section 15. The catalyst regeneration section 15 includes a regenerator 75 where coke on the catalyst is burned off and the catalyst may go through a reconditioning step. A regenerated catalyst 80 is sent back to the first reactor 25.

The reactor effluent 40 is compressed in the compressor or centrifugal compressor 82. The compressed effluent 115 is introduced to a cooler 120, for instance a heat exchanger. The cooler 120 lowers the temperature of the compressed effluent. The cooled effluent 125 (cooled product stream) is then introduced into a chloride remover 130, such as a chloride scavenging guard bed. The chloride remover 130 includes an adsorbent, which adsorbs chlorides from the cooled effluent 125 and provides a treated effluent 135. Treated effluent 135 is introduced to a drier 84.

The dried effluent is separated in separator 85. Gas 90 is expanded in expander 95 and separated into a recycle hydrogen stream 100 and a net separator gas stream 105. A liquid stream 110, which includes the olefin product and unconverted paraffin, is sent for further processing, where the desired olefin product is recovered and the unconverted paraffin is recycled to the dehydrogenation reactor 25.

Figure 1B:
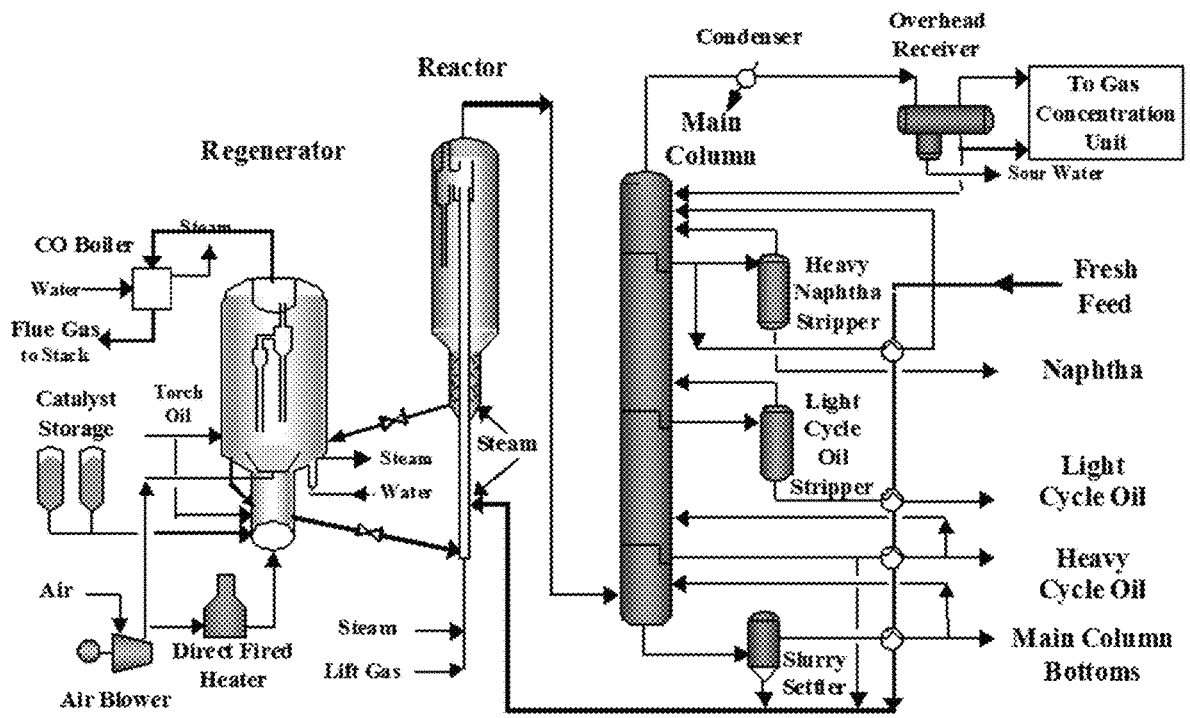
FIG. 1B depicts an illustrative arrangement for a fluid catalytic cracking process in accordance with one or more example embodiments.

FIG. 1B shows a typical fluid catalytic cracking (FCC) process which includes an FCC fluidized bed reactor and a spent catalyst regenerator. Regenerated cracking catalyst entering the reactor, from the spent catalyst regenerator, is contacted with an FCC feed stream in a riser section at the bottom of the FCC reactor, to catalytically crack the FCC feed stream and provide a product gas stream, comprising cracked hydrocarbons having a reduced molecular weight, on average, relative to the average molecular weight of feed hydrocarbons in the FCC feed stream. As shown in FIG. 1B, steam and lift gas are used as carrier gases that upwardly entrain the regenerated catalyst in the riser section, as it contacts the FCC feed. In this riser section, heat from the catalyst vaporizes the FCC feed stream, and contact between the catalyst and the FCC feed causes cracking of this feed to lower molecular weight hydrocarbons, as both the catalyst and feed are transferred up the riser and into the reactor vessel. A product gas stream comprising the cracked (e.g., lower molecular weight) hydrocarbons is separated from spent cracking catalyst at or near the top of the reactor vessel, preferably using internal solid/vapor separation equipment, such as cyclone separators. This product gas stream, essentially free of spent cracking catalyst, then exits the reactor vessel through a product outlet line for further transport to the downstream product recovery section.

The spent or coked catalyst, following its disengagement or separation from the product gas stream, requires regeneration for further use. This coked catalyst first falls into a dense bed stripping section of the FCC reactor, into which steam is injected, through a nozzle and distributor, to purge any residual hydrocarbon vapors that would be detrimental to the operation of the regenerator. After this purging or stripping operation, the coked catalyst is fed by gravity to the catalyst regenerator through a spent catalyst standpipe.

FIG. 1B depicts a regenerator, which can also be referred to as a combustor. Regenerators may have various configurations. In the spent catalyst regenerator, a stream of oxygen-containing gas, such as air, is introduced to contact the coked catalyst, burn coke deposited thereon, and provide regenerated catalyst, having most or all of its initial coke content converted to combustion products, including $CO_2$, CO, and $H_2O$ vapors that exit in a flue gas stream. The regenerator operates with catalyst and the oxygen-containing gas (e.g., air) flowing upwardly together in a combustor riser that is located within the catalyst regenerator. At or near the top of the regenerator, following combustion of the catalyst coke, regenerated cracking catalyst is separated from the flue gas using internal solid/vapor separation equipment (e.g., cyclones) to promote efficient disengagement between the solid and vapor phases.

In the FCC recovery section, the product gas stream exiting the FCC reactor is fed to a bottoms section of an FCC main fractionation column. Several product fractions may be separated on the basis of their relative volatilities and recovered from this main fractionation column. Representative product fractions include, for example, naphtha (or FCC gasoline), light cycle oil, and heavy cycle oil.

Other petrochemical processes produce desirable products, such as turbine fuel, diesel fuel and other products referred to as middle distillates, as well as lower boiling hydrocarbon liquids, such as naphtha and gasoline, by hydrocracking a hydrocarbon feedstock derived from crude oil or heavy fractions thereof. Feedstocks most often subjected to hydrocracking are the gas oils and heavy gas oils recovered from crude oil by distillation.

References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, and others interested in, overseeing, and/or running the daily operations at a plant.

Heat Exchangers

Heat Exchangers have many purposes in chemical and petrochemical plants. There are many different types of heat exchangers with the selection based on the specifics of its intended purpose. A typical use is to increase the temperature of the feed stream and reduce the temperature of a product stream or intermediate stream. For example, for a combined feed-effluent exchanger (CFE), an upstream process unit, or a fractionation column, or a pump may be directly upstream for the cold feed inlet; a recycle gas compressor is upstream of the cold recycle gas inlet; a fired heater is downstream of the cold outlet; a reactor is upstream of the hot effluent inlet; a product condenser (air-cooled, water-cooled, or both) is downstream of the hot effluent outlet.

Heat exchangers may be classified by their flow arrangement. Flow schemes reference how the hot stream and the cold stream are arranged (and therefore affect the temperature difference driving force for heat transfer between the two streams), and can refer to either overall flow through the exchanger (nozzle to nozzle) or locally (within a baffle cross-pass or a plate pass).

Parallel flow refers to two flows traveling in the same direction. Counter flow refers to two flows traveling in opposite directions. Cross flow refers to two (typically locally) flows that are perpendicular to each other.

Types of heat exchangers include, but are not limited to, shell and tube heat exchangers, plate heat exchangers, plate and shell heat exchangers, plate fin heat exchangers, air-cooled heat exchangers, wetted-surface air-cooled heat exchangers, and/or wet-cooled heat exchangers. Metal plates form the bundle and channels between the plates form the passages for flow. Other heat exchangers may be air-cooled heat exchangers and wetted surface air coolers. The heat exchangers may be vertically oriented or horizontally oriented.

Particular types of heat exchangers include combined feed exchangers (horizontal shells in series), column reboiler, column condenser, column trim condenser, column feed-bottoms exchanger, column bottoms cooler, feed heater, effluent cooler, chiller, cooler, heater, and vaporizer. Air exchangers typically use ambient air to cool streams of gas or liquid. A cold box combines brazed heat exchangers with any type of complementary cryogenic equipment, such as knock-out drums, two-phase injection drums, distillation columns, interconnecting piping, valves and instrumentation, for example used to separate product streams at cold temperatures.

In some aspects, a cold stream, which is a mixture of feed and recycle gas, needs to be heated and a hot stream, which is reactor effluent, needs to be cooled. The recycle gas is typically hydrogen-rich recycle gas. The feed may be liquid feed or gas feed which is mixed then with the recycle gas. If a liquid feed the combined feed and recycle gas forms a two phase system. The temperatures of the feed/recycle gas and effluent entering the exchanger depend on the particular process.

Vertically oriented heat exchangers can be used in many processes, including hydrocarbon processes. Often, a vertically oriented exchanger may be used to preheat a mixed phase of a liquid hydrocarbon feed and a gas rich in hydrogen. Typically, a vertically oriented exchanger is used as a combined feed and effluent (hereinafter may be abbreviated "CFE") exchanger where a mixed phase of a hydrocarbon liquid and a gas are preheated with the effluent from a reactor. Often, a liquid hydrocarbon feed and a gas, often a recycle gas including hydrogen, are mixed and introduced on the tube side. Generally, the mixture requires good lift to pass upwards through the vertically oriented heat exchanger.

Figure 2:
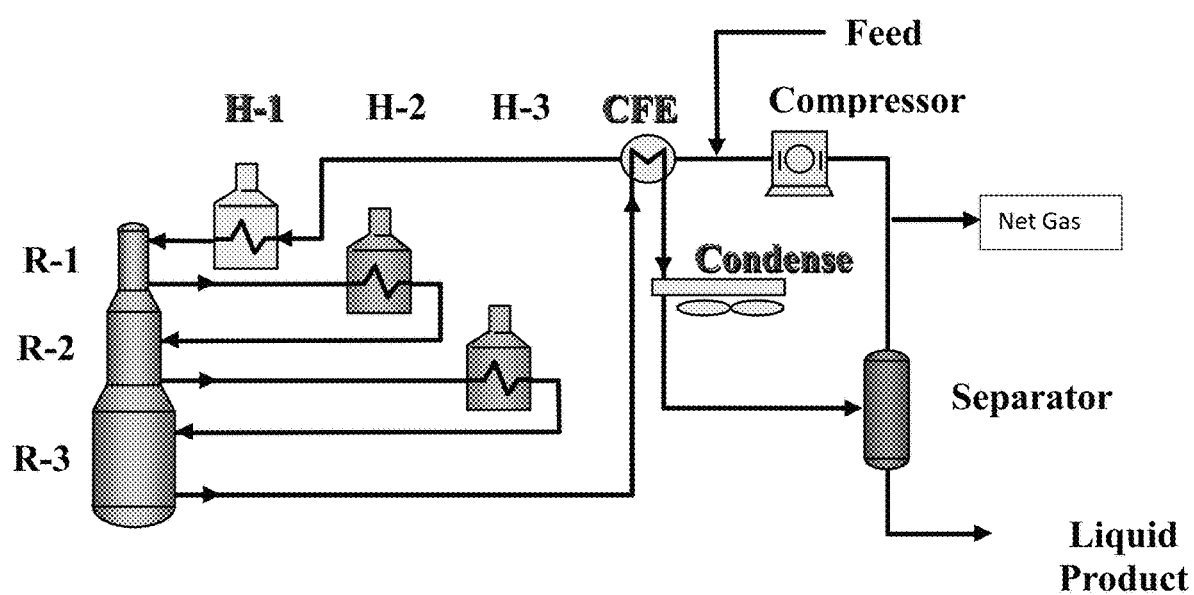
FIG. 2 depicts an illustrative catalytic reforming process using a (vertically-oriented) combined feed-effluent (CFE) exchanger in accordance with one or more example embodiments.

FIG. 2 illustrates a process for reforming with continuous catalyst regeneration (CCR) using a (vertically oriented) combined feed-effluent (CFE) exchanger. The cold stream, a combination of liquid feed (110.4° C.) with hydrogen rich recycle gas (e.g., light paraffins) (125.8° C.), is introduced into a CFE exchanger where the feed is vaporized. (Entrance temperature: 96.9° C. Exit temperature: 499.6° C.) The feed/recycle exits the CFE as a gas and goes through a series of heating and reaction steps. The resulting product effluent or hot stream is introduced into the CFE exchanger and is cooled down. (Entrance temperature: 527.9° C. Exit temperature: 109.1° C.) The effluent exits the CFE exchanger and is then cooled down further and condensed using an air cooler. The liquid product is separated from the gas stream containing hydrogen and light paraffins. Some of the gas stream is removed, for example as a product, and the rest of the stream is used as recycle gas.

Figure 3:
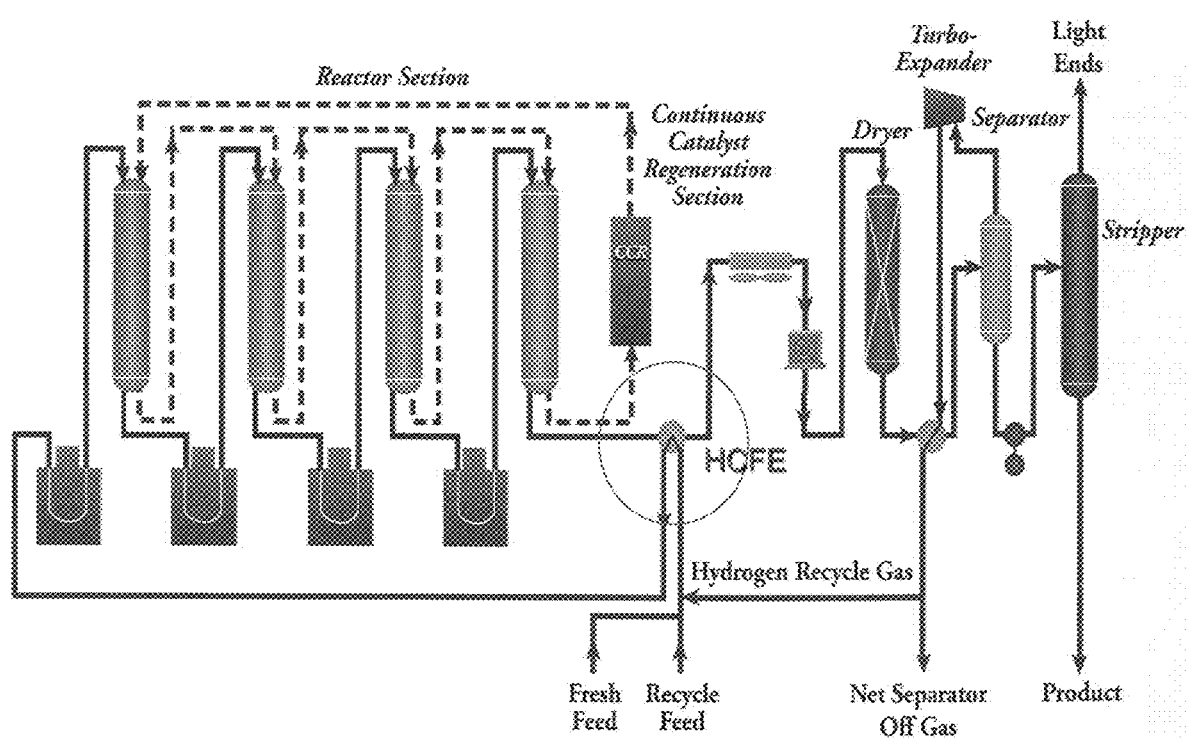
FIG. 3 depicts an illustrative an OLEFLEX process (catalytic dehydrogenation) with continuous catalyst regeneration (CCR) using a (vertically-oriented) hot combined feed-effluent (HCFE) exchanger in accordance with one or more example embodiments.

FIG. 3 illustrates a catalytic dehydrogenation process (e.g., an OLEFLEX process) with continuous catalyst regeneration (CCR) using a (vertically-oriented) hot combined feed-effluent (HCFE) exchanger. The cold stream, a combination of vapor feed with hydrogen rich recycle gas, is introduced into a HCFE exchanger and is heated. (Entrance temperature: 39.7° C. Exit temperature: 533.7° C.) The feed/recycle exits the HCFE as a gas and goes through a series of heating and reaction steps. The resulting product effluent or hot stream is introduced into the HCFE exchanger and is cooled down. (Entrance temperature: 583.7° C. Exit temperature: 142.3° C.) The effluent exits the HCFE exchanger and is then cooled down further using an air cooler. The effluent then passes through a dryer, separators, and strippers. Hydrogen recycle gas is separated after the dryer and returned to the feed stream.

Combined feed—effluent heat exchanger services are found in various process units (some examples are listed below), having different CFE process conditions. The entrance and exit temperatures of the heat exchangers depend on the feed composition, recycle gas, and product effluent as well as reaction conditions and process parameters. For example inlet/outlet temperatures may be:

a. Isomerization of xylenes:
  i. (Cold stream) Mix of Recycle Gas and Feed 143.1° C./401.0° C.
    1. H2 rich Recycle Gas 70.1° C.
    2. Liquid Feed 180.3° C.
  ii. (Hot stream) Reactor Effluent 443.9° C./166.6° C.
b. Transalkylation of toluene and other aromatics
  i. (Cold stream) Mix of Recycle Gas and Feed 112.5° C./457.9° C.
    1. H2 rich Recycle Gas 57.4° C.
    2. Liquid Feed 164.2° C.
  ii. (Hot stream) Reactor Effluent 492.9° C./136.9° C.
c. OLEFLEX CCFE in Cold Box: (Catalytic dehydrogenation—cold combined feed heat exchanger)
  i. (Cold stream) Mix of Recycle Gas and Feed −3.2° C./38.0° C.
    1. (Cold stream) H2 rich Recycle Gas −112.1° C.
    2. (Cold stream) Liquid Feed −89.2° C.
  ii. (Cold stream) Net Gas −121.6° C./27.4° C.
  iii. (Hot stream) Reactor Effluent −42.6° C./−92.0° C.

Heat exchangers may be made of any material of construction used in a chemical plant, refinery or petrochemical plant. Such construction material include carbon steel, stainless steel (typical for welded plates exchangers to manage thickness and strength), low chrome carbon steels, mid chrome carbon steels, austenitic stainless steels, high alloys, copper alloys, nickel alloys and titanium. Brazed aluminum exchangers are typically aluminum, and diffusion bonded exchangers are typically stainless steels.

Special devices may be used to obtain uniform distribution of liquid and vapor. In some exchangers, spray bars are used to spray and mix liquid feed into the vapor recycle gas as it enters the bundle. In a vertical tubular combined feed-effluent (VCFE) a spray pipe or liquid distributor provides a similar function. In a brazed aluminum or diffusion bonded exchanger spray holes or special fin geometry may be used to mix liquid and vapor streams (from separate inlet headers) at the inlet to the passages. In shell and tube exchangers, spray nozzles may be used to distribute a solvent (or wash water) into an exchanger to control fouling.

The spray bar or spray pipe may include covers or sleeves that can open and close holes that make up the spray nozzles. Operation of these covers can be maintained through use of a processor. The covers can be opened and closed to direct flow and restrict flow to different areas of the heat exchanger. In one aspect, a single cover will cover several holes at once. In another aspect, a single cover will cover only one hole.

Vertical CFE

Figure 4:
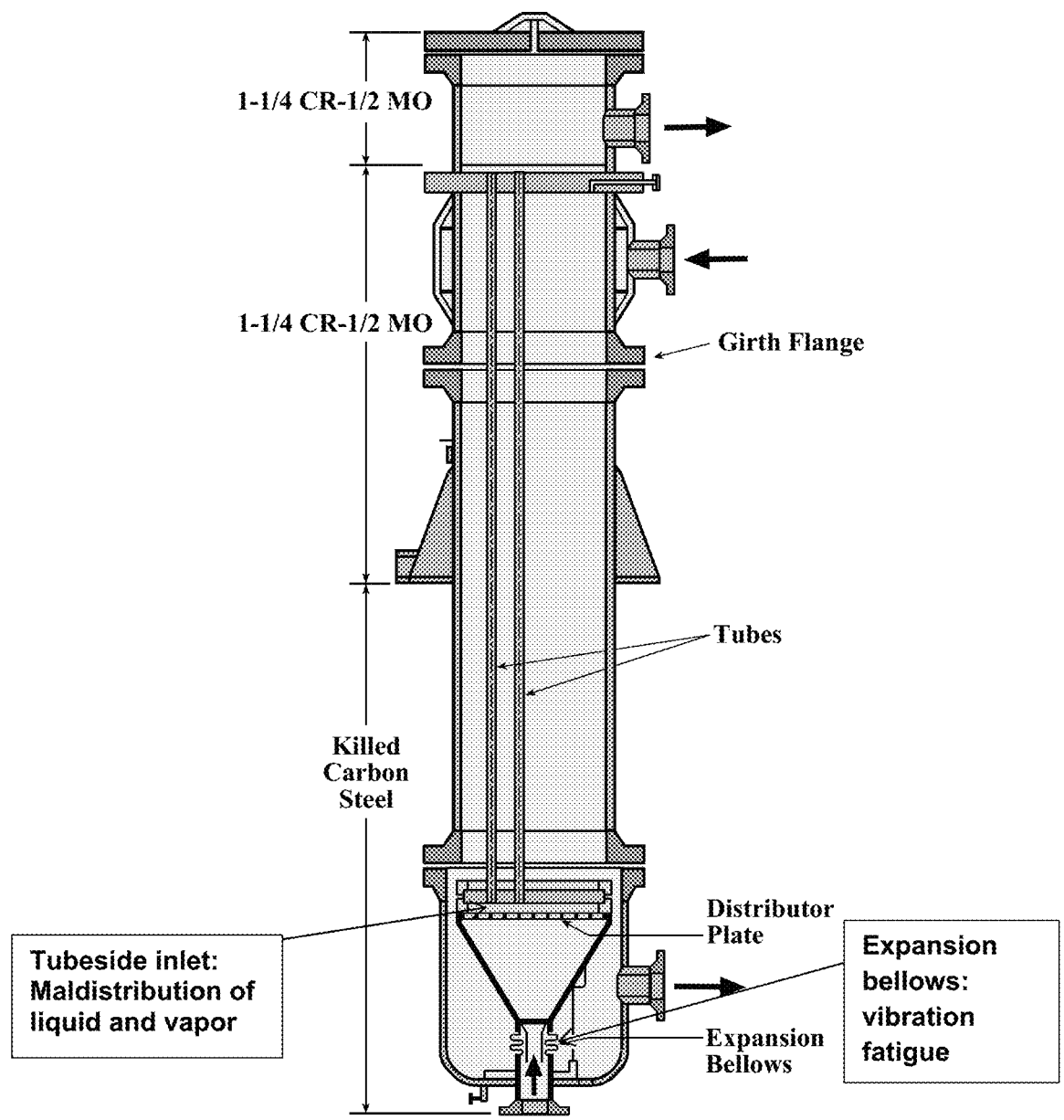
FIG. 4 depicts an illustrative a vertical CFE heat exchanger having a single tube pass design in accordance with one or more example embodiments.

FIG. 4 is an example of a vertical CFE heat exchanger having a single tube pass design. Typically, there is one shell in series but there may be multiple (1 to 4) shells in parallel. Normal operating heat transfer coefficient may be 35-50

Btu/hr-ft2-° F. Normal operating mean temperature difference may be about 80° F. Normal operating pressure drop may be 10.5-12.5 psi total.

Figure 5A:
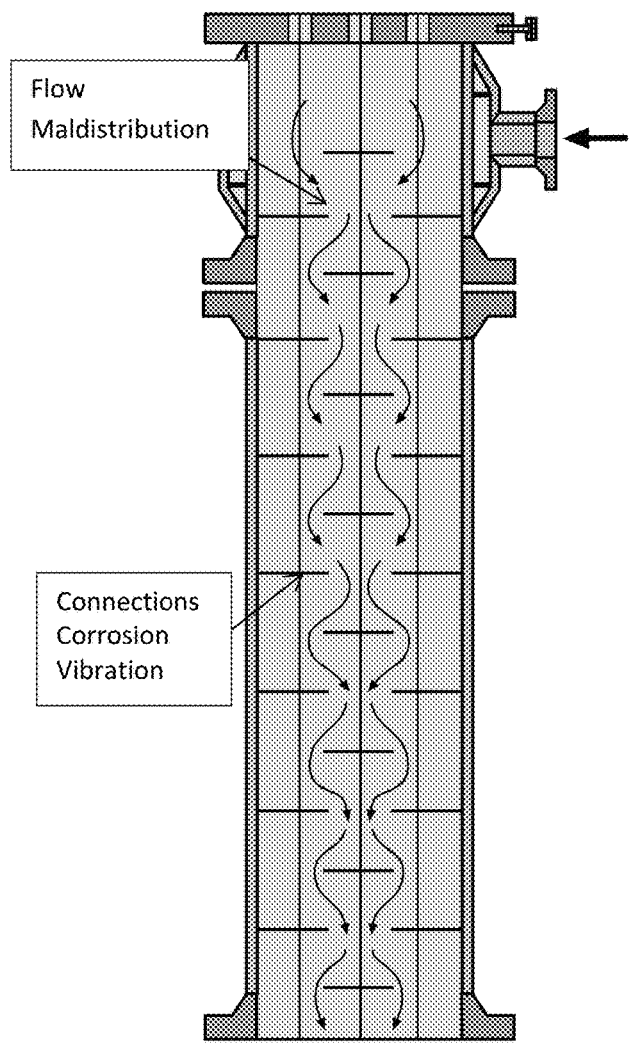
FIGS. 5A and 5B depict illustrative baffle arrangements that may be used in the heat exchanger of FIG. 4 in accordance with one or more example embodiments.
Figure 5B:
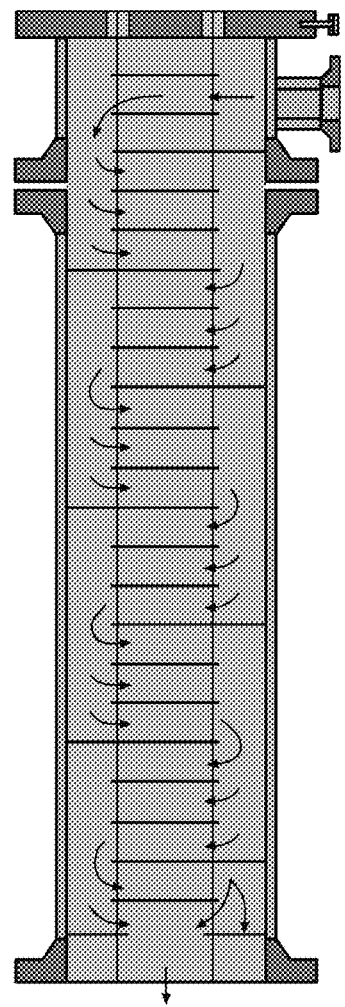

Expansion bellows are located inside the device adjacent the feed pipe inlet to accommodate expansion/contraction due to differential thermal expansion and fluctuating temperature conditions. The feed and recycle gas is distributed to the tubes via a spray pipe distributor and/or orifice plate. A shell side girth flange connects the upper and lower parts of the shell. The upper and lower parts are made of different metallurgy (e.g., CR/MO, carbon steel, respectively). The feed enters the bottom of the heat exchanger, flows through a distributor and through the tubes, and exits at the top. The product effluent enters at the top of the heat exchanger and has a circuitous path around baffle arrangements. Baffle arrangements may take various forms and constructions as seen in FIGS. 5A and 5B.

Although not as common, multiple shells may be used in series. In this case, by-pass pipes may be used in case one of the exchangers in the series must be taken offline, for example for maintenance.

Vertical HCFE

Figure 6:
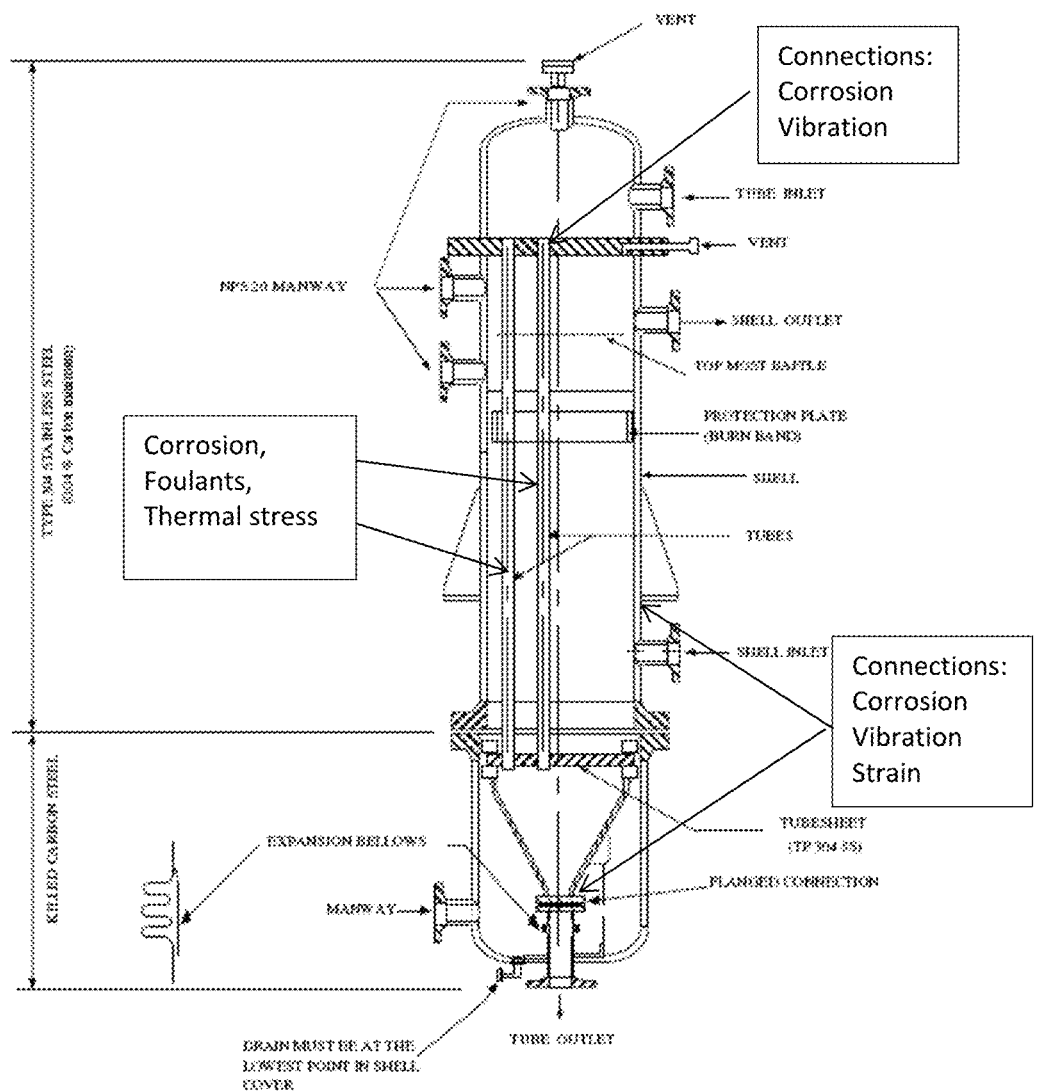
FIG. 6 depicts an illustrative vertical HCFE design having a single tube pass design in accordance with one or more example embodiments.

FIG. 6 is an example of a vertical HCFE design having a single tube pass design. Normal operating heat transfer coefficient may be 20-25 Btu/hr-ft2-° F. Normal operating mean temperature difference may be about 100° F. Normal operating pressure drop may be 2-3 psi total.

Expansion bellows are located inside the device adjacent the feed pipe inlet to accommodate expansion/contraction due to differential thermal expansion and fluctuating temperature conditions. A shell side girth flange connects upper and lower parts of the shell. The upper and lower parts are made of different metallurgy (e.g., stainless steel, carbon steel, respectively). The feed enters the bottom of the heat exchanger, has a circuitous path around baffle arrangements, and exits at the top. The product effluent enters at the top, flows through the tubes, and exits at the bottom.

PACKINOX Welded Plate Heat Exchanger

Figure 7:
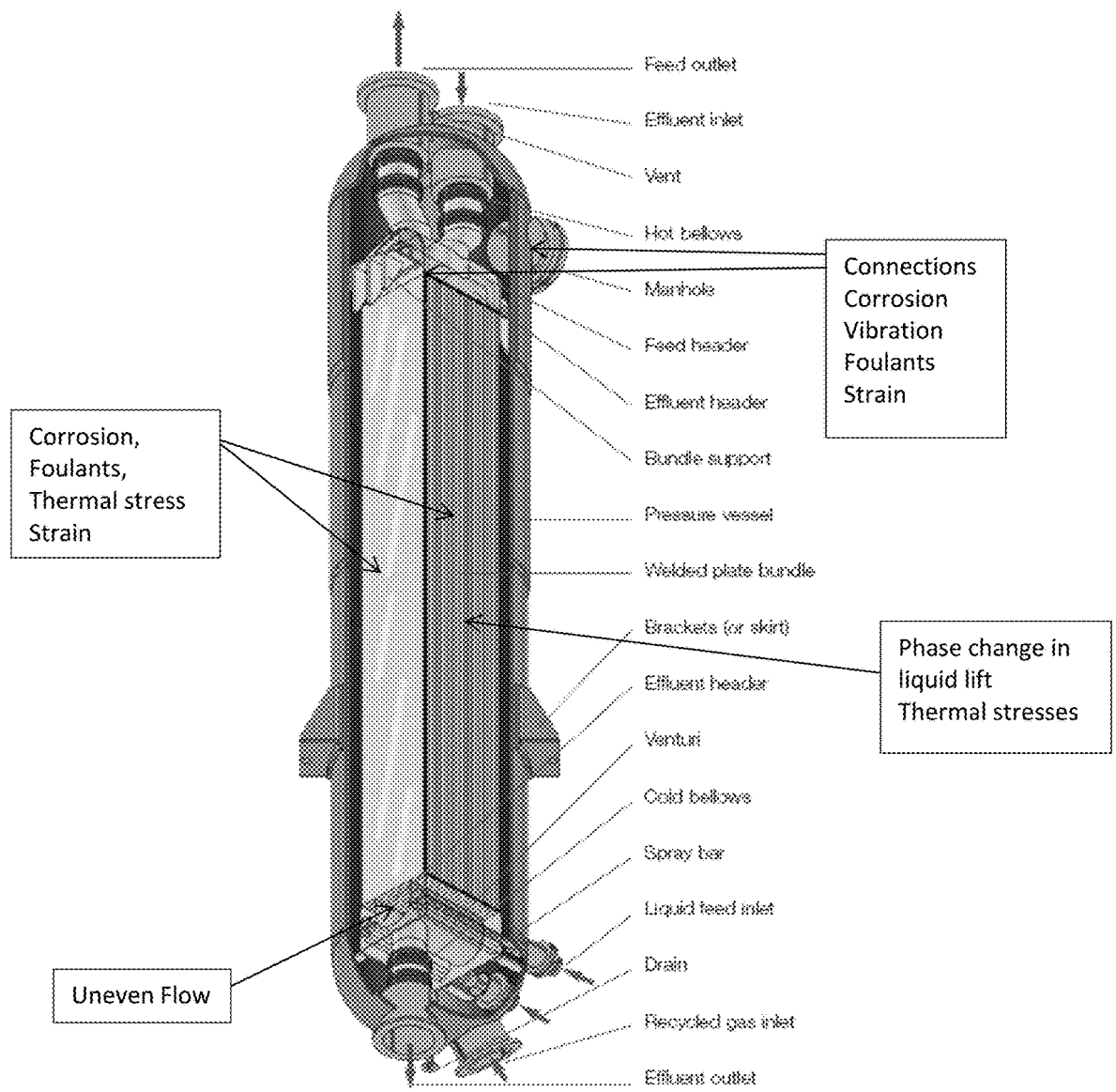
FIG. 7 depicts an illustrative PACKINOX welded plate heat exchanger with a single shell in accordance with one or more example embodiments.

FIG. 7 is an example of a PACKINOX welded plate heat exchanger with a single shell. Normal operating heat transfer coefficient may be two times or three times or more than the coefficients achieved with shell and tube type heat exchangers. Normal operating mean temperature difference may be less that about 60° F. Normal operating pressure drop may be 12.5 psi total.

Expansion bellows are located inside the device adjacent inlets and outlets to accommodate expansion/contraction due to differential thermal expansion and fluctuating temperature conditions. The feed and recycle gas enters the bottom of the device, flows in channels between plates, and exits at the top. The product effluent enters at the top, flows in different channels between the plates, and exits at the bottom.

Figure 8:
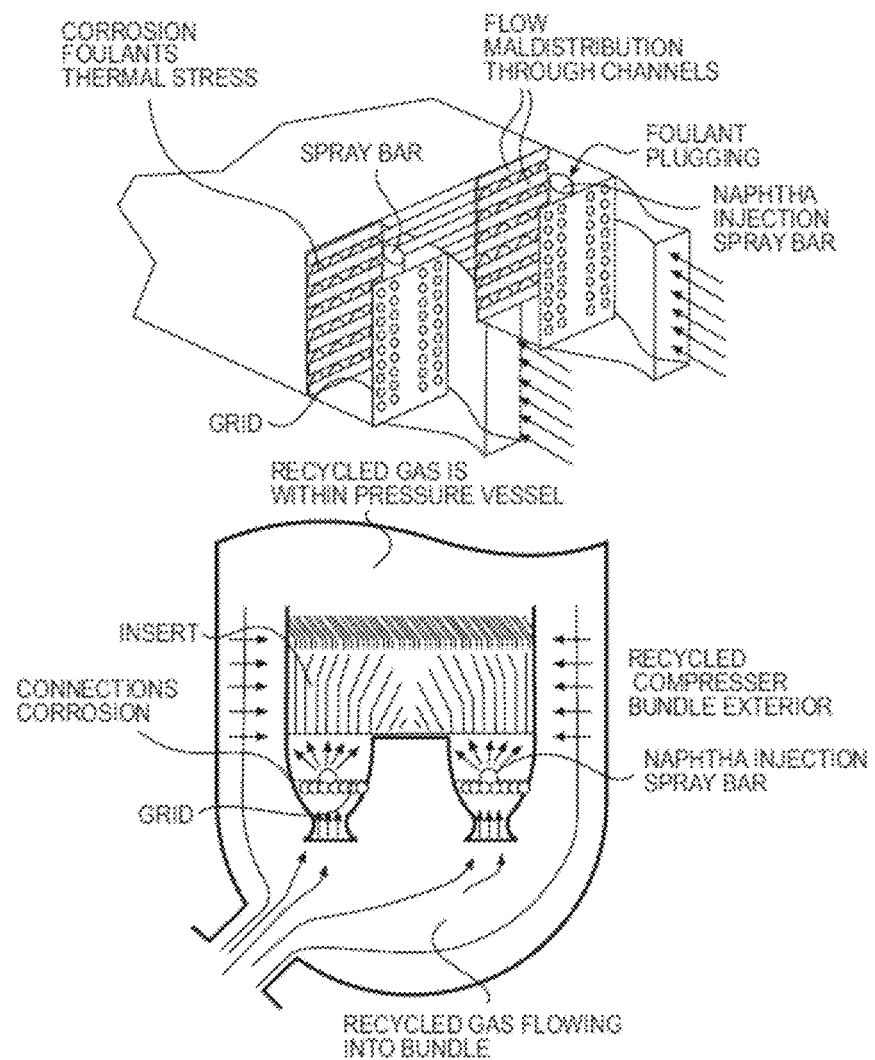
FIG. 8 is a close up of the spray bar injection system of FIG. 7 for distributing liquid feed into the welded plate heat exchanger in accordance with one or more example embodiments.

FIG. 8 depicts a spray bar injection system for distributing the liquid feed to channels between the plates and grids having holes to distribute the recycle gas to channels between the plates. The liquid is dispersed and the recycle gas carries the liquid upward between channels between the plates. In the heat exchanger of FIG. 7, two spray bars are often used.

COMPLABLOC

Figure 9:
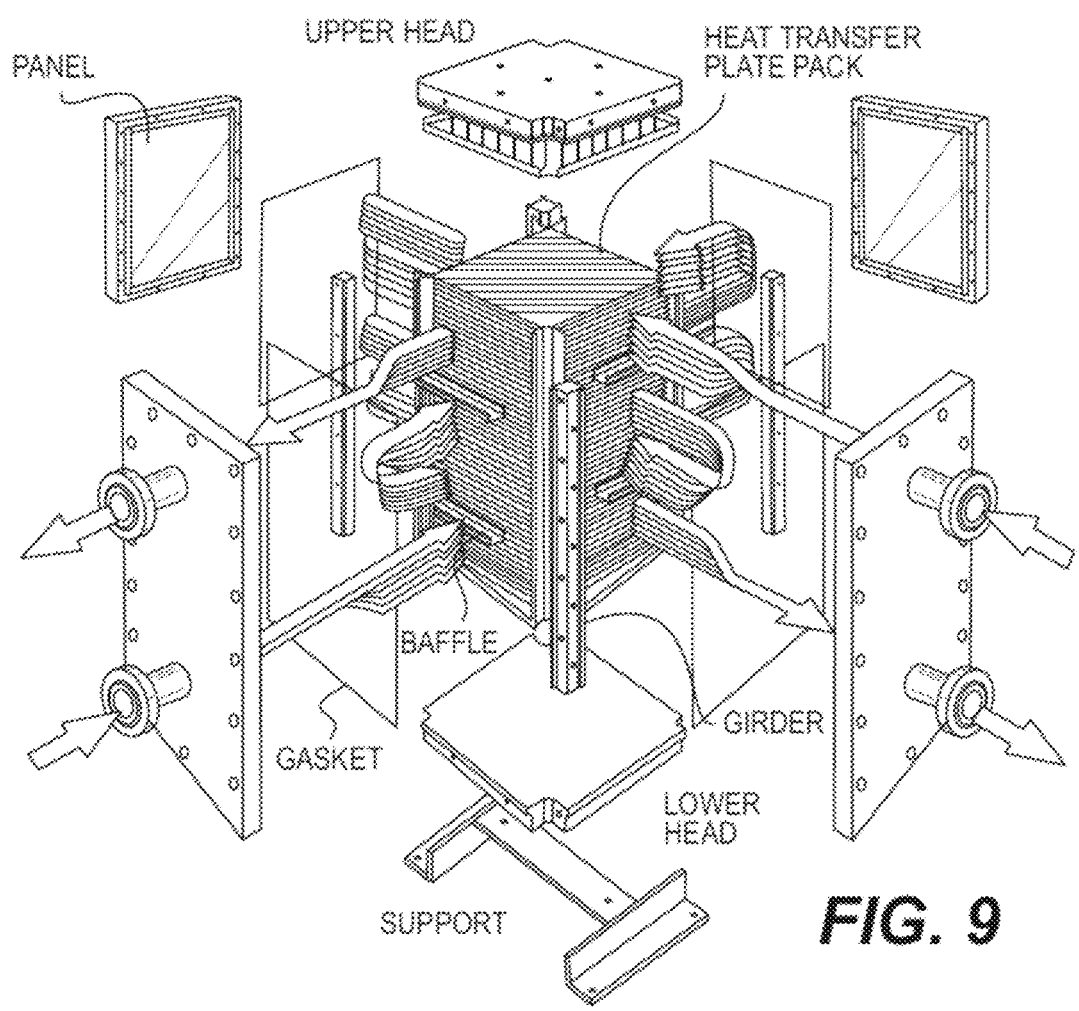
FIG. 9 depicts an illustrative exploded view of a COMPLABLOC welded plate block heat exchanger in accordance with one or more example embodiments.

FIG. 9 depicts an exploded view of a COMPLABLOC welded plate heat exchanger. This heat exchanger is typically used for chemically aggressive environments and low to moderate temperatures. The COMPLABLOC heat exchanger is a welded plate heat exchanger with no gaskets between the plates. The plates are welded alternatively to form channels. The frame has four corner girders, top and bottom heads and four side panels with nozzle connections. These components are bolted together and can be quickly taken apart for inspection, service or cleaning. This allows for compactness of surface yet is reasonably cleanable. The size and pressure, however, is somewhat restricted by the flat bolted covers that are needed. Flow enters the heat exchanger and is guided between alternating plates. The flow may be reversed several times until it exits at the other end of the heat exchanger. COMPABLOC exchangers are capable of obtaining higher heat transfer coefficients and smaller operating mean temperature differences with the similar pressure drops compared to shell and tube heat exchangers.

Multi-Stream Heat Exchangers

Multi-stream heat exchangers are configured so multiple streams are passed through the heat exchanger. A multi-stream service has more than two streams and may be more than 12 streams. Normal operating heat transfer coefficients, operating mean temperature differences and pressure drops depend on the individual streams being considered and will vary from stream to stream. They are typically similar to the values obtained in other plate type heat exchangers. Multi-stream heat exchangers include brazed aluminum plate fin heat exchangers (BAHX) and diffusion bonded heat exchangers.

Figure 10A:
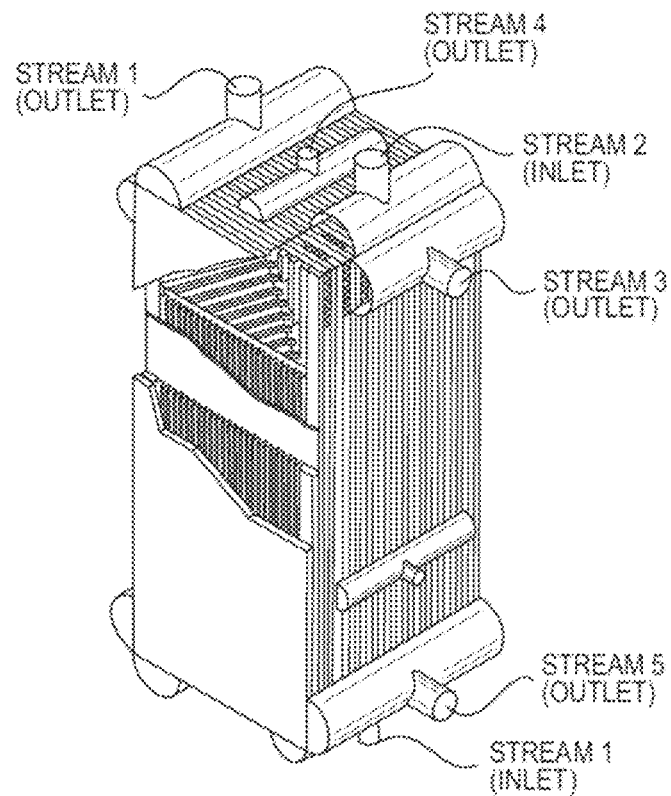
FIG. 10A depicts an illustrative brazed aluminum plate fin heat exchangers (BAHX) where multiple streams are passed through the heat exchanger in accordance with one or more example embodiments.
Figure 10B:
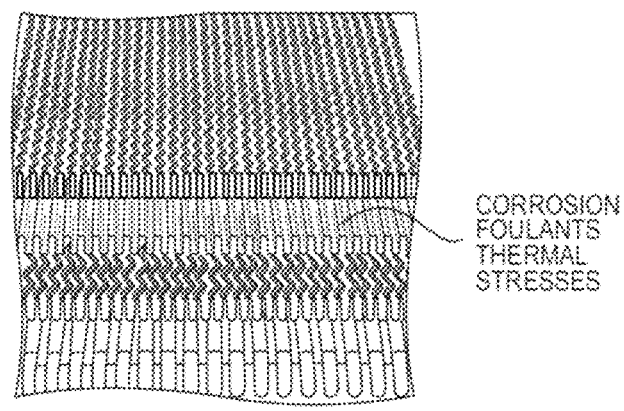
FIG. 10B shows plate fins utilized in BAHX in accordance with one or more example embodiments.

FIG. 10A is an example of a brazed aluminum plate fin heat exchangers (BAHX) typically used for air separation and cryogenic applications. FIG. 10B shows a close up view of the plate fins. Brazed heat exchangers have very low service temperature limits and may have a multiple streams, as many as dozen or more streams, all chilled by a common cold stream or streams in one exchanger instead of multiple exchangers. Alternatively, multiple streams may all be heated by a common hot stream or streams in one exchanger.

Figure 11A:
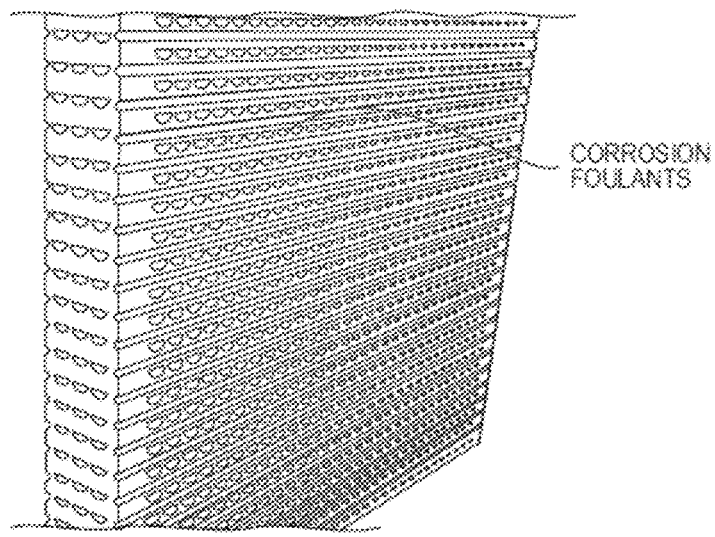
FIGS. 11A and 11B depicts channels of an illustrative diffusion bonded heat exchangers in accordance with one or more example embodiments.
Figure 11B:
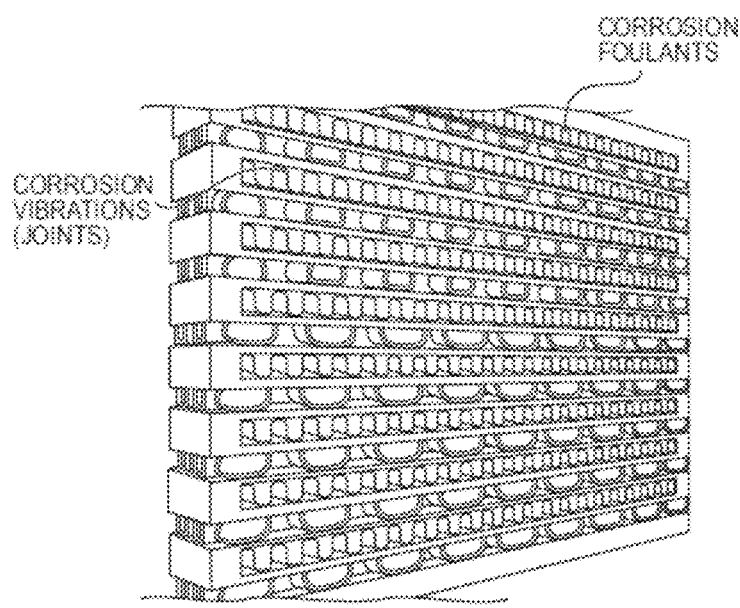

FIG. 11A and FIG. 11B depict diffusion bonded heat exchangers that are typically used for off-shore platform applications and include printed circuit heat exchangers (PCHE) and formed plate heat exchangers (FPHE.) Diffusion bonding is a solid state joining process which gives rise to parent metal strength via clean high temperature and pressure. The bonding does not involve melting or deformation and does not use braze, flux, or filler. The process promotes grain strength across the plate interface.

Shell & Tube Exchanger

Figure 12:
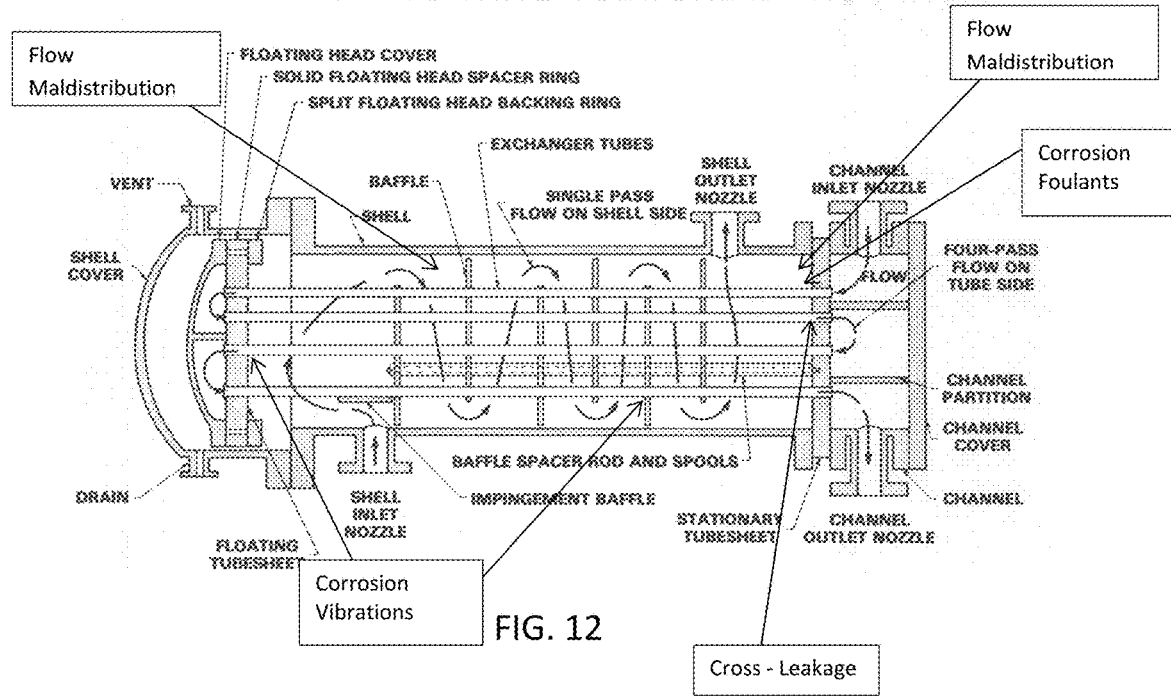
FIG. 12 depicts an illustrative cross view of a floating tube sheet shell and tube type exchanger in accordance with one or more example embodiments.

FIG. 12 depicts a cross view of a cross-flow floating tube sheet type shell and tube exchanger. This is a cross flow exchanger as the flow entering the shell takes a circuitous path around baffles and crossing over tubes carrying a flow across the exchanger. This exchanger as shown has a four-pass flow on the tube side, and other quantities of tube side passes are possible. The tube may be a bundle of tubes that extend across the exchanger. The tubes extend between a stationary tube sheet and a floating tubesheet. The floating tubesheet and floating head cover allow for expansion and contraction of the tubes relative to the shell.

Spiral Plate Heat Exchanger

Figure 13A:
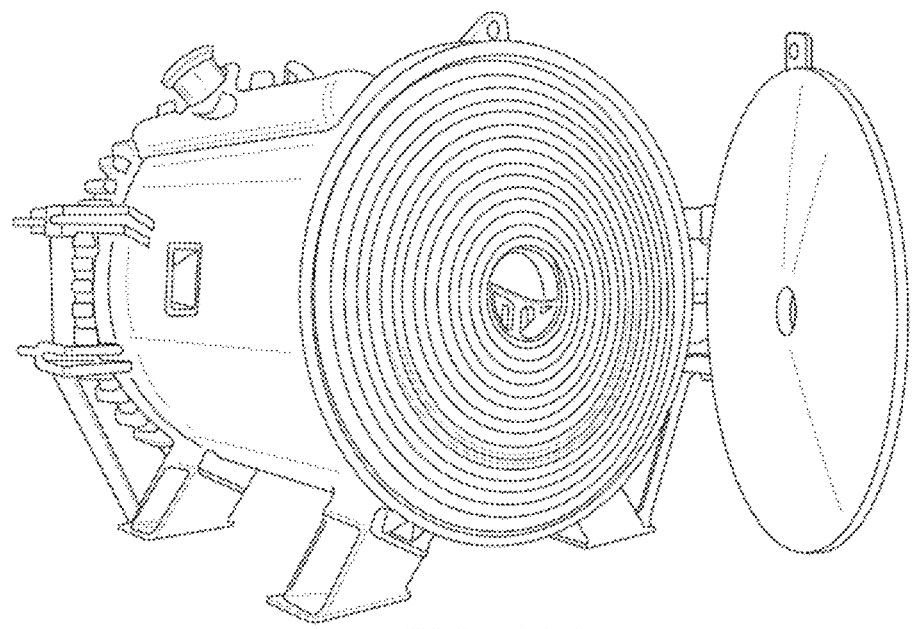
FIGS. 13A and 13B depicts an illustrative spiral plate heat exchanger in accordance with one or more example embodiments.
Figure 13B:
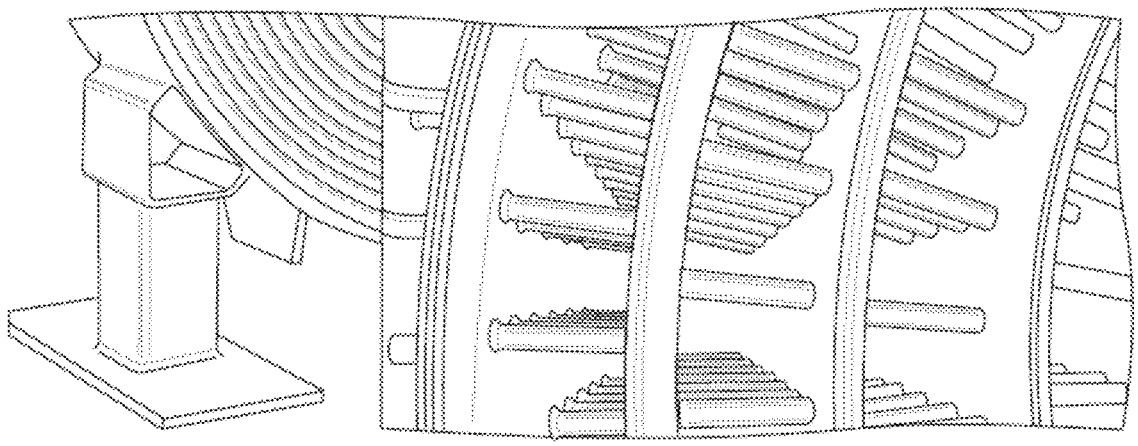

FIG. 13A depicts a spiral plate heat exchanger. A spiral plate heat exchanger has two spiral channels that are concentric, one for each fluid. The curved channels provide great heat transfer and flow conditions for a wide variety of fluids. The spiral plate heat exchanger typically has a single passage for each fluid, making it a good choice for fouling fluids or fluids containing solid particles. The overall size of the unit is kept to a minimum therefore optimizing space. Spiral plate exchangers are easy to open to clean. FIG. 13B shows the studs used to maintain plate spacing.

Figure 14A:
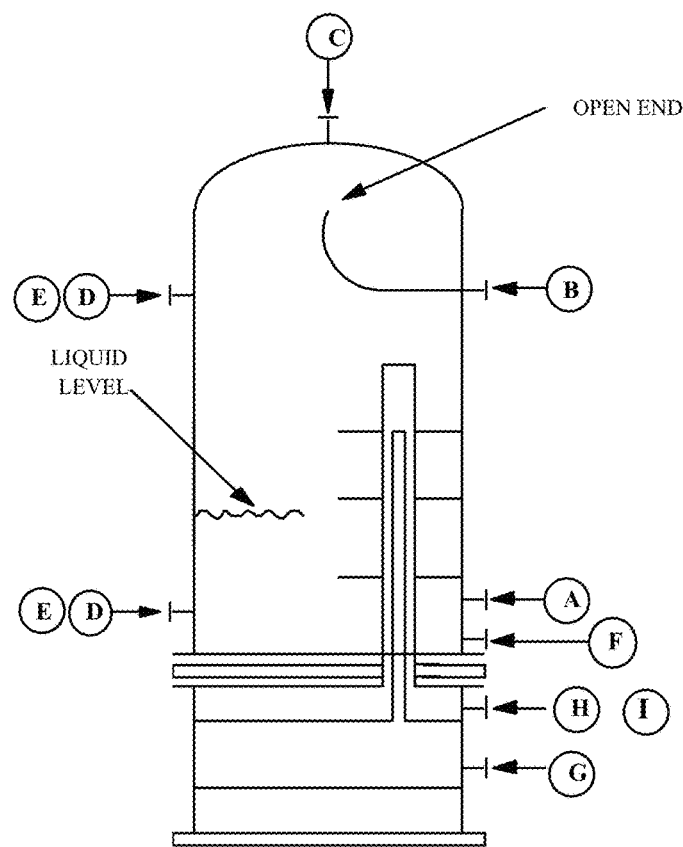
FIGS. 14A and 14B depict vaporizers in accordance with one or more example embodiments.
Figure 14B:
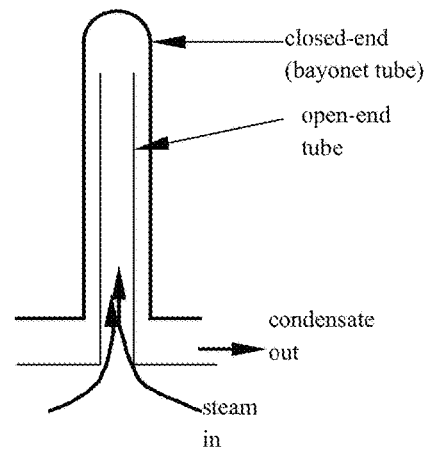

FIGS. 14A and 14B depict bayonet type vaporizers. FIG. 14A depicts a typical vaporizer. A depicts an inlet for the process stream being vaporized. B is an outlet for the same stream. C is a vent. D and E represent level gauge and level control connections respectively. F is a side drain. Steam enters through H. Condensate is removed through G via chest drain.

FIG. 14B depicts a bayonet type tube. Steam enters the inner tube and flows upward. The top of the inner tube is open so the steam flows downward in the annular space. The steam is condensed in this area. The level liquid level (condensate) is controlled below top of bayonet tubes. A small amount of vapor superheat is possible as a portion of the bayonet tube extends above the liquid level and continues to heat the vaporized process stream.

Problems Encountered—Generally

Heat exchangers are subjected to various issues, including but not limited to maldistribution, thermal stress, fouling, strain, vibrations, and corrosion, which can affect their performance or result in cross leakage and ultimately failure of components of the heat exchange unit.

For example, corrosive agents in flow streams through the heat exchanger may corrode tubes or plates, compromising their integrity, resulting in cross-leaks or leaks to the outside. Fouling is the accumulation of unwanted substances on surfaces inside the tubes, outside the tubes, or on surfaces of plates. Fouling or formation of a thin coating adds resistance to heat transfer. Fouling can lead to plugging that can ultimately lead to higher pressure drop, reduced capacity or throughput, and to a blockage of the flow. Plugging may also occur from feed material that accumulates on the inside of tubes or channels. Fouling and plugging may also lead to flow maldistribution. Flow maldistribution may lead to poor performance, or to thermal stresses that can cause mechanical damage. Other damage potentially caused by fouling includes permanent damage to the exchanger bundle, where the insides of tubes, or outsides of tube, or plate channels cannot be effectively cleaned, in these cases, the exchanger, or the bundle, may need to be replaced. Damage to the process, for example not meeting product specifications, and damage to downstream equipment, for example fired heaters or reactors, may also result from fouling of a heat exchanger.

Mechanical damage, corrosion, failure of internal sealing devices, and thermal or mechanical stresses to the heat exchanger may all lead to cross-leakage, in particular in areas of connections between different parts and/or different metallurgies.

Tubes, plates, flanges, and pressure boundary materials may be subjected to strain due to thermal stresses. Thermal stresses are stresses caused by differential thermal growth between parts that are at different temperatures or of different materials, due to excessively high or low temperatures, or an excessive temperature differential (delta), or rapid changes in temperature conditions between streams in the heat exchanger, or maldistribution of flow within the heat exchanger (e.g., coolant flowing to some passages or tubes, and not to others).

Hot spots may form due to fouling, or maldistribution from many potential causes, and in addition to thermal stresses, may result in weakening and ultimately failure of the material.

Representative locations of, for example, possible maldistribution (uneven flow), corrosion, fouling, thermal stresses, potential corrosion or foulants, and vibration, are indicated in the figures. These are representative locations and not intended to be encompassing of all possible areas that may be subjected to various stresses or problems.

Monitoring

Monitoring the heat exchangers and the processes using heat exchangers may be performed to determine if problems are occurring, if equipment failures are imminent, if there is vibration, if there is maldistribution, if there is fouling, or the like. Monitoring also helps to collect data that can be correlated and used to predict behavior or problems in different heat exchangers used in the same plant or in other plants and/or processes.

There may or may not be anything that can be done to correct issues or problems associated with the issues in existing equipment, depending on the cause of the issues. In some aspects, process changes or operating conditions may be able to be altered to preserve the equipment until the next scheduled maintenance period. For example, streams may be monitored for corrosive contaminants, and pH may be monitored in order to predict higher than normal corrosion rates within the heat exchanger equipment. Tracking production rates, flow rates, and/or temperature may indicate issues with flows. For example, as fouling occurs, the production rate may fall if a specific outlet temperature can no longer be achieved at the targeted capacity and capacity has to be reduced to maintain the targeted outlet temperature.

Sensor Data Collection and Processing

Figure 17A:
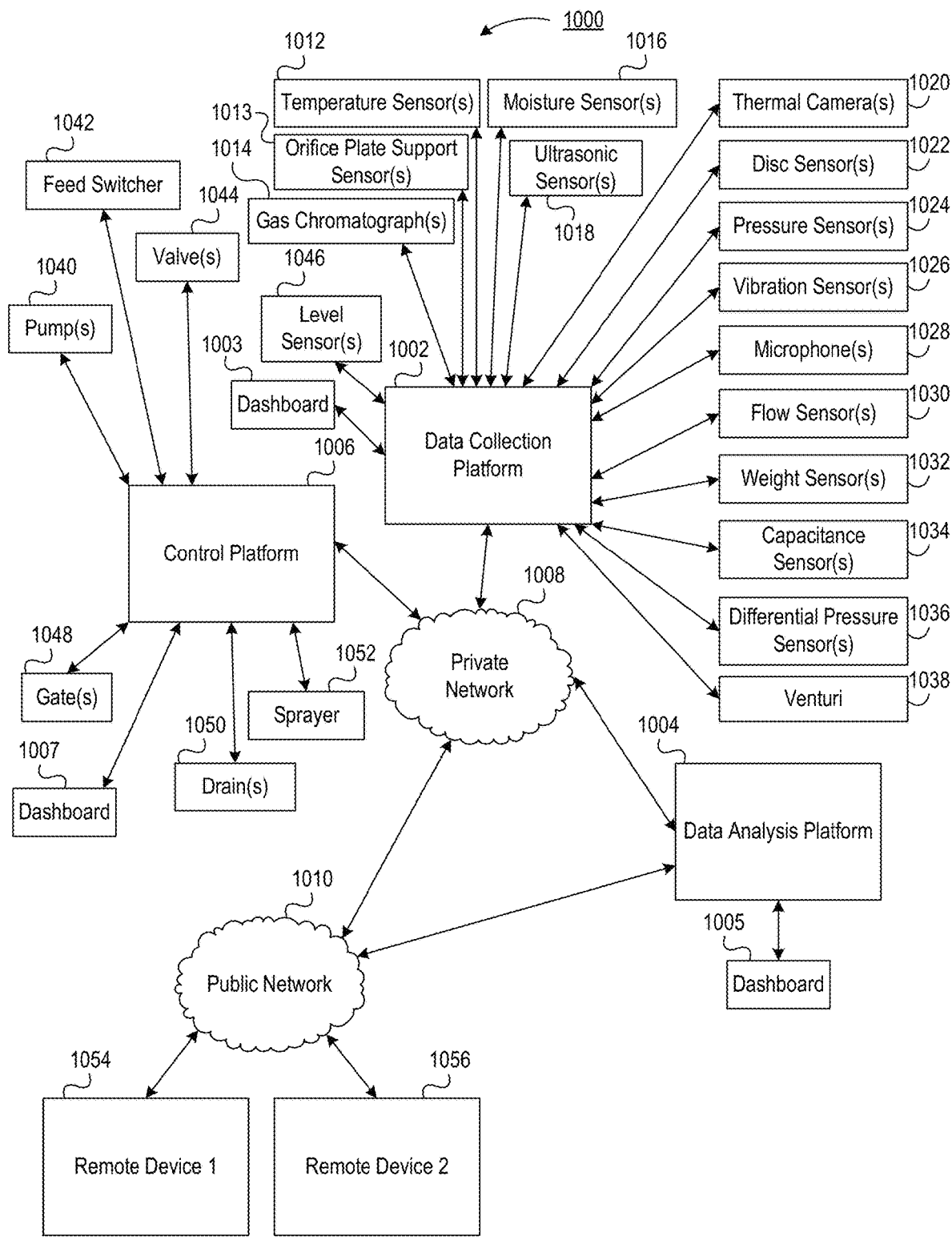
FIG. 17A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 17A depicts an illustrative computing system that may be implemented at one or more components, pieces of equipment (e.g., heat exchanger), and/or plants. FIG. 17A-FIG. 17E (hereinafter collectively "FIG. 17"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 17A depicts an illustrative operating environment in which various aspects of the present disclosure may be implemented in accordance with example embodiments. The computing system environment 1000 illustrated in FIG. 17A is only one example of a suitable computing environment and is not intended to suggest any limitation as to the scope of use or functionality contained in the disclosure. The computing system environment 1000 may include various sensor, measurement, and data capture systems, a data collection platform 1002, a data analysis platform 1004, a control platform 1006, one or more networks, one or more remote devices 1054, 1056, and/or one or more other elements. The numerous elements of the computing system environment of FIG. 17A may be communicatively coupled through one or more networks. For example, the numerous platforms, devices, sensors, and/or components of the computing system environment may be communicatively coupled through a private network 1008. The sensors be positioned on various components in the plant and may communicate wirelessly or wired with one or more platforms illustrated in FIG. 17A. The private network 1008 may include, in some examples, a network firewall device to prevent unauthorized access to the data and devices on the private network 1008. Alternatively or additionally, the private network 1008 may be isolated from external access through physical means, such as a hard-wired network with no external, direct access point. The data communicated on the private network 1008 may be optionally encrypted for further security. Depending on the frequency of collection and transmission of sensor measurements and other data to the data collection platform 1002, the private network 1008 may experience large bandwidth usage and be technologically designed and arranged to accommodate for such technological issues. Moreover, the computing system environment 1000 may also include a public network 1010 that may be accessible to remote devices (e.g., remote device 1054, remote device 1056). In some examples, a remote device may be located not in the proximity (e.g., more than one mile away) of the various sensor, measurement, and data capture systems illustrated in FIG. 17A. In other examples, the remote device may be physically located inside a plant, but restricted from access to the private network 1008; in other words, the adjective "remote," need not necessarily require the device to be located at a great distance from the sensor systems and other components.

Although the computing system environment of FIG. 17A illustrates logical block diagrams of numerous platforms and devices, the disclosure is not so limited. In particular, one or more of the logical boxes in FIG. 17 may be combined into a single logical box or the functionality performed by a single logical box may be divided across multiple existing or new logical boxes. For example, aspects of the functionality performed by the data collection platform 1002 may be incorporated into one or each of the sensor devices illustrated in FIG. 17A. As such, the data collection may occur local to the sensor device, and the enhanced sensor system may communicate directly with one or more of the control platform 1006 and/or data analysis platform 1004. An illustrative example of such an embodiment is contemplated by FIG. 17A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 17A may be combined into an enhanced, multi-purpose sensor system. Such a combined sensor system may provide economies of scale with respect to hardware components such as processors, memories, communication interfaces, and others.

In yet another example, the data collection platform 1002 and data analysis platform 1004 may reside on a single server computer and depicted as a single, combined logical box on a system diagram. Moreover, a data store may be illustrated in FIG. 17A separate and apart from the data collection platform 1002 and data analysis platform 1004 to store a large amount of values collected from sensors and other components. The data store may be embodied in a database format and may be made accessible to the public network 1010; meanwhile, the control platform 1006, data collection platform 1002, and data analysis platform 1004 may be restricted to the private network 1008 and left inaccessible to the public network 1010. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 1010.

Referring to FIG. 17A, process measurements from various sensor and monitoring devices may be used to monitor conditions in, around, and on process equipment (e.g., heat exchanger). Such sensors may include, but are not limited to, pressure sensors 1024, differential pressure sensors 1036, various flow sensors (including but not limited to orifice plate type 1013, disc sensors 1022, venturi 1038, other flow sensors 1030), temperature sensors 1012 including thermal cameras 1020 and skin thermocouples, capacitance sensors 1034, weight sensors 1032, gas chromatographs 1014, moisture sensors 1016, ultrasonic sensors 1018, position sensors, timing sensors, vibration sensors 1026, microphones 1028, level sensors 1046, liquid level (hydraulic fluid) sensors, and other sensors used in the refining and petrochemical industry. Further, process laboratory measurements may be taken using gas chromatographs 1014, liquid chromatographs, distillation measurements, octane measurements, and other laboratory measurements. System operational measurements also can be taken to correlate the system operation to the heat exchanger measurements.

In addition, sensors may include transmitters and/or deviation alarms. One or more sensors may be programmed to set off an alarm or alert. For example, if an actuator fails, sensor data may be used to automatically trigger an alarm or alert (e.g., an audible alarm or alert, a visual alarm or alert). Other sensors may transmit signals to a processor or a hub that collects the data and sends to a processor. For example, temperature and pressure measurements may be sent to a hub (e.g., data collection platform 1002). In one or more embodiments, temperature sensors 1012 may include thermocouples, fiber optic temperature measurement, thermal cameras 1020, and/or infrared cameras. Skin thermocouples may be applied to heat exchanger casing, or alternatively, to tubes, plates, or placed directly on a wall of a heat exchanger component. Alternatively, thermal (infrared) cameras 1020 may be used to detect temperature (e.g., hot spots) in all aspects of the equipment, including bundles (tubes). A shielded (insulated) tube skin thermocouple assembly may be used to obtain accurate measurements. One example of a thermocouple may be a removable XTRACTO Pad. A thermocouple can be replaced without any additional welding. Clips and/or pads may be used for ease of replacement. Fiber Optic cable can be attached to the pipe, line, and/or vessel to provide a complete profile of temperatures.

Returning to FIG. 14A, sensors may be also used throughout a plant or heat exchanger to detect and monitor various issues such as maldistribution, thermal stresses, vibration, fouling, and plugging. Sensors might be able to detect whether feed composition into the exchanger, such as pH, are outside of acceptable ranges leading to a corrosive environment or whether consumption of sacrificial anodes (in water services) is nearing completion and resulting in a corrosive environment. Sensors detecting outlet temperatures and pressure drops may be used to determine/predict flow and production rate changes.

Furthermore, flow sensors may be used in flow paths such as the inlet to the path, outlet from the path, or within the path. If multiple tubes are used, the flow sensors may be placed in corresponding positions in each of the tubes. In this manner, one can determine if one of the tubes is behaving abnormally compared to one or more other tubes. Flow may be determined by pressure-drop across a known resistance, such as by using pressure taps. Other types of flow sensors include, but are not limited to, ultrasonic, turbine meter, hot wire anemometer, vane meter, Kármán™, vortex sensor, membrane sensor (membrane has a thin film temperature sensor printed on the upstream side, and one on the downstream side), tracer, radiographic imaging (e.g., identify two-phase vs. single-phase region of channels), an orifice plate (e.g., which may, in some examples, be placed in front of or be integral to one or more tubes or channels), pitot tube, thermal conductivity flow meter, anemometer, internal pressure flow profile, and/or measure cross tracer (measuring when the flow crosses one plate and when the flow crosses another plate).

The effect of flow vibrations may be detected and/or corrected. If the flow through the exchanger is not uniform, then high flow velocities can cause local vibration. This vibration can damage parts of the exchanger, such as tube, by many mechanisms, leading to leakage or cross-leakage of exchangers. Flow-induced vibration is a large source of failure in shell and tube heat exchangers. Fluttering or resonance in the tubes may cause vibration. In addition, equipment-induced vibration, such as mechanical vibration (e.g., from nearby equipment, such as air compressors or refrigeration machines, or from loose support structures) can cause a variety of damage. For example, welded pieces may crack or break loose. Mechanical vibration can cause tube failures (e.g., in the form of a fatigue stress crack or erosion of tubing at the point of contact with baffles). Flow vibration can lead to mal-distribution and cross-leakage. Flow vibration can accelerate dislodging of corrosion particles leading to further corrosion or blocked flow. Flow vibration may ultimately crack plates, tubes, and baffles. Vibration may be detected with vibration sensors attached to the equipment such as plates, tubes, baffles, or shells. Flow vibration may further be detected using flow and pressure sensors in order to detect abnormalities in flow and pressure drop. In some embodiments, an enhanced sensor system may comprise numerous of the aforementioned sensors in a single system component to provide improved sensory measurements and analytics.

In another example, strain sensors may measure the strain on a part. For example, a strain gauge may be built into heat exchanger plates and headers. Measurements from such gauges may indicate whether a plate may be getting ready to leak (pre-leakage), provide a prediction of cross-leakage, or fail completely. Electrical strain gauges, for example, are thin, rectangular-shaped strips of foil with maze-like wiring patterns on them leading to a couple of electrical cables. A strain gauge may be more sensitive in a particular direction (e.g., a strain gauge may be more sensitive in a horizontal direction than a vertical direction, or may be more sensitive in a vertical direction than a horizontal direction). A strain gauge may include an electrical conductor (e.g., foil, semiconductor, or nanoparticle). The electrical conductor is applied to a component. When the component is strained, its width is changed. Specifically, for example, when the electrical conductor is subjected to a strain (e.g., compression or stretching) in a particular direction, the electrical conductor may increase or decrease in electrical conductivity. The gauge's resistance will experience a corresponding change (increased or decreased electrical conductivity), which allows for an amount of induced stress on the strain gauge to be determined when a voltage is applied to the gauge.

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species, oxygen, hydrogen, and/or water (moisture). Chemical sensors may use gas chromatographs, liquid chromatographs, distillation measurements, and/or octane measurements. In another example, equipment information, such as wear, efficiency, production, state, or other condition information, may be gathered and determined based on sensor data. Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to use, but a monitoring schedule may be adjusted. Alternatively or additionally, one or more inputs or controls relating to a process may be adjusted as part of the corrective action. These and other details about the equipment, sensors, processing of sensor data, and actions taken based on sensor data are described in further detail below.

Monitoring the heat exchangers and the processes using heat exchangers includes collecting data that can be correlated and used to predict behavior or problems in different heat exchangers used in the same plant or in other plants and/or processes. Data collected from the various sensors (e.g., measurements such as flow, pressure drop, thermal performance, vessel skin temperature at the top, expansion bellows leak, vibration, etc.) may be correlated with external data, such as environmental or weather data. Process changes or operating conditions may be able to be altered to preserve the equipment until the next scheduled maintenance period. Fluids may be monitored for corrosive contaminants and pH may be monitored in order to predict higher than normal corrosion rates within the heat exchanger equipment. At a high level, sensor data collected (e.g., by the data collection platform) and data analysis (e.g., by the data analysis platform) may be used together, for example, for process simulation, equipment simulation, and/or other tasks. For example, sensor data may be used for process simulation and reconciliation of sensor data. The resulting, improved process simulation may provide a stream of physical properties that are used to calculate heat flow, etc. These calculations may lead to thermal and pressure drop performance prediction calculations for specific equipment, and comparisons of equipment predictions to observations from the operating data (e.g., predicted/expected outlet temperature and pressure vs. measured outlet temperature and pressure). This causes identification of one or more of fouling, maldistribution, and/or other issues that eventually lead to a potential control changes and/or recommendation etc.

Systems Facilitating Sensor Data Collection

Sensor data may be collected by a data collection platform 1002. The sensors may interface with the data collection platform 1002 via wired or wireless transmissions. The data collection platform 1002 may continuously or periodically (e.g., every second, every minute, every hour, every day, once a week, once a month) transmit collected sensor data to a data analysis platform 1004, which may be nearby or remote from the data collection platform 1002.

Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a known hot spot may be collected at a first interval, and data at a spot that is not a known hot spot may be collected at a second interval. The data collection platform may transmit collected sensor data to a data analysis platform, which may be nearby or remote from the data collection platform.

Figure 17B:
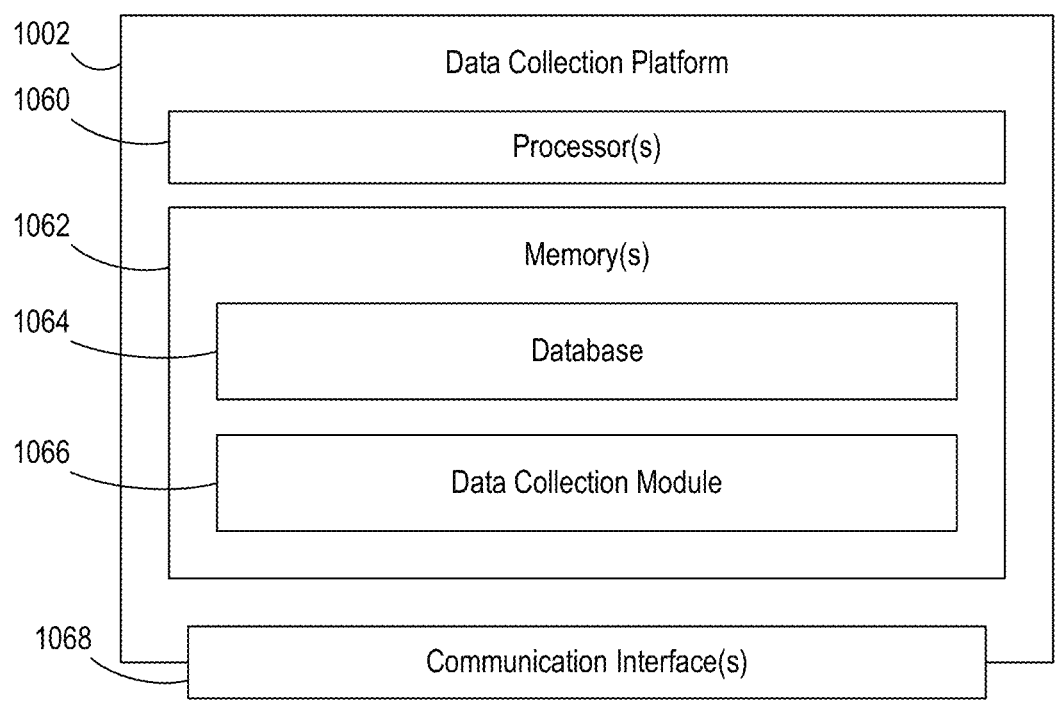
FIG. 17B depicts an illustrative data collection computing platform for collecting data related to the operation of one or more pieces of equipment in a plant in accordance with one or more example embodiments.
Figure 17C:
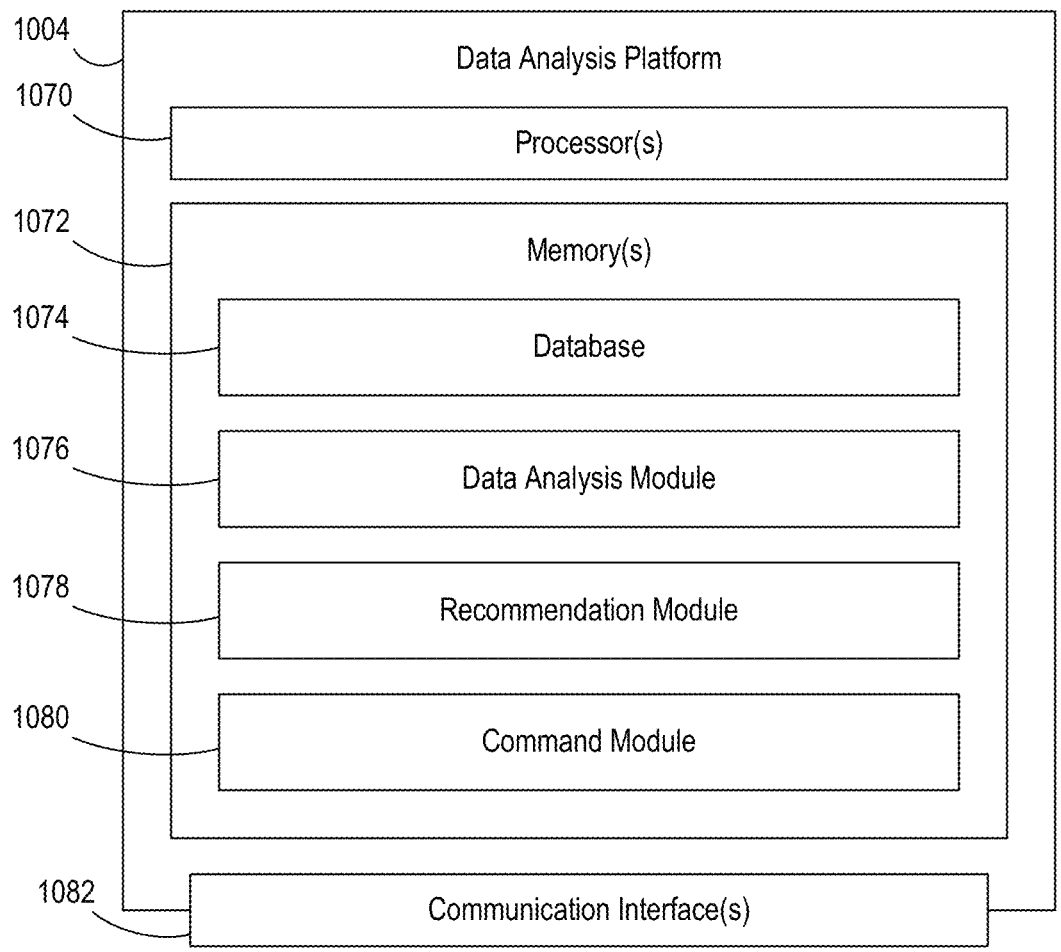
FIG. 17C depicts an illustrative data analysis computing platform for analyzing data related to the operation of one or more pieces of equipment in a plant in accordance with one or more example embodiments.
Figure 17D:
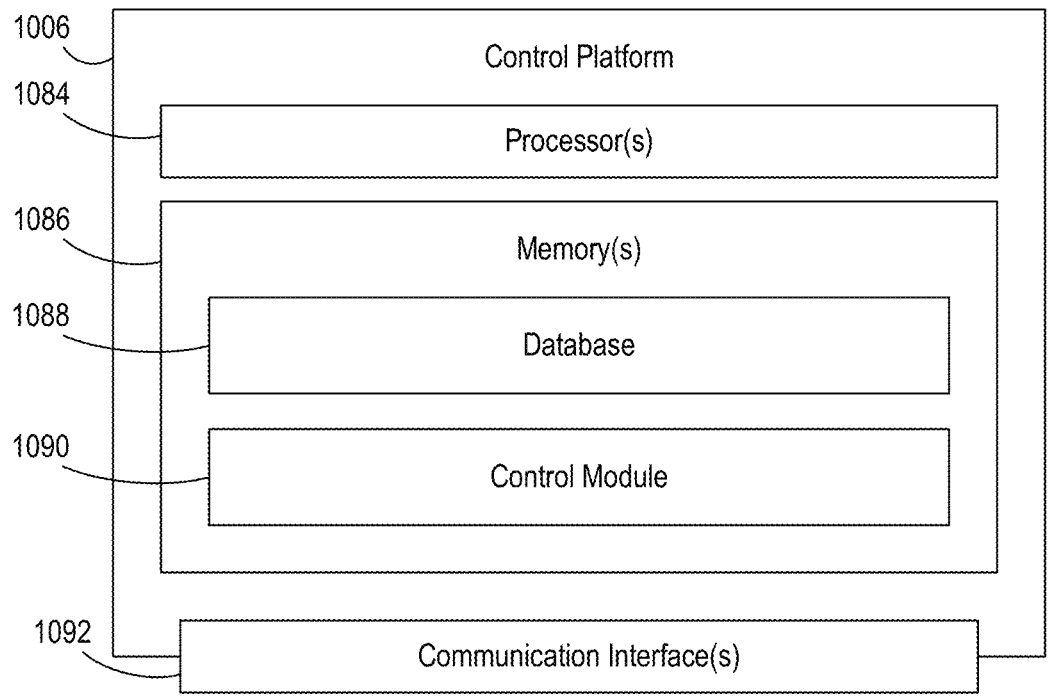
FIG. 17D depicts an illustrative data analysis computing platform for analyzing data related to the operation of one or more pieces of equipment in a plant in accordance with one or more example embodiments.
Figure 17E:
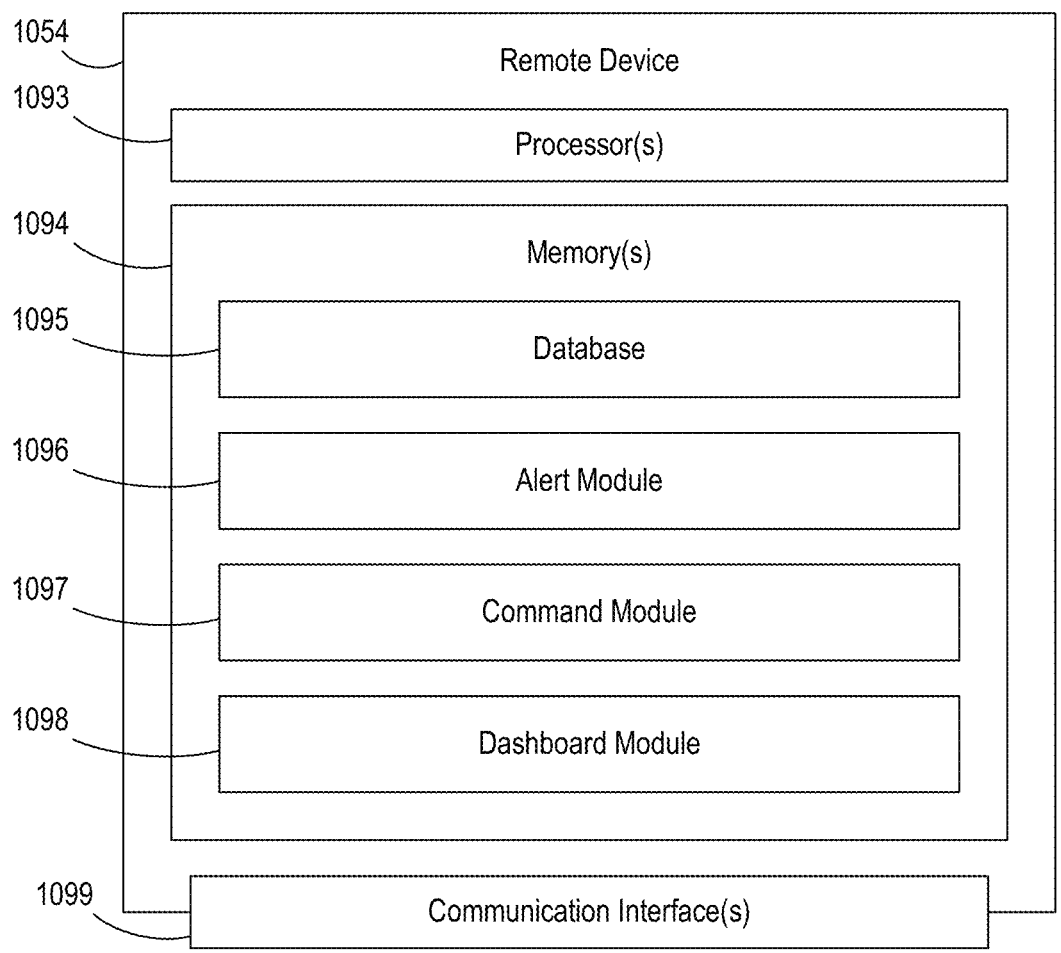
FIG. 17E depicts an illustrative control computing platform for controlling one or more parts of one or more pieces of equipment in a plant in accordance with one or more example embodiments.

The computing system environment of FIG. 17A includes logical block diagrams of numerous platforms and devices that are further elaborated upon in FIG. 17B, FIG. 17C, FIG. 17D, and FIG. 17E. FIG. 17B is an illustrative data collection platform 1002. FIG. 17C is an illustrative data analysis platform 1004. FIG. 17D is an illustrative control platform 1006. FIG. 17E is an illustrative remote device 1054. These platforms and devices of FIG. 17 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIG. 17 may include one or more memories include any of a variety of computer-readable media. Computer-readable media may be any available media that may be accessed by the data collection platform 1002, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform 1002. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 17 may include one or more communication interfaces including, but are not limited to, a microphone, keypad, keyboard, touch screen, and/or stylus through which a user of a computer (e.g., a remote device) may provide input, and may also include a speaker for providing audio output and a video display device for providing textual, audiovisual and/or graphical output. Input may be received via one or more graphical user interfaces, which may be part of one or more dashboards (e.g., dashboard 1003, dashboard 1005, dashboard 1007). The communication interfaces may include a network controller for electronically communicating (e.g., wirelessly or wired) over a public network 1010 or private network 1008 with one or more other components on the network. The network controller may include electronic hardware for communicating over network protocols, including TCP/IP, UDP, Ethernet, and other protocols.

In some examples, one or more sensor devices in FIG. 17A may be enhanced by incorporating functionality that may otherwise be found in a data collection platform 1002. These enhanced sensor system may provide further filtering of the measurements and readings collected from their sensor devices. For example, with some of the enhanced sensor systems in the operating environment illustrated in FIG. 17A, an increased amount of processing may occur at the sensor so as to reduce the amount of data needing to be transferred over a private network 1008 in real-time to a computing platform. The enhanced sensor system may filter at the sensor itself the measured/collected/captured data and only particular, filtered data may be transmitted to the data collection platform 1002 for storage and/or analysis.

Referring to FIG. 17B, in one or more embodiments, a data collection platform 1002 may include one or more processors 1060, one or more memories 1062, and communication interfaces 1068. The memory 1062 may include a database 1064 for storing data records of various values collected from one or more sources. In addition, a data collection module 1066 may be stored in the memory 1062 and assist the processor 1060 in the data collection platform 1002 in communicating with, via the communications interface 1068, one or more sensor, measurement, and data capture systems, and processing the data received from these sources. In some embodiments, the data collection module 1066 may include computer-executable instructions that, when executed by the processor 1060, cause the data collection platform 1002 to perform one or more of the steps disclosed herein. In other embodiments, the data collection module 1066 may be a hybrid of software-based and/or hardware-based instructions to perform one or more of the steps disclosed herein. In some examples, the data collection module 1066 may assist an enhanced sensor system with further filtering the measurements and readings collected from the sensor devices. Although the elements of FIG. 17B are illustrated as logical block diagrams, the disclosure is not so limited. In particular, one or more of the logical boxes in FIG. 17B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1064 in FIG. 17B is illustrated as being stored inside one or more memories 1062 in the data collection platform 1002, FIG. 17B contemplates that the database 1064 may be stored in a standalone data store communicatively coupled to the data collection module 1066 and processor 1060 of the data collection platform 1002 via the communications interface 1068 of the data collection platform 1002.

In addition, the data collection module 1066 may assist the processor 1060 in the data collection platform 1002 in communicating with, via the communications interface 1068, and processing data received from other sources, such as data feeds from third-party servers and manual entry at the field site from a dashboard graphical user interface (e.g., via dashboard 1003). For example, a third-party server may provide contemporaneous weather data to the data collection module. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (e.g., via dashboard 1003) (or other means) may be collected and saved into memory by the data collection module. Production rates may be entered and saved in memory. Tracking production rates may indicate issues with flows. For example, as fouling occurs, the production rate may fall if a specific outlet temperature can no longer be achieved at the targeted capacity and capacity has to be reduced to maintain the targeted outlet temperature.

Referring to FIG. 17C, in one or more embodiments, a data analysis platform 1004 may include one or more processors 1070, one or more memories 1072, and communication interfaces 1082. The memory 1072 may include a database 1074 for storing data records of various values collected from one or more sources. Alternatively or additionally, the database 1074 may be the same database as that depicted in FIG. 17B and the data analysis platform 1004 may communicatively couple with the database 1074 via the communication interface of the data analysis platform 1004. At least one advantage of sharing a database between the two platforms is the reduced memory requirements due to not duplicating the same or similar data. In addition, a data analysis module 1076 may be stored in the memory 1072 and assist the processor 1070 in the data analysis platform 1004 in processing and analyzing the data values stored in the database 1074. In some embodiments, the data analysis module 1076 may include computer-executable instructions that, when executed by the processor 1070, cause the data analysis platform 1004 to perform one or more of the steps disclosed herein. In other embodiments, the data analysis module 1076 may be a hybrid of software-based and/or hardware-based instructions to perform one or more of the steps disclosed herein. In some embodiments, the data analysis module 1076 may perform statistical analysis, predictive analytics, and/or machine learning on the data values in the database 1074 to generate predictions and models. For example, the data analysis platform 1004 may analyze sensor data to detect new hot spots and/or to monitor existing hot spots (e.g., to determine if an existing hot spot is growing, maintaining the same size, or shrinking) in the equipment of a plant. The data analysis platform 1004 may compare temperature or other data from different dates to determine if changes are occurring. Such comparisons may be made on a monthly, weekly, daily, hourly, real-time, or some other basis.

Referring to FIG. 17C, the recommendation module 1078 in the data analysis platform 1004 may coordinate with the data analysis module 1076 to generate recommendations for adjusting one or more parameters for the operation of the plant environment depicted in FIG. 17A. In some embodiments, the recommendation module 1078 may communicate the recommendation to the command module 1080, which may generate command codes that may be transmitted, via the communications interface, to cause adjustments or halting/starting of one or more operations in the plant environment. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute on them.

Although the elements of FIG. 17C are illustrated as logical block diagrams, the disclosure is not so limited. In particular, one or more of the logical boxes in FIG. 17C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 17C as being stored inside one or more memories in the data analysis platform 1004, FIG. 17C contemplates that the database may be stored in a standalone data store communicatively coupled to the data analysis module and processor of the data analysis platform 1004 via the communications interface of the data analysis platform 1004. Furthermore, the databases from multiple plant locations may be shared and holistically analyzed to identify one or more trends and/or patterns in the operation and behavior of the plant and/or plant equipment. In such a crowd sourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 17D, in one or more embodiments, a control platform 1006 may include one or more processors 1084, one or more memories 1086, and communication interfaces 1092. The memory 1086 may include a database 1088 for storing data records of various values transmitted from a user interface, computing device, or other platform. The values may include parameter values for particular equipment at the plant. For example, some illustrative equipment at the plant that may be configured and/or controlled by the control platform 1006 include, but is not limited to, a feed switcher 1042, sprayer 1052, one or more valves 1044, one or more pumps 1040, one or more gates 1048, and/or one or more drains 1050. In addition, a control module 1090 may be stored in the memory and assist the processor in the control platform 1006 in receiving, storing, and transmitting the data values stored in the database. In some embodiments, the control module 1090 may include computer-executable instructions that, when executed by the processor 1084, cause the control platform 1006 to perform one or more of the steps disclosed herein. In other embodiments, the control module may be a hybrid of software-based and/or hardware-based instructions to perform one or more of the steps disclosed herein.

In a plant environment such as illustrated in FIG. 17A, if sensor data is outside of a safe range, this may be cause for immediate danger. As such, there may be a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated or received by the alert module in FIG. 17E.

Referring to FIG. 17E, in one or more embodiments, a remote device 1054 may include one or more processors 1093, one or more memories 1094, and communication interfaces 1099. The memory 1094 may include a database 1095 for storing data records of various values entered by a user or received through the communications interface. In addition, an alert module 1096, command module 1097, and/or dashboard module 1098 may be stored in the memory 1094 and assist the processor 1093 in the remote device 1054 in processing and analyzing the data values stored in the database. In some embodiments, the aforementioned modules may include computer-executable instructions that, when executed by the processor, cause the remote device 1054 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to odd sensor readings. The command module 1097 in the remote device 1054 may generate a command that when transmitted through the communications interface to the platforms at the plant, causes adjusting of one or more parameter operations of the plant environment depicted in FIG. 17A. In some embodiments, the dashboard module 1098 may display a graphical user interface to a user of the remote device 1054 to enable the user to enter desired parameters and/or commands. These parameters/commands may be transmitted to the command module 1097 to generate the appropriate resulting command codes that may be then transmitted, via the communications interface, to cause adjustments or halting/starting of one or more operations in the plant environment. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute them.

Although FIG. 17E is not so limited, in some embodiments the remote device 1054 may include a desktop computer, a smartphone, a wireless device, a tablet computer, a laptop computer, and/or the like. The remote device 1054 may be physically located locally or remotely, and may be connected by one of communications links to the public network 1010 that is linked via a communications link to the private network 1008. The network used to connect the remote device 1054 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network 1008 (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 17E are illustrated as logical block diagrams, the disclosure is not so limited. In particular, one or more of the logical boxes in FIG. 17E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 17E as being stored inside one or more memories in the remote device 1054, FIG. 17E contemplates that the database may be stored in a standalone data store communicatively coupled, via the communications interface, to the modules stored at the remote device 1054 and processor of the remote device 1054.

Referring to FIG. 17, in some examples, the performance of operation in a plant may be improved by using a cloud computing infrastructure and associated methods, as described in US Patent Application Publication No. US2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies, which may be acted upon to optimize impact.

The aforementioned cloud computing infrastructure may use a data collection platform 1002 associated with a plant to capture data, e.g., sensor measurements, which may be automatically sent to the cloud infrastructure, which may be remotely located, where it may be reviewed to, for example, eliminate errors and biases, and used to calculate and report performance results. The data collection platform 1002 may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant is/are compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform 1004 may include an analysis unit that determines operating status, based on at least one of a kinetic model, a parametric model, an analytical tool, and/or a related knowledge and/or best practice standard. The analysis unit may receive historical and/or current performance data from one or a plurality of plants to proactively predict one or more future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally in yet another example, one or more of the aforementioned examples may be performed with or without a combination of the other examples.

The plant process model predicts plant performance that is expected based upon the plant operation information. The plant process model results can be used to monitor the health of the plant and to determine whether any upset or poor measurement occurred. The plant process model is desirably generated by an iterative process that models at various plant constraints to determine the desired plant process model.

Using a web-based system for implementing the method of this disclosure may provide one or more benefits, such as improved plant performance due to an increased ability by plant operators to identify and capture opportunities, a sustained ability to bridge plant performance gaps, and/or an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one or more embodiments, the system is performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 18A:
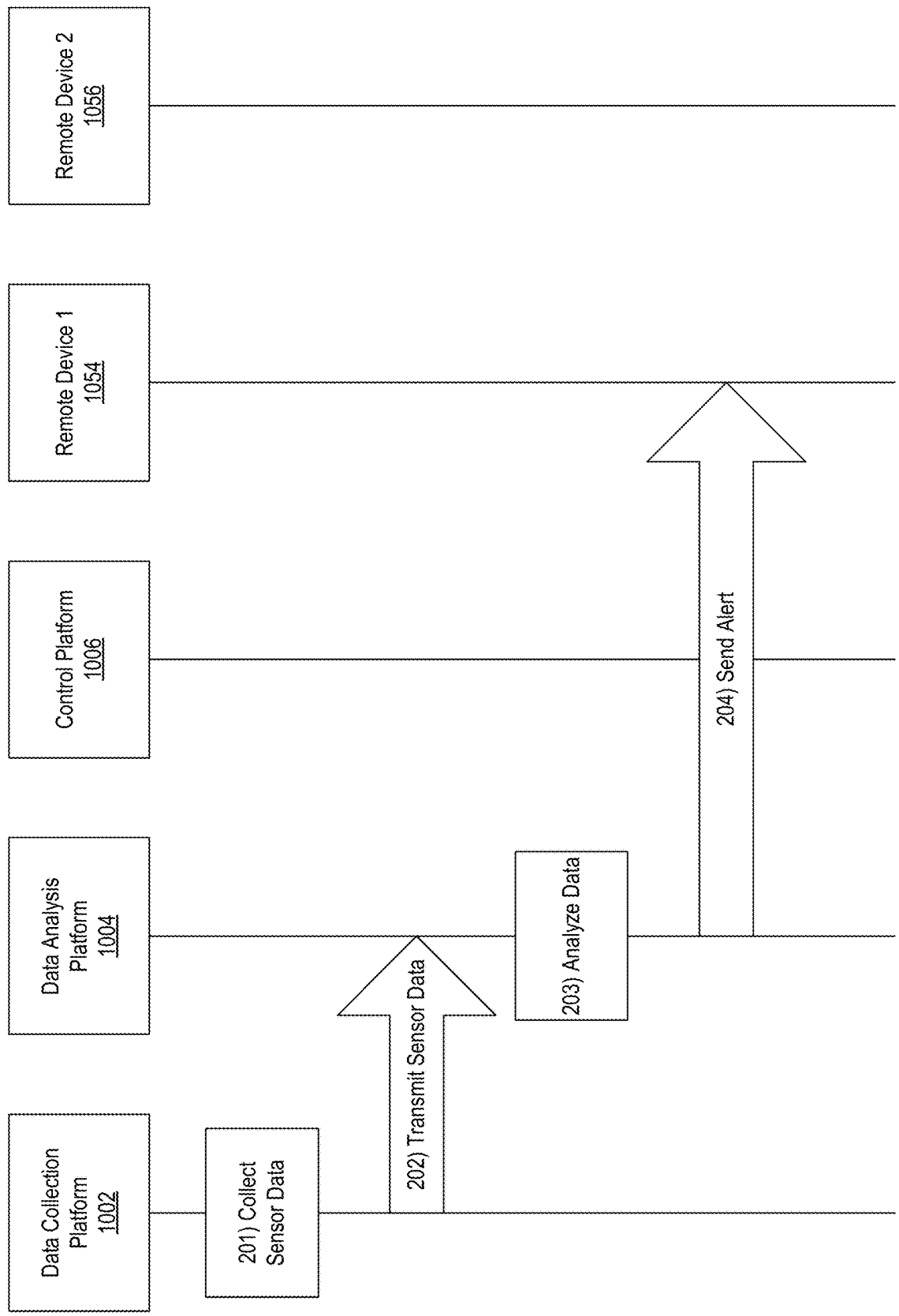
FIGS. 18A-18B depict an illustrative flow diagram of one or more steps that one or more devices may perform in controlling one or more aspects of a plant operation in accordance with one or more example embodiments.
Figure 18B:
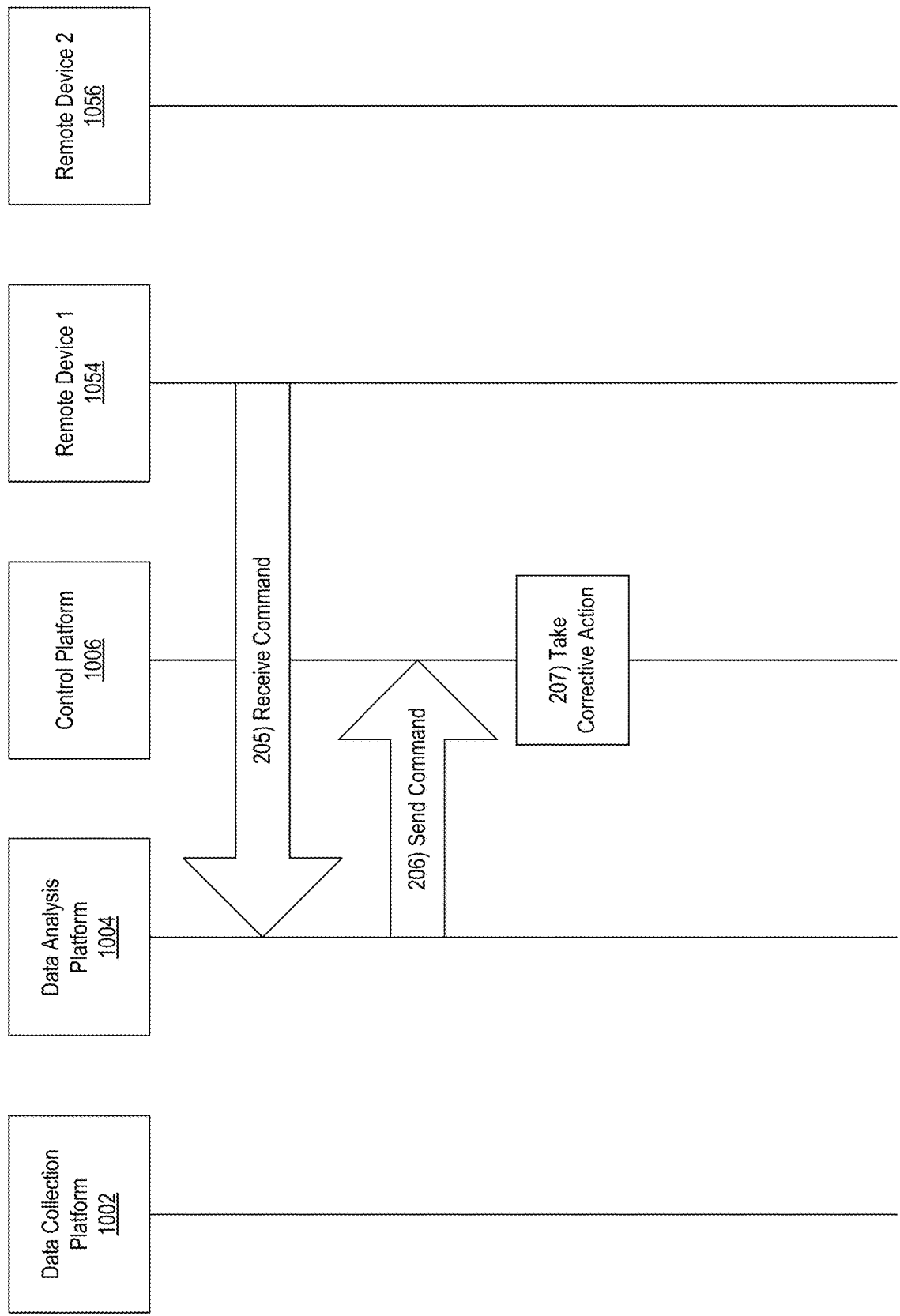

FIGS. 18A-18B depict illustrative system flow diagrams in accordance with one or more embodiments described herein. As shown in FIG. 18A, in step 201, data collection platform 1002 may collect sensor data. In step 202, data collection platform 1002 may transmit sensor data to data analysis platform 1004. In step 203, data analysis platform 1004 may analyze data. In step 204, data analysis platform 1004 may send an alert to remote device 1054 and/or remote device 1056.

As shown in FIG. 18B, in step 205, data analysis platform 1004 may receive a command from remote device 1054 and/or remote device 1056. In some embodiments, the control platform 1006 may receive the command from remote device 1054 and/or remote device 1056. In step 206, data analysis platform 1004 may send a command to control platform 1006. In some embodiments, the command may be similar to the command received from remote device 1054 and/or remote device 1056. In some embodiments, data analysis platform 1004 may perform additional analysis based on the received command from remote device 1054 and/or remote device 1056 before sending a command to control platform 1006. In step 207, control platform 1006 may take corrective action. The corrective action may be based on the command received from data analysis platform 1004, remote device 1054, and/or remote device 1056. The corrective action may be related to one or more pieces of equipment (e.g., heat exchanger) associated with sensors that collected the sensor data in step 201.

Figure 21:
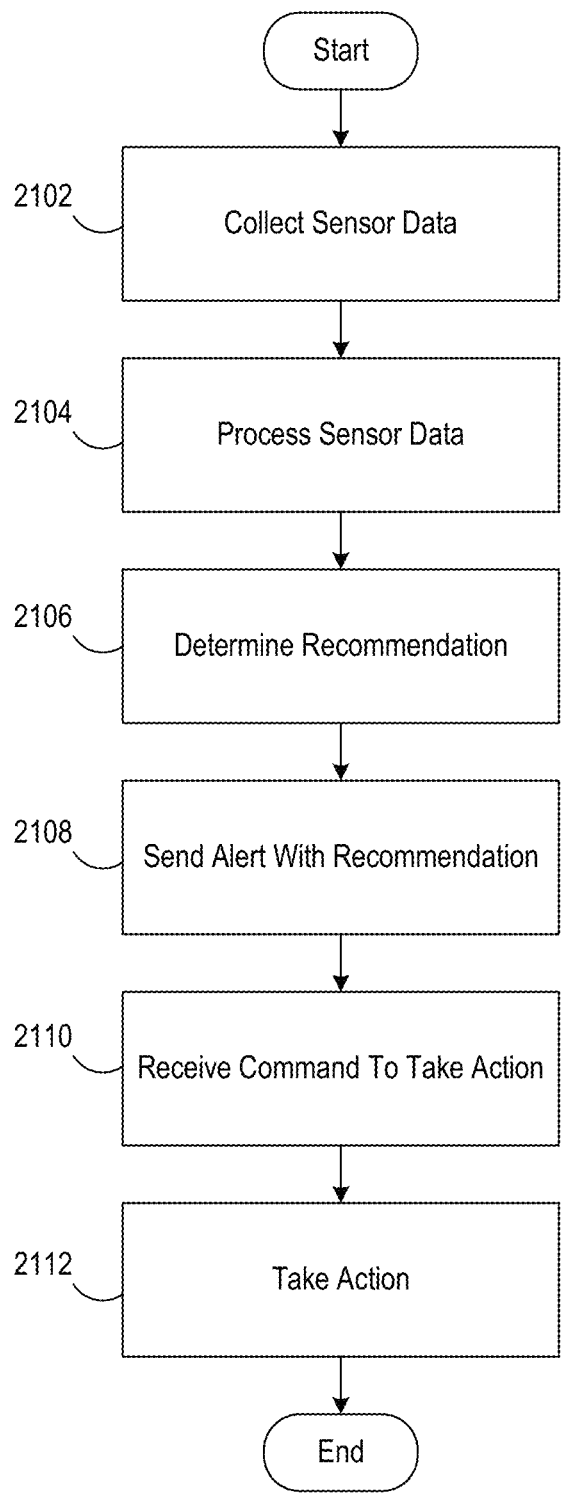
FIG. 21 depicts an illustrative flowchart of a process that one or more devices may perform in controlling one or more aspects of a plant operation in accordance with one or more example embodiments.

FIG. 21 depicts an illustrative flow diagram in accordance with one or more embodiments described herein. The flow may be performed by one or more devices, which may be interconnected via one or more networks.

First, the one or more devices may collect 2102 sensor data. The sensor data may be from one or more sensors attached to one or more pieces of equipment (e.g., a heat exchanger) in a plant. The sensor data may be locally collected and processed and/or may be locally collected and transmitted for processing. The data may be collected on a periodic basis.

After the sensor data is collected, the one or more devices may process 2104 the sensor data. The one or more devices may compare the data to past data from the one or more pieces of equipment, other pieces of equipment at a same plant, one or more pieces of equipment at a different plant, manufacturer recommendations or specifications, or the like.

After the sensor data is processed, the one or more devices may determine 2106 one or more recommendations based on the sensor data. The one or more recommendations may include recommendations of one or more actions to take based on the sensor data.

The one or more devices may send 2108 one or more alerts, which may include the determined recommendation. The one or more alerts may include information about the sensor data, about other data, or the like.

The data taken from one or more of the various sensors may be correlated with weather and environmental data to determine predictive models of potential problems in the current heat exchanger, and/or other heat exchanger used in different processes and environments.

The one or more devices may receive 2110 a command to take an action (e.g., the recommended action, an action other than the recommended action, or no action). After receiving the command, the one or more devices may take 2112 the action. The action may, in some embodiments, include one or more corrective actions, which may cause one or more changes in the operation of the one or more pieces of equipment. The corrective action(s) may be taken automatically or after user confirmation, and/or the corrective action(s) may be taken without an accompanying alert being generated (and vice-versa).

Figure 19:
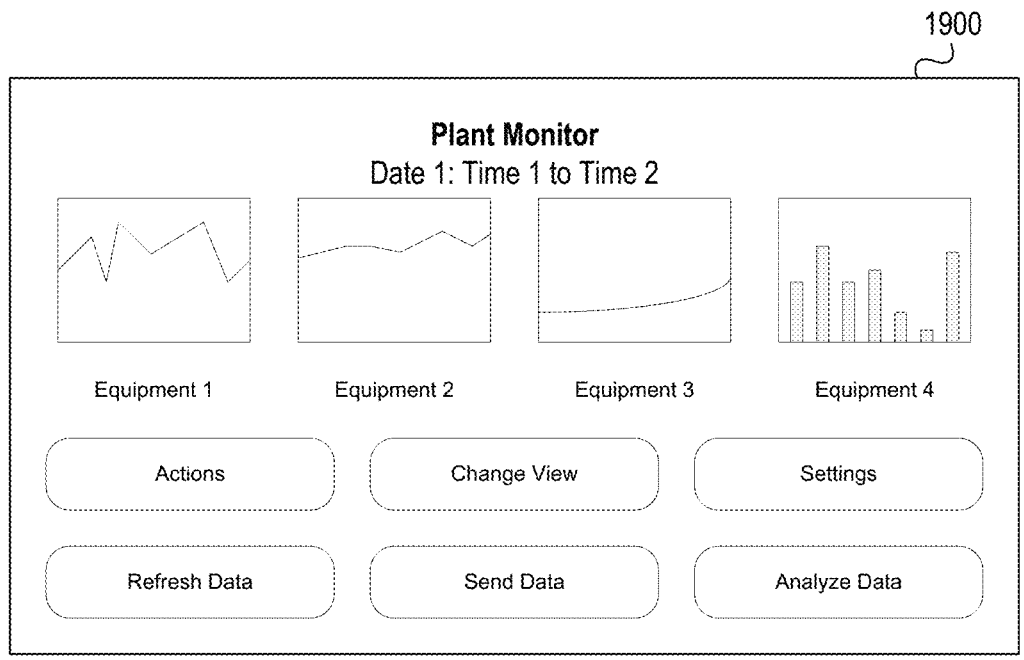
FIGS. 19-20 depict illustrative graphical user interfaces related to one or more aspects of a plant operation in accordance with one or more example embodiments.

FIG. 19 depicts an illustrative graphical user interface 1900 of an application that may be used for providing information received from one or more sensors or determined based on analyzing information received from one or more sensors, according to one or more embodiments described herein. The graphical user interface may be displayed as part of a smartphone application (e.g., running on a remote device, such as remote device 1054 or remote device 1056), a desktop application, a web application (e.g., that runs in a web browser), a web site, an application running on a plant computer, or the like.

The graphical user interface 1900 may include one or more visual representations of data (e.g., chart, graph, etc.) that shows information about a plant, a particular piece of equipment in a plant, or a process performed by a plant or a particular piece or combination of equipment in the plant. For example, a graph may show information about an operating condition, an efficiency, a production level, or the like. The graphical user interface 1900 may include a description of the equipment, the combination of equipment, or the plant to which the visual display of information pertains.

The graphical user interface 1900 may display the information for a particular time or period of time (e.g., the last five minutes, the last ten minutes, the last hour, the last two hours, the last 12 hours, the last 24 hours, etc.). The graphical user interface may be adjustable to show different ranges of time, automatically or based on user input.

The graphical user interface 1900 may include one or more buttons that allow a user to take one or more actions. For example, the graphical user interface may include a button (e.g., an "Actions" button) that, when pressed, shows one or more actions available to the user. The graphical user interface may include a button (e.g., a "Change View" button) that, when pressed, changes one or more views of one or more elements of the graphical user interface. The graphical user interface may include a button (e.g., a "Settings" button) that, when pressed, shows one or more settings of the application of which the graphical user interface is a part. The graphical user interface may include a button (e.g., a "Refresh Data" button) that, when pressed, refreshes data displayed by the graphical user interface. In some aspects, data displayed by the graphical user interface may be refreshed in real time, according to a preset schedule (e.g., every five seconds, every ten seconds, every minute, etc.), and/or in response to a refresh request received from a user. The graphical user interface may include a button (e.g., a "Send Data" button) that, when pressed, allows a user to send data to one or more other devices. For example, the user may be able to send data via email, SMS, text message, iMessage, FTP, cloud sharing, AirDrop, or via some other method. The user may be able to select one or more pieces of data, graphics, charts, graphs, elements of the display, or the like to share or send. The graphical user interface may include a button (e.g., an "Analyze Data" button) that, when pressed, causes one or more data analysis functions to be performed. In some aspects, the user may provide additional input about the desired data analysis, such as desired input, desired output, desired granularity, desired time to complete the data analysis, desired time of input data, or the like.

Figure 20:
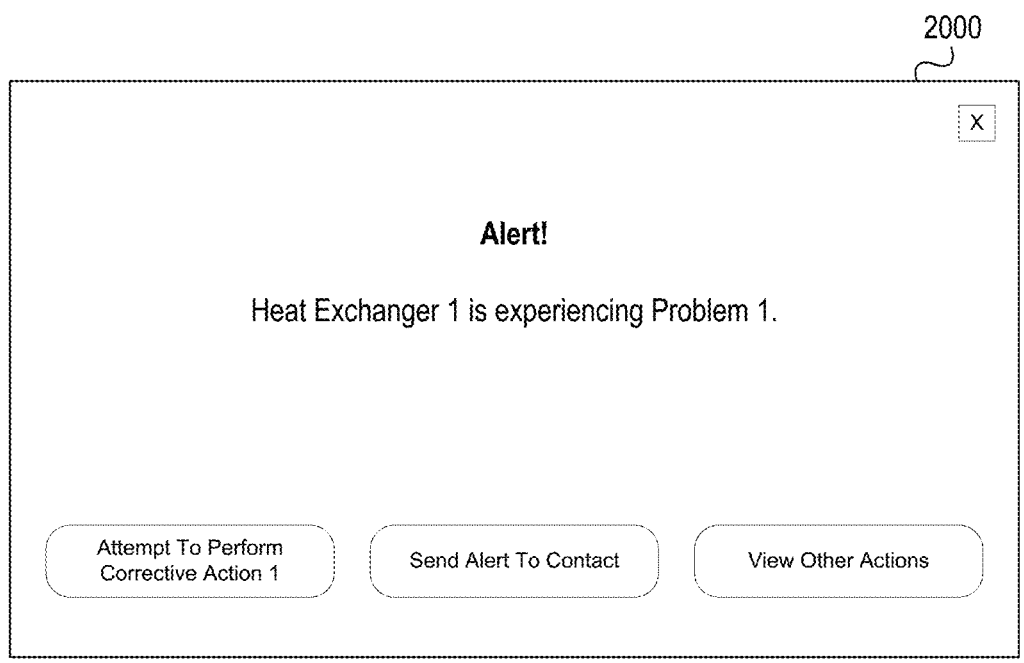

FIG. 20 depicts an illustrative graphical user interface 2000 of an application that may be used for providing alerts and/or receiving or generating commands for taking corrective action, in accordance with one or more embodiments described herein. The graphical user interface 2000 may include an alert with information about a current state of a piece of equipment (e.g., a heat exchanger), a problem being experienced by a piece of equipment (e.g., a heat exchanger), a problem with a plant, or the like. For example, the graphical user interface may include an alert that a heat exchanger is experiencing maldistribution, cross-leakage, thermal stresses, fouling, vibration, liquid lift, that pre-leakage has been detected, or another alert.

The graphical user interface 2000 may include one or more buttons that, when pressed, cause one or more actions to be taken. For example, the graphical user interface 2000 may include a button that, when pressed, causes a flow rate to change. In another example, the graphical user interface 2000 may include a button that, when pressed, sends an alert to a contact (e.g., via a remote device), the alert including information similar to the information included in the alert provided via the graphical user interface. In a further example, the graphical user interface 2000 may include a button that, when pressed, shows one or more other actions that may be taken (e.g., additional corrective actions).

Detecting and Addressing Problems with Heat Exchangers
(1) Detecting and Correcting Maldistribution Aspects of the disclosure are directed to a system that predicts and detects maldistribution and predicts, detects, and corrects conditions resulting from maldistribution.

Flow maldistribution (non-uniform flow) within the shell, or among the tubes, of shell and tube heat exchangers, or among channels formed by plates of plate type heat exchangers, may occur due to (i) the configuration of the heat exchanger with respect to other process equipment, such as immediately upstream or downstream process equipment, (ii) effects of manufacturing tolerances with respect to construction of the tubes, plate channels, and inlet and outlet headers, (iii) temperature effects, (iv) internal fouling and/or plugging of spray bars/devices, and/or (v) distribution of multiple phases (liquid and vapor) as a result of improper mixing/lack of homogeneity or separation of the phases within the heat exchanger itself.

In particular, maldistribution may be caused by unequal/unsteady flow through and over tubes and around baffles or from plate to plate or channel to channel. Maldistribution may be caused by thermal stress such as different expansion rates between different metallurgies, such as the shells, baffles, and tubes. Maldistribution may be caused by corrosion of any of the metallurgy and buildup of foulants within the tubes and external to the tubes on the baffles and on inside surfaces of the shell.

Flow maldistribution may reduce heat exchanger efficiency (e.g., loss in the total heat flow being transferred between inlet streams). Maldistribution can lead to cracks or breakage, resulting in cross-leakage.

In order to detect if maldistribution is occurring and thereby avoid equipment damage and failures, various sensors such as temperature, flow, or pressure sensors may be placed in, on, or around the heat exchanger. Sensors can be placed, for example, to measure the edge of all channels, for example to measure temperatures, or to measure pressure drop over a known length of the channel. In another example, sensors may be placed to measure the inlet and outlet of tubes or channels (tubes and channels may generically be identified as flow passages, or passages). In a further example, sensors may be placed on the end plates in the plate pack.

In one aspect, temperature sensors may be placed at feed inlets and outlets, effluent inlet and outlets, and/or tube bundle inlets and outlets, and variations of the outlet temperature may be measured and/or calculated. In addition, the temperature at various points in the flow may be measured by using a temperature sensor and/or a thermocouple (e.g., if skin temperature is being measured). In some aspects, a thermal or infrared camera may be used for measuring temperature.

In one aspect, pressure sensors may be used to determine whether there have been abnormal changes in pressure between feed inlets and outlets, effluent inlet and outlets, and/or tube bundle inlets and outlets.

In one aspect, the system measures flow for each path and the average and mean of the flow for all paths at normal operating conditions. The measurements are made from sensor data at inlets and outlets of the heat exchanger in order to detect change in flow between the inlets and outlets. Sensors may be placed at each individual passages inlet and outlet, or at other locations along the flow length, so that flow rates may be compared between passages. The flow may further be measured where flow is two phase and/or one phase. The system may continuously or periodically sense the flow levels. The system may detect if the flow levels for a particular path change beyond a preset amount (1%, 5%, 10%) of the prior flow ((a) for that path or (b) for the average flow of all paths), or if the flow levels for all of the paths changes beyond a preset amount of the average and mean flow at normal operation, or if the flow is zero in one or more of the passages. In another aspect, when combined with data from a process simulation providing stream physical properties, calculations of observed and predicted heat transfer performance (coefficients) and pressure drops can be used to identify flow maldistribution, and even trend the change in maldistribution magnitude.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if maldistribution is occurring. For example, maldistribution may be indicated if in one or more conditions: (1) a large change is determined over a short time frame (e.g., 10% over 3 hours), (2) a smaller change is determined over a long time frame (e.g., 3% over 10 days that increase 0.3% each day), (3) the changes pass a preset threshold, and/or (4) the changes in the system match the fingerprint of past changes that were detected in cases where the changes resulted in damage to the system.

For example, data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate maldistribution. Data that may indicate maldistribution may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations to determine if maldistribution is occurring or is likely to occur. One or more possible variables may be taken into account in these calculations, including temperature, pressure, flow, composition, properties of components, physical properties of fluids based on composition. Optimal operating conditions and limits of equipment (e.g., from vendor) may be taken into account.

Data analysis platform may further run process simulations to suggest changes to flow compositions and operating parameters to avoid or limit further damage by maldistribution. In some aspects, data analysis platform may communicate with one or more vendors regarding the results of the simulation, and receive recommendations from the vendor on how to change or operation or optimize geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. In another example, if a drought and heat wave are currently happening at the plant, the surface temperature, operating temperature, another temperature, and/or a pressure of the heat exchanger might increase. The data analysis platform may determine, based on the correlation of the weather conditions to the changes in temperature data, that the changes in temperature and/or pressure of the heat exchanger are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the heat exchanger maldistribution. For example, if maldistribution occurs at a consistent rate or increases at a first rate when a first operating condition exists, and the maldistribution occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature or pressure of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of maldistribution or worsening, stability, or stabilization of maldistribution.

In some aspects, data analysis platform may determine if maldistribution is approaching a known damage or failure condition. For example, if maldistribution is acceptable within a particular range (e.g., one portion of the heat exchanger processes 51% of a fluid and another portion of the heat exchanger processes 49% of the fluid), data analysis platform may determine that the maldistribution is within the acceptable range. In another example, however, if the maldistribution is within a range or threshold of exceeding the acceptable maldistribution range (e.g., maldistribution of two portions is unacceptable if over a ratio of 60:40, and the heat exchanger is experiencing maldistribution at a ratio of 59:41, or a trend is observed that the ratio is approaching a known damage or failure condition), data analysis platform may determine that the maldistribution may soon become severe enough to be classified as equipment failure. Data analysis platform may use historical data from the heat exchanger, data from other heat exchangers at the plant, data from other plants, data from a manufacturer, specification data, or other data to determine how maldistribution might develop, stabilize, cause failure, or the like.

In some embodiments, data analysis platform may determine one or more failure modes in which to classify maldistribution. For example, maldistribution may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow. For example, collected data could be used to measure or calculate loss of efficiency due to flow maldistribution. The simulation may suggest, for example, adjusting pressure in a unit in order to change the boiling point temperature to improve performance of the unit.

In some aspects, if maldistribution or one or more conditions that may cause maldistribution are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if maldistribution is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the maldistribution (e.g., relative temperatures, relative flows, and history of the maldistribution). The alert may provide information about one or more determined correlations between maldistribution and a particular operating condition or combination of operating conditions. The alert may include one or more recommendations for and/or commands causing adjustments to operating conditions, adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate maldistribution, prevent equipment (e.g., heat exchanger) damage, avoid failure, or the like. For example, if maldistribution rapidly develops, and, based on analyzing the growth rate of the maldistribution in view of current operating conditions, data analysis platform determines that the maldistribution soon will cross over a particular threshold (e.g., over a cost threshold, over a safety threshold, over a risk threshold, or the like), a command (e.g., a plant shutdown, a process shutdown, a heat exchanger shutdown, a backup heat exchanger activation, or the like) may be sent in order to avoid equipment failure, catastrophic failure, heat exchanger damage, plant damage, or some other damage.

In another example, a corrective action may include isolating the path to be corrected via one or more corrective actions. Potential corrective actions can include, but are not limited to, (1) changing hydro-treating to better remove nitrogen or ammonium (N) salts, (2) decreasing use of corrosion inhibitors in the feed, (3) changing the amount and source of the feed, (4) flushing one or more of the spray bars, (5) implementing a dew point wash, (6) identifying catalyst migration in the reactor and correcting, (7) preventing oxygen from entering system by running feed from different tanks, and/or (8) improving liquid lift.

A dew point wash may include, for example, introduction of liquid wash of the exchanger that is at or below the dew point of the system to remove deposits from the equipment by passing a liquid stream over them.

In some aspects, liquid lift, which can cause maldistribution or other performance issues, can be addressed by (a) increasing or decreasing temperature of recycle gas or feed, (b) increasing or decreasing volume of feed or recycle gas, (c) increasing or decreasing pressure, and/or (d) reducing liquid feed flow to increase ratio or volume of gas flow.

Damage by maldistribution may not be correctable online; however, the process may be monitored or the feed input may be reduced into the heat exchanger in order to preserve the equipment until the next maintenance shut down. If multiple shells are used, it may be possible to take one shell offline for maintenance or cleaning while operating the remaining shells. In a parallel shell arrangement, flow through one of the shells can be turned off. In a series shell arrangement, bypass pipes may need to be built into the system.

(2) Detecting and Correcting Cross-Leakage

Aspects of the disclosure are directed to a system that predicts and detects cross-leakage and predicts, detects, and corrects conditions resulting from cross-leakage.

Cross-leakage occurs when at least a portion of one stream of the heat-exchanging streams mixes with or contaminates a second stream (e.g., a portion of the shell-side stream leaking into the tube-side stream). Generally, cross-leakage occurs from high pressure flow to low pressure flow and may occur from tubeside to shellside or from shellside to tubeside or across plates. For example, in a combined feed/effluent heat exchanger, at least part of the feed, at a relatively higher upstream pressure, can contaminate the effluent at a relatively lower downstream pressure. Cross-leakage may be caused by flow distribution issues such as unequal flow through and over tubes and around baffles, for example flows leading to damage by tube vibration or damage by thermal stresses.

Cross-leakage may result from mechanical damage, corrosion of any of the metallurgy, failure of internal sealing devices, thermal or mechanical stresses to the heat exchanger. Gasketed joints internal to the heat exchanger can be a possible location of cross-leakage. Cross-leakage may be caused by vibrations, which may affect connections between tubes and baffles, tubes and walls, or walls and baffles. Cross-leakage may be caused by different expansion rates between different metallurgies, such as the shells, baffles, and tubes. Cross-leakage may be caused by buildup of foulants within the tubes, external to the tubes on the baffles, and on inside surfaces of the shell, for example by causing thermal stress or enabling under-deposit corrosion.

In order to detect cross-leakage potential problems or damage, chemical sensors, flow sensors, and/or pressure sensors may be placed in, on, or around the heat exchanger. Sensors can be placed, for example, to measure the edge of all channels and/or to measure the inlet and outlet. Sensors can be placed on the end plates in the bundle.

In one aspect, chemical sensors may be placed at outlets to collect data that data analysis platform may use to determine if feed or recycle gas components, for example, have leaked into the effluent stream or effluent stream components have leaked into the feed/recycle gas stream.

In one aspect, pressure sensors may be placed at outlets to collect data that data analysis platform may use to determine whether there have been abnormal changes in pressure between feed inlets and outlets, effluent inlet and outlets, and/or tube bundle inlets and outlets which may indicate, for example, flow from a high pressure feed tube into a low pressure effluent shell.

In one aspect, data collection platform may measure flow for each path and the average and mean of the flow for all paths at normal operating conditions. The measurements may be made from sensor data at inlets and outlets of the heat exchanger, or in other locations, in order to detect change in flow between the inlets and outlets. Sensors may be placed at each individual passage inlet and outlet so that flow rates may be compared between passages. The flow may further be measured where flow is two phase and/or one phase. The system may continuously sense the flow levels.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if cross-leakage is occurring. For example, cross-leakage may be indicated if in one or more conditions: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold.

Data analysis platform may determine if the flow magnitude for a particular path changes beyond a preset amount (1%, 5%, 10%) of the prior flow ((a) for that path or (b) for the average flow of all paths), or if the flow magnitude for all of the paths changes beyond a preset amount of the average and mean flow at normal operation, or if the flow is zero in one or more of the paths.

Data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate cross-leakage. Data that may indicate cross-leakage may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations to determine if cross-leakage is occurring or is likely to occur and to suggest changes to flow compositions and operating parameters to avoid or limit further damage by cross-leakage. One or more possible variables may be taken into account including temperature, pressure, flow, composition, properties of components, physical properties of fluids based on composition. Collected data could be used to measure or calculate loss of efficiency (e.g., due to cross-leakage). Optimal operating conditions and limits of equipment (e.g., from vendor) may be taken into account.

Data analysis platform may further run process simulations to suggest changes to flow compositions and operating parameters to avoid or limit further damage by cross-leakage. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. In another example, if a drought and heat wave are currently happening at the plant, the surface temperature, operating temperature, another temperature, and/or a pressure of the heat exchanger might increase. The data analysis platform may determine, based on the correlation of the weather conditions to the changes in temperature data, that the changes in temperature and/or pressure of the heat exchanger are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the heat exchanger cross-leakage. For example, if cross-leakage occurs at a consistent rate or increases at a first rate when a first operating condition exists, and the cross-leakage occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of cross-leakage or worsening, stability, or stabilization of cross-leakage.

In some aspects, data analysis platform may determine if cross-leakage is approaching a known damage or failure condition. For example, if cross-leakage is within a range or threshold of exceeding an acceptable cross-leakage range (e.g., cross-leakage of up to 10 parts per million (ppm) is acceptable, and the current cross-leakage is close to that threshold (e.g., at 99 ppm)), data analysis platform may determine that the cross-leakage may soon cross the threshold. Data analysis platform may use historical data from the heat exchanger, data from other heat exchangers at the plant, data from other plants, data from a manufacturer, specification data, or other data to determine how cross-leakage might develop, stabilize, cause failure, or the like.

In some embodiments, data analysis platform may determine one or more failure modes in which to classify cross-leakage. For example, cross-leakage may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow. For example, collected data could be used to adjust pressure in a unit, for example, to change the boiling point temperature to optimize performance of the unit. Collected data may be used to run simulations to alter unit flow compositions and operating parameters to optimize change conditions for the heat exchangers within the unit.

In some aspects, if cross-leakage or one or more conditions that may cause cross-leakage are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if cross-leakage is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the cross-leakage (e.g., type of contaminant, type of chemical being contaminated, relative pressures of the chemicals, and history of the cross-leakage). The alert may provide information about one or more determined correlations between cross-leakage and a particular operating condition or combination of operating conditions. The alert may include one or more recommendations for and/or commands causing adjustments to operating conditions, adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate cross-leakage, prevent equipment (e.g., heat exchanger) damage, avoid failure, or the like. For example, if cross-leakage rapidly develops, and, based on analyzing the growth rate of the cross-leakage in view of current operating conditions, data analysis platform determines that the cross-leakage soon will cross over a particular threshold (e.g., over a cost threshold, over a safety threshold, over a risk threshold, over a product specification threshold, or the like), a command (e.g., a plant shutdown, a process shutdown, a heat exchanger shutdown, a backup heat exchanger activation, or the like) may be sent in order to avoid equipment failure, catastrophic failure, heat exchanger damage, plant damage, off-spec product, or some other damage.

In another example, a corrective action may include isolating the path to be corrected via one or more corrective actions. Potential corrective actions can include, but are not limited to, finding sources of and limiting vibration, preventing corrosion, increasing or decreasing temperature of recycle gas, increasing or decreasing volume of feed or recycle gas, increasing or decreasing pressure, or reducing liquid feed flow to increase ratio of gas flow, or changing components in the feed if possible to reduce foulants.

Damage (cracks, breakage, loose welds) that cause cross-leakage generally cannot be corrected on-line; however, the process may be monitored or the feed input pressure may be reduced into the heat exchanger in order lower the amount of cross-contamination to preserve the equipment until the next maintenance shut down. If multiple shells are used, it may be possible to take one shell offline for maintenance or cleaning while operating the remaining shells. In a parallel shell arrangement, flow through one of the shells can simply be turned off. In a series shell arrangement, bypass pipes may need to be built into the system.

(3) Strain Gauges and Detecting Pre-Leakage

Aspects of the disclosure are directed to a system that predicts and detects strain and predicts, detects, and corrects conditions causing strain.

Strain may be caused by expansion and contraction of plates, shells, baffles, and tubes; corrosion of any of the metallurgy. Strain may also be caused by vibrations. Strain may result in cross-leakage, maldistribution, and failure of components of the heat exchanger.

Strain may be measured by using a strain gauge which may be embedded in tube or shell walls, plates, or baffles, for example. Strain gauges measure how much a material changes shape when a force acts on it. If a material is stressed by a force, it often changes shape and gets a little bit longer or shorter. The strain is defined as the change in length the force produces divided by the material's original length. Eventually a strained component may crack or break.

Measurements from strain gauges can be collected and analyzed to determine if a component is suffering from strain and whether it is imminent danger of failing. Measurements from other sensors such as temperature, pressure, flow, and vibration may be used along with the strain measurements to determine the source of the strain and whether the strain stress has been lessoned.

A system can measure the strain that is placed on different components of the heat exchanger. These components can include (a) each plate, (b) each tube, (c) the header joining the bundle, (d) any flange, (e) any weld. Strain can be compared to strain at standard conditions. Strain of the components can be collected at start-up and at shut-down.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if strain is occurring. For example, damage due to strain may be indicated or may be imminent if: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold.

For example, data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate strain. Data that may indicate strain may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations to determine if strain damage is occurring or is likely to occur, and/or to determine process conditions that may be causing the strain. One or more possible variables may be taken into account to determine what may be causing the strain, including temperature, pressure, flow, composition, properties of components, physical properties of fluids based on composition. Optimal operating conditions and limits of equipment (e.g., from vendor) may be taken into account.

Data analysis platform may further run process simulations and determine suggested changes to flow compositions and operating parameters to avoid or limit further damage by strain. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. This may cause strain. In another example, if a drought and heat wave are currently happening at the plant, the surface temperature, operating temperature, another temperature, and/or a pressure of the heat exchanger might increase. This may cause strain. The data analysis platform may determine, based on the correlation of the weather conditions to the changes in temperature data and to the changes in strain data, that the changes in strain are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about causes of strain damage. For example, if strain damage occurs at a consistent rate or increases at a first rate when a first operating condition exists, and strain damage occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of strain damage or worsening, stability, or stabilization of strain damage.

In some aspects, data analysis platform may determine if strain is approaching a known damage or failure condition. For example, if strain is acceptable within a particular range (e.g., a pipe may expand by 10% without damage), data analysis platform may determine whether the strain is within the acceptable range. In another example, however, if the strain is within a range or threshold of exceeding the acceptable strain range (e.g., strain is acceptable up to 10%, and is currently at 9%), data analysis platform may determine that the strain may soon become severe enough to cause equipment damage or failure. Data analysis platform may use historical data from the heat exchanger, data from other heat exchangers at the plant, data from other plants, data from a manufacturer, specification data, or other data to determine how strain damage might develop, stabilize, cause failure, or the like.

In some embodiments, data analysis platform may determine one or more failure modes in which to classify strain. For example, strain may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow to alleviate the strain. For example, collected data could be used to measure or calculate loss of efficiency due to strain damage. Based on the simulation, data analysis platform may determine, for example, one or more recommendations to reduce or eliminate further damage due to strain.

In some aspects, if strain or one or more conditions that may cause strain damage are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if strain, strain above a threshold, or strain damage is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the strain and/or strain damage (e.g., equipment information, equipment tolerances, current strain, damage threshold, strain history, alternative equipment available). The alert may provide information about one or more determined correlations between strain damage and a particular operating condition or combination of operating conditions. The alert may include one or more recommendations for and/or commands causing adjustments to operating conditions, adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate or prevent strain damage, avoid failure, or the like. For example, if strain rapidly develops, and, based on analyzing the growth rate of the strain in view of current operating conditions, data analysis platform determines that the strain soon will cross over a particular threshold (e.g., cause irreversible damage over a cost threshold, over a safety threshold, over a risk threshold, or the like), a command (e.g., a plant shutdown, a process shutdown, a heat exchanger shutdown, a backup heat exchanger activation, or the like) may be sent in order to avoid equipment failure, catastrophic failure, heat exchanger damage, plant damage, or some other damage.

If the strain is above a certain level, data analysis platform may recommend corrective actions that can be taken. These corrective actions can include, for example, attempting to repair holes. In addition, if the system shows issues in the future, data analysis platform may recommend that the particular components that experienced strain be evaluated for failure first. In addition, data analysis platform can predict the onset of failure at an earlier time based on the strain experienced by the components If multiple shells are used, it may be possible to take one shell offline for maintenance or cleaning while operating the remaining shells. In a parallel shell arrangement, flow through one of the shells can be turned off. In a series shell arrangement, bypass pipes may be built into the system and activated by control platform when one or more shells experiences damage.

(4) Detecting and Correcting Thermal Stresses

Aspects of the disclosure are directed to a system that predicts, detects, and corrects thermal stress and predicts, detects, and corrects conditions causing thermal stress.

Thermal stresses are stresses may be caused by differential thermal growth between parts that are at different temperatures or of different materials, due to excessively high or low temperatures, or an excessive temperature differential (delta), or rapid changes in temperature conditions between streams in the heat exchanger, or mal-distribution of flow within the heat exchanger (e.g., coolant flowing to some passages or tubes, and not to others). Thermal stress may be caused by different thermal expansion rates between different metallurgies, such as the shells, baffles, and tubes. Tubes, plates, flanges, and pressure boundary materials may be subjected to strain due to thermal stresses. Thermal stress can cause cracks and cross leakage.

Thermal stresses may be unavoidable, particularly at startup and shutdown, as well as during the many routine cycles of the equipment. Steps may be taken to accommodate effects of thermal stresses, for example, expansion joints may be used to connect components at locations where equipment can fail due to thermal stress and cause cross-leakage.

Sensors can be used to detect conditions caused by thermal stress. Strain gauges can measure strain in components that may be damaged by thermal stresses such as the hot end of bundles, welds, flanges as well as areas where thin and thick parts connect together. Strain measurements may be used to see if there is mechanical damage from thermal stress that may result in leaks internally or externally. A vibration monitor can be used to determine if there are excessive or unusual vibrations.

Temperature sensors may be used along with strain gauges to monitor the temperature and provide correlations between temperature, thermal stress, and mechanical failures. Temperature sensors including thermocouples (if skin temperature is being measured) may be placed in, on, or around the heat exchanger including expansion joints, tubes, plates, and headers. Temperature sensors may be placed in the flow streams at inlets and outlets as well as at various points along the flow path. Data collection platform may receive temperature information. Data analysis platform may calculate variations of the outlet temperature. Data analysis platform may determine potential failure or life of the heat exchanger components.

Additionally, hot spots may form, resulting in thermal stresses, and/or weakening and ultimately failure of the material. Such hots spots generally form at connections to walls and welds. Damage because of hot spots cannot be fixed online; however, it would be beneficial to determine at an early stage if hot spots are forming so that corrective action may be taken to extend the life of the equipment, for example until the next scheduled plant down time when the affected component may be repaired or replaced.

Infrared cameras may be used to identify and manage hot spots to prevent unexpected failures. Tomography may also be used to image by sections or sectioning, through the use of any kind of a penetrating wave, such as infrared.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if thermal stresses are occurring and/or if hot spots are forming. For example, damage due to thermal stress may be indicated or may be imminent if: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold. If abnormal thermal stresses are detected, an alarm may be signaled.

For example, data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate thermal stresses. Data that may indicate thermal stresses may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

In some aspects, data analysis platform may compare infrared images taken on different dates to determine if changes are occurring and hot spots are forming, for example. Data analysis platform may determine if non-uniform temperature exists. Data analysis platform may compare tomography measurements with photographs. Data analysis platform may make such comparisons on a periodic (e.g., monthly, weekly, or daily) basis, and/or in response to a user or device request to do so.

From the collected data, as well as data collected from other heat exchangers, data analysis platform may run process simulations to determine if thermal stress is occurring or is likely to occur. One or more possible variables may be taken into account in these calculations, including temperature, pressure, flow, composition, properties of components, physical properties of fluids based on composition, and strain. Optimal operating conditions and limits of equipment (e.g., from vendor) may be taken into account.

Data analysis platform may further run process simulations to suggest changes to flow compositions and operating parameters to avoid or limit further damage by thermal stress. In some aspects, data analysis platform may communicate with one or more vendors regarding the results of the simulation, and receive recommendations from the vendor on how to change or optimize geometry of the exchanger or change the design to accommodate temperature fluctuations. The results of the process simulation may further be used to determine how quickly a problem occurs, to identify one or more fingerprints for the problem, and/or identify one or more signatures for how the problem occurs. Data analysis platform may use sensor data and/or process simulation results to optimize a rate of heat up and cool down and/or a rate of temperature change to avoid or minimize thermal stress. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop, and thermal stress might drop. In another example, if a drought and heat wave are currently happening at the plant, the surface temperature, operating temperature, another temperature, and/or a pressure of the heat exchanger might increase, and thermal stress might increase. The data analysis platform may determine, based on the correlation of the weather conditions to the changes in temperature data, that the changes in thermal stress are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the heat exchanger thermal stress. For example, if thermal stress occurs at a consistent rate or increases at a first rate when a first operating condition exists, and the thermal stress occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of thermal stress or worsening, stability, or stabilization of thermal stress.

In some aspects, data analysis platform may determine if thermal stress is approaching a known damage or failure condition. For example, if thermal stress is acceptable within a particular range, data analysis platform may determine whether the thermal stress is within the acceptable range. In another example, however, if the thermal stress is within a range or threshold of exceeding the acceptable thermal stress range, data analysis platform may determine that the thermal stress may soon become severe enough to cause damage or equipment failure. Data analysis platform may use historical data from the heat exchanger, data from other heat exchangers at the plant, data from other plants, data from a manufacturer, specification data, or other data to determine how thermal stress might develop, stabilize, cause damage, cause failure, or the like.

In some embodiments, data analysis platform may determine one or more failure modes in which to classify thermal stress. For example, thermal stress may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow. For example, collected data could be used to measure or calculate loss of efficiency due to thermal stress.

In some aspects, if thermal stress, thermal stress above a threshold, or one or more conditions that may cause thermal stress are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if thermal stress is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the thermal stress (e.g., relative temperatures, relative flows, history of the thermal stress, and acceptable levels of thermal stress). The alert may provide information about one or more determined correlations between thermal stress and a particular operating condition or combination of operating conditions. The alert may include one or more recommendations for and/or commands causing adjustments to operating conditions to avoid or reduce thermal stress, such as adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate thermal stress, prevent equipment (e.g., heat exchanger) damage, avoid failure, or the like. For example, if thermal stress is at a high level, and, based on analyzing the growth rate of the thermal stress in view of current operating conditions, data analysis platform determines that the thermal stress soon will cross over a particular threshold (e.g., the thermal stress may increase enough to cause damage), a command (e.g., a plant shutdown, a process shutdown, a heat exchanger shutdown, a backup heat exchanger activation, or the like) may be sent in order to avoid equipment failure, catastrophic failure, heat exchanger damage, plant damage, or some other damage.

In another example, a corrective action may include a recommendation of steps to decrease vibrations to decrease stress in areas affected by thermal stress, for example at the welds holding together two plates.

If multiple shells are used, it may be possible to take one shell offline for maintenance or cleaning while operating the remaining shells. In a parallel shell arrangement, flow through one of the shells may be turned off. In a series shell arrangement, bypass pipes may be built into the system and activated by the control platform.

(5) Detecting and Correcting Fouling

Aspects of the disclosure are directed to a system that predicts, and detects, and corrects fouling and predicts, detects, and corrects conditions resulting from fouling.

Fouling is the accumulation of unwanted substances on surfaces and can occur on any exposed surfaces in a heat exchanger, such as inside tubes or channels, outside tubes or shells, on surfaces of plates, and on baffles. Fouling can be caused by precipitation of substances from the flow streams from a variety of sources such as crystallization, polymerization, oxidation, decomposition, corrosion, dirt, sediment, sludge, rust, dust, pollen, and biological deposits. Metal surfaces on tubes can act as a catalyst, causing reactions leading to products that may precipitate out and cause fouling.

Fouling can cause a build-up of substances that ultimately leads to a blockage of the flow or plugging. Fouling can also cause formation of a coating that adds resistance to heat transfer. Fouling from corrosive agents in flow streams can corrode tubes and plates, compromising their integrity. Fouling and plugging may lead to flow maldistribution.

Fouling can affect distributor (e.g., spray bar) systems used to introduce liquids and/or vapors into the heat exchangers.

Fouling can be detected by detecting components in a flow stream—for example, components in the feed, recycle gas, and/or effluent. Chemical sensors may be used to detect components in the feed and effluent streams to detect whether any of the components present are prone to causing fouling. The chemical sensors may be placed, for example, at the inlets or the outlets of the heat exchanger unit. In this manner, it can be determined if fouling components are entering the heat exchanger or whether they are forming within the heat exchanger via reaction or pH or temperature changes. If fouling is being caused by components in the flow, the components, or ratio of components, may be altered to alleviate the fouling.

Fouling can also be detected by measuring parameters of the heat transfer process such as measuring changes in temperatures, by calculations of heat transfer coefficients (ideally both predicted and observed), or by measuring pressure drop. Fouling may also be detected using tomography, video cameras, and/or infrared thermal imaging to determine if there is maldistribution within bundles and outside bundles.

In one aspect, sensors are placed in each heat exchanger and are placed between heat exchangers when the exchangers are used in parallel or in series. The sensors check the temperature and/or pressure in each vessel and the differences in pressure and temperature between exchangers. The sensors can also measure the cooling water flow and the cooling water inlet and outlet temperatures and pressures. The sensors also can measure the flow in a by-pass around an exchanger. The sensors provide to data collection platform signals regarding temperature, pressure, flow and other measured physical characteristics of the heat exchangers.

Data from sensors detecting outlet temperatures, flow, and pressure drops may be used (e.g., by data analysis platform) to determine and/or predict fouling and problems caused by fouling by detecting flow and production rate changes. Temperature at various points in the flow may be measured by using a temperature sensor and/or a thermocouple (if skin temperature is being measured.). When combined with data from a process simulation providing stream physical properties, calculations of observed and predicted heat transfer performance (coefficients) and pressure drops can be used to identify fouling, and even trend the change in fouling magnitude. Abnormal temperature variations or heat transfer characteristics may indicate fouling or blockage. Changes in pressure drops can indicate potential fouling, perhaps helping to identify the stream where fouling is occurring (e.g., the hot stream or the cold stream).

In one aspect, data collection platform receives sensor data indicating flow for each path and the average and mean of the flow for all paths at normal operating conditions. The measurements may be made from sensors at inlets and outlets of the heat exchanger in order to detect change in flow between the inlets and outlets. Sensors may be placed at each individual channel inlet and outlet so that flow rates may be compared between channels. The flow rate may further be measured where flow is two phase and/or one phase. Data collection platform may continuously or periodically sense the flow magnitudes.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if fouling or damage from fouling is occurring. For example, fouling or damage from fouling may be indicated if in one or more conditions: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold.

In some aspects, data analysis platform may determine if the flow levels for a particular path change beyond a preset amount (1%, 5%, 10%) of the prior flow ((a) for that path or (b) for the average flow of all paths), if the flow levels for all of the paths changes beyond a preset amount of the average and mean flow at normal operation, or if the flow is zero in one or more of the channels.

In some aspects, data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate fouling or damage due to fouling. Data that may indicate fouling or damage due to fouling may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations to determine if fouling or damage due to fouling is occurring or is likely to occur. One or more possible variables may be taken into account in these calculations, including temperature, pressure, flow, composition, properties of components, physical properties of fluids based on composition. Optimal operating conditions and limits of equipment (e.g., from vendor) may be taken into account.

Data analysis platform may further run process simulations to determine process conditions that may be causing the fouling, and/or to determine recommendations for changes to flow compositions and operating parameters to avoid or limit further damage by fouling, and/or to optimize change conditions for the heat exchangers within the unit. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. In another example, if a drought and heat wave are currently happening at the plant, the surface temperature, operating temperature, another temperature, and/or a pressure of the heat exchanger might increase. The data analysis platform may determine, based on the correlation of the weather conditions to the changes in temperature data, that the changes in temperature and/or pressure of the heat exchanger are due to weather conditions, and not, e.g., due to another problem (e.g., fouling).

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the fouling. For example, if fouling or damage due to fouling occurs at a consistent rate or increases at a first rate when a first operating condition exists, and the fouling or damage due to fouling occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of fouling or damage due to fouling or worsening, stability, or stabilization of fouling or damage due to fouling.

In some aspects, data analysis platform may determine if fouling is approaching a known damage or failure condition. For example, if fouling is acceptable within a particular range, data analysis platform may determine that the fouling is within the acceptable range. In another example, however, if the fouling is within a range or threshold of exceeding the acceptable range, data analysis platform may determine that the fouling may soon become severe enough to cause damage or equipment failure. Data analysis platform may use historical data from the heat exchanger, data from other heat exchangers at the plant, data from other plants, data from a manufacturer, specification data, or other data to determine how fouling might develop, stabilize, cause failure, or the like.

In some embodiments, data analysis platform may determine one or more failure modes in which to classify fouling or damage due to fouling. For example, fouling or damage due to fouling may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow to alleviate fouling. For example, collected data could be used to measure or calculate loss of efficiency due to fouling or damage due to fouling. The simulation may be used to suggest, for example, a timeline for taking equipment down to clean it, and/or other corrective measures.

In some aspects, if fouling or damage due to fouling or one or more conditions that may cause fouling or damage due to fouling are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if fouling or damage due to fouling is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the fouling or damage due to fouling (e.g., temperatures, pressures, flow rates, predicted fouling rates, predicted fouling chemical makeup, potential damage due to fouling, and history of fouling). The alert may provide information about one or more determined correlations between fouling or damage due to fouling and a particular operating condition or combination of operating conditions. The alert may include one or more recommendations for and/or commands causing adjustments to operating conditions, adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate fouling, prevent equipment (e.g., heat exchanger) damage, avoid failure, or the like. For example, if fouling rapidly develops, and, based on analyzing the growth rate of the fouling in view of current operating conditions, data analysis platform determines that the fouling soon will cross over a particular threshold (e.g., over a tolerance level, over an efficiency-loss level, over a cost threshold, over a safety threshold, over a risk threshold, or the like), a command (e.g., a plant shutdown, a process shutdown, a heat exchanger shutdown, a backup heat exchanger activation, or the like) may be sent in order to avoid loss of efficiency, equipment failure, catastrophic failure, heat exchanger damage, plant damage, or some other damage.

In some aspects, data analysis platform may continuously calculate heat exchange coefficients for the heat exchangers in real time. When these coefficient deviate beyond a preset amount (e.g., 10% over 1 hour—or—3% gradual change over 24 hours) or when the deviations of these coefficients match the signatures from prior problem heat exchange coefficient profiles, data analysis platform may instruct control platform to take corrective actions.

Data analysis platform may, based on sensor data, determine whether fouling is likely caused by environmental factors (e.g., biological material or particulates such as dirt or pollen). In these cases, data analysis platform may recommend or cause filtration of water or other components upstream of the exchanger to remove biological and particulate from process streams.

Fouling caused by the heat transfer process itself may be corrected by temperature adjustments. High temperatures may drive polymerization or decomposition, thus increasing the rate of fouling. Data analysis platform may send a command to control platform to decrease the temperatures, which may slow down the rate of fouling due to polymerization. In some aspects, low temperatures may drive crystallization, thus increasing the rate of fouling. Therefore, data analysis platform may send a command to control platform to maintain a higher temperature to slow down the rate of fouling due to crystallization. In some aspects, data analysis platform, based on performance data in combination with temperature data, pressure data, and/or other data, may determine an optimal temperature range to operate in for minimal fouling. For example, the temperatures in the temperature range may be high enough to minimize fouling due to crystallization and low enough to minimize fouling due to polymerization or decomposition.

Data analysis platform may recommend or command corrections to alleviate fouling that include changing the flow rates or flow composition. For example, if ammonium salt concentration is too high, data analysis platform may send a recommendation or command for control platform to modify hydrotreating to increase removal of nitrogen. In another example, data analysis platform may send a recommendation or command for control platform to remove salts by increasing the velocity of the streams to shear off deposits. Data analysis platform may send a recommendation or command for control platform to remove salts by washing with intermittent online water injection. In some aspects, data analysis platform may send a command once, and control platform may implement a regular schedule of online water injection. In some aspects, continuous water injection might not be practical and may waste water.

In some aspects, if there are excessive corrosion inhibitors in the feed, data analysis platform may send a recommendation or command for control platform to decrease the corrosion inhibitors in the feed or switch to a new feed.

If there are excessive oxygenates in the feed, olefins may react with oxygen and polymerize forming gums. Data analysis platform may send a recommendation or command for control platform to alter the amount and source of the oxygenates in the feed, add a chemical to neutralize or prevent build-up of gums, mitigate with oxygen scavengers, decrease feed rate, increase flow rate/velocity, change temperature, and/or increase hydrogen recycle gas.

If gums form in the feed and foul the equipment, data analysis platform may send a recommendation to take the equipment offline to be cleaned with physical methods (e.g., a brush). In some cases, data analysis platform may send a recommendation or command for control platform to inject solvents or acid to clean up gums.

In some aspects, data analysis platform may, based on sensor data in combination with other data (e.g., historical data, data from other plants, data from a manufacturer, etc.) predict when hydrates may form. Data analysis platform may recommend or send a command to control platform to take preemptive measures such as increasing temperature or drying gas ahead of time. Data analysis platform may recommend or send a command to control platform to pre-heat the pipes (e.g., by activating steam lines).

If multiple shells are used, it may be possible to take one shell offline for maintenance or cleaning while operating the remaining shells. In a parallel shell arrangement, flow through one of the shells can be turned off. In a series shell arrangement, bypass pipes may be built into the system and activated by control platform.

In some embodiments (e.g., if the heat exchanger has two separated sides such as shown in FIG. 8 with two spray bars), data analysis platform may recommend or send control platform a command to reduce throughput or take part of the unit offline for maintenance or cleaning, while continuing to operate the other part. Data analysis platform may recommend or send control platform a command to backflush the spray bars.

(6) Detecting and Correcting Vibration

Aspects of the disclosure are directed to a system that predicts and detects vibrations and predicts, detects, and corrects conditions resulting from vibrations.

Vibration can cause significant damage to heat exchangers and its components. Vibration may be flow-induced vibration or excessive mechanical vibration, such as from nearby equipment, such as air compressors or refrigeration machines, or from loose support structures, for example. The vibration may be caused by maldistribution, cross leakage, or fouling. Each cause of vibration may have a different solution. Vibration is manifested in several ways and can cause problems/failures each of which can have different thresholds as to what may be a problem. The specific type of vibration phenomena may dictate different types of actions to be taken. For example, shellside flow induced vibration of heat exchanger tubes may be caused by different mechanisms, such as fluidelastic instability or vortex shedding. Fluidelastic instability is related to a critical velocity that should not be exceeded, or damage will occur, so the action would be to decrease the flow rate to avoid vibration damage. Vortex shedding is related to matching the natural frequency of the tube, so the action could be to increase the flow rate to avoid vibration damage.

There is a natural frequency of tubes or resonance that can cause damage very quickly. Such vibrations should be detected and avoided by increasing or decreasing the frequency of the forcing vibrations. On the other hand, acoustic vibrations might occur, which may cause noise, but are not necessarily harmful.

Mechanical vibration can cause tube failures in the form of a fatigue stress crack or erosion of tubing at the point of contact with baffles. Heat exchangers should be isolated from mechanical vibrations. Support structures should be reinforced or bolts tightened to avoid or lesson such vibrations.

The effect of shellside flow induced tube vibrations is harder to detect and correct. Shell side flow induced vibration can be caused by velocity over the tubes. If the flow through the exchanger is not uniform, then high local flow velocities can cause vibration. This vibration can cause tube damage in exchangers leading to frequent leakage of exchangers. Flow induced tube vibration is a large source of failure in shell and tube heat exchangers. Damage from shellside flow induced vibration can involve collision of tubes, wear of tubes at supports or baffles, and fatigue due to bending of tubes at fixed connections such as at the tubesheet.

Flow induced vibration can lead to mal-distribution and cross-leakage. Flow induced vibration can accelerate dislodging of corrosion particles leading to erosion or blocked flow. Flow induced vibration may ultimately damage tubes, plates, and baffles. In some instances, flow induced vibration may be mitigated by changing flow parameters, for example, flow rate, pressure, temperature, vapor fraction.

Vibration may be detected with vibration sensors attached to the equipment. Vibration sensors can be placed on the shell, on the tubes, at the inlets, the outlets, the baffle locations, the midpoints between the baffles, and the midpoints between the inlets and outlets. Such sensors may measure the amplitude and frequency of sound through tubes or plates. Flow vibration may further be detected using flow sensors to detect abnormalities in flow. Flow vibration may also be detected using pressure sensors to detect pressure drop.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if vibration is occurring. For example, vibration or damage due to vibration may be indicated if in one or more conditions: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold. If abnormal or high vibrations are detected, an alarm may be signaled.

Data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate vibration or damage due to vibration. Data that may indicate vibration or damage due to vibration may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations to determine if vibration or damage due to vibration is occurring or is likely to occur. One or more possible variables may be taken into account in these calculations, including temperature, pressure, flow, composition, properties of components, physical properties of fluids based on composition. Vibration sensor measurements may be compared with amplitude and frequency for equipment operating at normal conditions with little or no vibration. The natural frequency of tube or fingerprint of the tube may be looked up or determined and sensor data compared therewith. Optimal operating conditions and limits of equipment (e.g., from vendor) may be taken into account. Data analysis platform may run process simulations to determine process conditions that may be causing the vibration.

Data analysis platform may further run process simulations to suggest changes to flow compositions and operating parameters to avoid or limit further damage by vibration. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. In another example, if a drought and heat wave are currently happening at the plant, the surface temperature, operating temperature, another temperature, and/or a pressure of the heat exchanger might increase. The data analysis platform may determine, based on the correlation of the weather conditions to the changes in pressure data, that corresponding changes in vibration are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the heat exchanger vibration or damage due to vibration. For example, if vibration or damage due to vibration occurs at a consistent rate or increases at a first rate when a first operating condition exists, and the vibration or damage due to vibration occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of vibration or damage due to vibration or worsening, stability, or stabilization of vibration or damage due to vibration.

In some aspects, data analysis platform may determine if vibration or damage due to vibration is approaching a known failure condition. For example, if vibration is acceptable within a particular range, data analysis platform may determine whether the vibration is within the acceptable range. In another example, however, if the vibration is within a range or threshold of exceeding the acceptable range, data analysis platform may determine that the vibration may soon become severe enough to cause damage or equipment failure. Data analysis platform may use historical data from the heat exchanger, data from other heat exchangers at the plant, data from other plants, data from a manufacturer, specification data, or other data to determine how vibration might develop, stabilize, cause damage, cause failure, or the like.

In some embodiments, data analysis platform may determine one or more failure modes in which to classify vibration or damage due to vibration. For example, vibration or damage due to vibration may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow to alleviate the vibration. For example, collected data could be used to measure or calculate loss of efficiency due to vibration or cost of damage due to vibration.

In some aspects, if vibration or damage due to vibration or one or more conditions that may cause vibration or damage due to vibration are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if vibration or damage due to vibration is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the vibration or damage due to vibration (e.g., where vibration is occurring, chemicals in vibrating equipment, history of vibration, and likelihood of damage). The alert may provide information about one or more determined correlations between vibration or damage due to vibration and a particular operating condition or combination of operating conditions. The alert may include one or more recommendations for and/or commands causing adjustments to operating conditions, adjustments to flows, valves, nozzles, drains, or the like.

If the extent of vibration exceeds a preset value or matches a prior vibration signature or is approaching the resonance (mechanical or acoustic) frequency of the system, corrective action may be taken. For example, data analysis platform may send a recommendation or a command to control platform alter the amount of flow through or over the tubes until the vibration decreases.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate vibration, prevent equipment (e.g., heat exchanger) damage, avoid failure, or the like. For example, if vibration rapidly develops, and, based on analyzing the growth rate of the vibration in view of current operating conditions, data analysis platform determines that the vibration soon will cross over a particular threshold (e.g., cause damage over a cost threshold, cause problems over a safety threshold or over a risk threshold, or the like), remote device may send a command (e.g., a plant shutdown, a process shutdown, a heat exchanger shutdown, a backup heat exchanger activation, or the like) in order to avoid equipment failure, catastrophic failure, heat exchanger damage, plant damage, or some other damage.

Damage by vibration might not be correctable online; however, the process may be monitored or the feed input may be reduced into the heat exchanger in order to preserve the equipment until the next maintenance shut down. If multiple shells are used, it may be possible to take one shell offline for maintenance while operating the remaining shells. In a parallel shell arrangement, flow through one of the shells can be turned off (e.g., by control platform). In a series shell arrangement, bypass pipes may need to be built into the system, and may be activated by control platform.

(7) Detecting and Correcting Problems in Liquid Lifting

Aspects of the disclosure are directed to a system that can predict when issues may be experienced with liquid lift, and implement measures to correct the issues.

Lift refers to the lifting of liquid feed using a gas carrier. As the liquid is lifted, it is heated and may eventually go through a phase change into a gas. For example, as shown in FIG. 7, a liquid feed stream is combined with a recycle gas stream where the gas carries the liquid, which stream then enters the vertical channels or tubes. The liquid feed and recycle gas are injected separately and simultaneously into the heat exchanger to carry the liquid in the gas. For example, the liquid feed is injected via the spray bar, whereas the recycle gas is injected from a lower point of the heat exchanger, distributed via a grid. The liquid is carried upward via the gas. The stream is a two-phase stream of liquid and gas.

The two-phase stream travels upwardly along the heat exchanger channels or tubes in heat exchange relationship with an effluent. As the liquid is carried up the channels or tubes, some is vaporized as it receives heat from the effluent stream. At an intermediate position along its journey through the channels or tubes, the liquid is fully vaporized and the stream changes from a two-phase stream to a single-phase stream. An "intermediate position" is a position between the top and bottom of the shell; the intermediate position, in some embodiments, is preferably nearer the bottom than the top. The minimum lift period (time it takes for two-phase flow to become a one-phase flow) and position where the change completes may be calculated (e.g., by data analysis platform). Lift calculations may be based on the geometry of the heat exchanger, as well as the fluctuations of temperature, pressure, flow, and composition (e.g., determined based on data from sensors in communication with data collection platform).

Where the two-phase to one-phase change completes, dryout occurs which can cause fouling. Therefore, the system may potentially move where the change occurs so that one part of the equipment is not continuously fouled.

There is a tendency for liquid to grow or coalesce and to separate from the vapor. If this occurs a pool of liquid may be formed at the bottom of the heat exchanger. Passage of gas through such a pool may cause bumping and vibration or slugging, potentially causing damage, and the non-uniformity of the gas/liquid dispersion resulting from liquid disengagement may result in unpredictable operation of the heat exchanger and result in reduced thermal efficiency. Gas may become blocked by the liquid instead of the liquid being carried in the gas, or the gas and liquid may separate forming channeled flow where gas may go up the middle and liquid flows or is stagnant or drops down the sides. The liquid may reflux up and down, causing slugging and fatigue in the channels or tubes.

Poor liquid lift may be caused if problems occur at the inlets to the tubes and channels. For example, if the liquid distributor (e.g., spray bars) is clogged or partially clogged, the liquid might distribute unevenly into the gas.

Poor liquid lift may be due to low velocities at the tube inlet or channel inlet, resulting in poor liquid-vapor distribution in the passages (maldistribution), poor heat transfer, and/or increased fouling. The stream, therefore, must have a sufficient velocity to overcome gravitational effects, provide uniform distribution of the liquid being lifted, and provide effective heat transfer.

High vapor velocities with low pressure drop and the volatilization of the liquid due to mixing with the recycle gas and heating should minimize disengagement of liquid from the two-phase flow.

Problems that occur with liquid lifting may be detected with temperature, pressure, and flow sensors. Sensors can collect data related to the system, including inlet and outlet temperatures and Delta T, inlet and outlet pressures and Delta P, and flows in the tubes or channels.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if liquid lift problems are occurring. For example, the change in temperatures of the vaporized feed exiting the heat exchanger may indicate that the feed is not being vaporized. Pressure drop may also indicate problems with liquid lift, such as identifying intermittent or slugging flow. Differences in inlet and outlet temperatures may be indicative of problems. If hot spots or mal-distribution occur due to problems with liquid lift, thermal stress may result, damaging the plates, channels, or tubes.

Data analysis platform may use information regarding the geometry of the exchanger (e.g., from the vendor) in the analysis, including information regarding minimum acceptable lift and safety margins for minimum acceptable lift. Data analysis platform may use this information, along with the sensor data, and along with process simulation that provides physical properties of the streams and models the flashing of the mixed liquid and vapor, to predict whether an acceptable level of lift is, or will be, achieved.

In addition, components of flow stream may be monitored (e.g., using gas analysis such as online GC analysis to determine what is in the liquid feed), for example to better execute the process simulation modeling. As a further example, carbon number may be monitored to predict potential fouling.

Data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate problems with liquid lift. Data that may indicate problems with liquid lift may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations to determine if problems with liquid lift is occurring or is likely to occur. One or more possible variables may be taken into account in these calculations, including temperature, pressure, flow, composition, properties of components, physical properties of fluids based on composition. Optimal operating conditions and limits of equipment (e.g., from vendor) may be taken into account.

Data analysis platform may further run process simulations to suggest changes to flow compositions and operating parameters to avoid or limit further damage by problems with liquid lift. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. In another example, if a drought and heat wave are currently happening at the plant, the surface temperature, operating temperature, another temperature, and/or a pressure of the heat exchanger might increase. The data analysis platform may determine, based on the correlation of the weather conditions to the changes in temperature data, that problems with liquid lift are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the problems with liquid lift. For example, if problems with liquid lift occur at a consistent rate or increase at a first rate when a first operating condition exists, and the problems with liquid lift occur at the consistent rate or increase at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of problems with liquid lift or worsening, stability, or stabilization of problems with liquid lift.

In some aspects, data analysis platform may determine if problems with liquid lift are causing or approaching a known damage or failure condition, or affecting thermal performance (by comparing predicted to observed performance). Data analysis platform may determine whether problems due to liquid lift may soon become severe enough to cause equipment failure. Data analysis platform may use historical data from the heat exchanger, data from other heat exchangers at the plant, data from other plants, data from a manufacturer, specification data, or other data to determine how problems due to liquid lift might develop, stabilize, cause failure, or the like.

In some embodiments, data analysis platform may determine one or more failure modes in which to classify problems due to liquid lift. For example, problems due to liquid lift may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow. For example, data analysis platform may use collected data to measure efficiency loss due to liquid lift problems.

In some aspects, if liquid lift problems or one or more conditions that may cause liquid lift problems are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if liquid lift problems are detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the liquid lift problems (e.g., potential causes, potential effects, history of the liquid lift problems). The alert may provide information about one or more determined correlations between liquid lift problems and a particular operating condition or combination of operating conditions. The alert may include one or more recommendations for and/or commands causing adjustments to operating conditions, adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate liquid lift problems, prevent equipment (e.g., heat exchanger) damage, avoid failure, or the like. For example, if liquid lift problems rapidly develop, and, based on analyzing the growth rate of the liquid lift problems in view of current operating conditions, data analysis platform determines that the liquid lift problems soon will cross over a particular threshold (e.g., over a cost threshold, over a safety threshold, over a risk threshold, or the like), a command (e.g., a plant shutdown, a process shutdown, a heat exchanger shutdown, a backup heat exchanger activation, or the like) may be sent in order to avoid equipment failure, catastrophic failure, heat exchanger damage, plant damage, or some other damage.

If liquid lift problems are caused by fouling, data analysis platform may recommend or send a command to control platform to take a corrective action designed to change one or more components of a flow stream (e.g., add a solvent to the feed to decrease viscosity or change other properties).

In some aspects, if data analysis platform determines that a liquid lift problem exists (e.g., the lift level is below a pre-set threshold), data analysis platform may recommend or send control platform a command to take one or more corrective actions, such as to increase or decrease the feed temperature, increase or decrease the flow velocities, increase or decrease the ratio of feed liquid to recycle gas (e.g., 50/50 to 40/60).

In some aspects, data analysis platform may increase an analysis schedule or rate, increase monitoring, continue recommending or sending commands to control platform to implement further changes, or the like, until the problems are corrected. If data analysis platform determines that damage has already occurred, data analysis platform may recommend or send control platform a command for one or more corrective actions that may extend the operating life until the next scheduled shut down.

In some embodiments (e.g., if the heat exchanger has two separated sides such as shown in FIG. 8 with two spray bars), data analysis platform may recommend or send control platform a command to reduce throughput or take part of the unit offline for maintenance or cleaning, while continuing to operate the other part. Data analysis platform may recommend or send control platform a command to backflush the spray bars.

(8) Air-Cooled Heat Exchangers

Aspects of the disclosure are directed to a system that detects and corrects conditions that can affect operation of an air-cooled exchanger.

Figure 15:
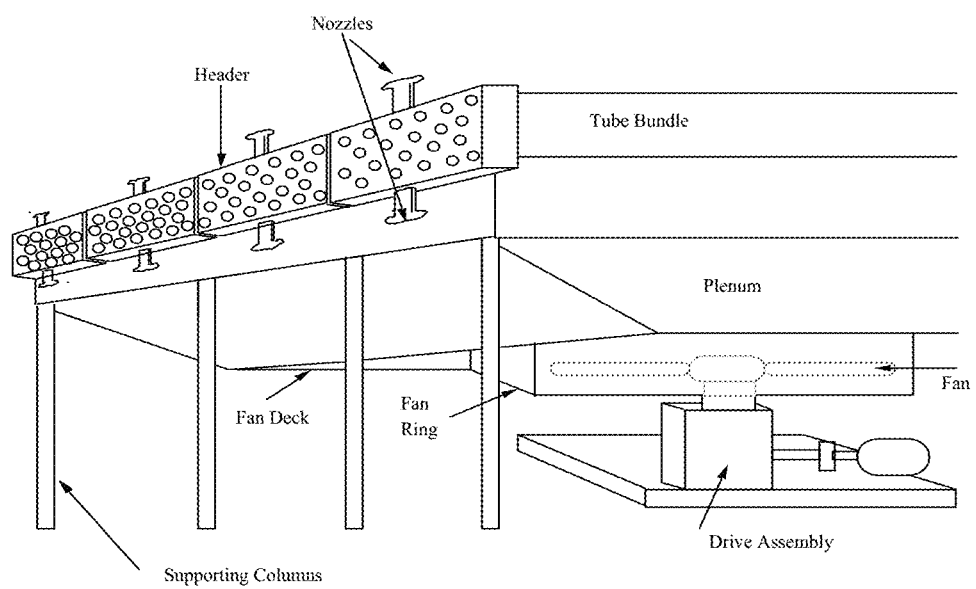
FIG. 15 depicts an illustrative air-cooled heat exchanger in accordance with one or more example embodiments.
Figure 16:
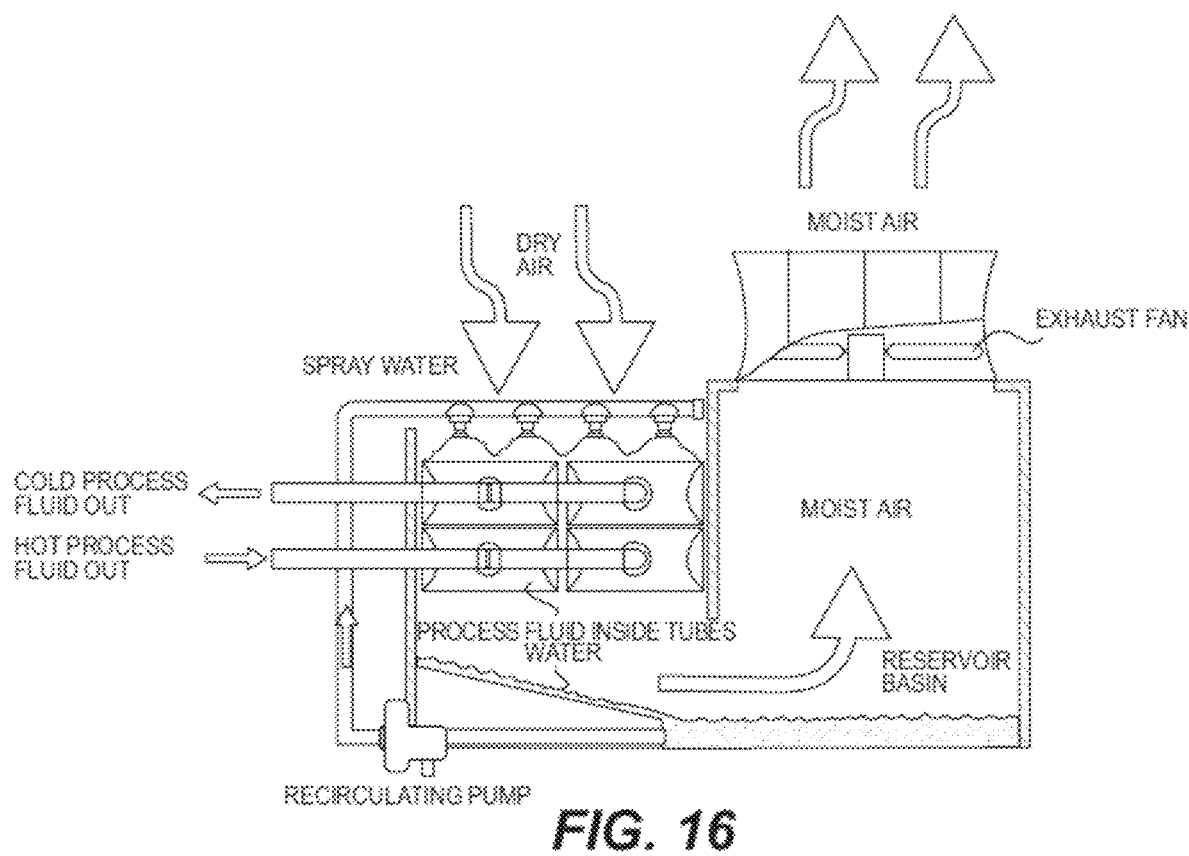
FIG. 16 depicts an illustrative wetted surface air cooler in accordance with one or more example embodiments.

Air-cooled heat exchangers utilize air to provide cooling of a warm process stream (liquids, vapors, one-phase or two-phase streams) that flows through tube bundles. The process fluids or vapors are contained in a closed-loop tube bundles (no exposure to outside air). As seen in FIG. 15, the bundles may be rectangular bundles. The tubes may be parallel to each other and may contain or have attached fins. The tubes may have grooves with a fin in each groove. Fins may be attached by other methods. A fan situated below the bundles may blow air up and between the bundles of tubes. A fan may also be situated above the bundle and draw or induce air up between the bundle of tubes.

Air-cooled heat exchangers may have issues due to maldistribution (of both the process fluid and of the air flow), vibration, fouling, including fouling on fans, vibration of tubes, vibration of fans, freezing or pour point issues, and thermal stresses. There can be thermal stresses, as tubes are often hot at the top of the bundle and cold at the bottom. Temperature on each tube may be different. In the header box, temperature differences can break joints. Insufficient air flow can cause fouling of fins. Fins may become detached or loosen or have mechanical failures. For instance, if fins are made of a metal different than the tubes, there can be differential expansion between the dissimilar materials. In addition, fin heights can make a difference in flow and stresses to the system.

An air-cooled heat exchanger is exposed to the environment. Hence, contaminants in the air may be monitored, such as particulates, pollutants, dust dirt, pollen, corrosive agents, and biologics.

Sensors may be used to measure temperature, pressure, and flow of the process fluids. Infrared camera mounted outside of equipment can continually take temperature measurements along different locations of the bundles and monitor temperature gradients. Temperature sensors (e.g., thermocouples) can be placed on the tubes and on the fins, at the inlet, the outlet, the center and at additional locations along the tubes. Pressure sensors may detect pressure drops between inlet and outlet in the header of each bundle. In an example, pressure sensors can be placed at the inlet and the outlet of each bundle. Pressure drop can indicate fouling or mal distribution. Magnetic sensors or ultrasonic sensors or other means may be used to measure flow.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if problems are occurring. For example, data analysis platform may determine that the deviations may indicate damage if: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold.

For example, data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate problems with the air-cooled heat exchanger. Data that may indicate problems with the air-cooled heat exchanger may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other air-cooled heat exchangers, data analysis platform may run process simulations to determine if problems are occurring or are likely to occur. One or more possible variables may be taken into account in these calculations, including temperature, pressure, flow, composition, properties of components, physical properties of fluids based on composition, fan speed, air flow. Optimal operating conditions and limits of equipment (e.g., from vendor) may be taken into account.

Data analysis platform may further run process simulations to suggest changes to flow compositions and operating parameters to avoid or limit damage. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the exchanger might drop. In another example, if a drought and heat wave are currently happening at the plant, the surface temperature, operating temperature, another temperature, and/or a pressure of the exchanger might increase. The data analysis platform may determine, based on the correlation of the weather conditions to the changes in exchanger data, that the changes in the exchanger are due to weather conditions, and not, e.g., due to another problem.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

Based on the sensor data, process simulations, fingerprint analysis, and/or other data processing, data analysis platform may determine one or more recommended changes to operation of the air-cooled heat exchanger, such as decreasing temperature, pressure, or feed flow, or increasing recycle flow.

In some aspects, if air-cooled heat exchanger problems or one or more conditions that may cause air exchanger problems are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if air-cooled heat exchanger problems are detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the air-cooled heat exchanger problems (e.g., relative temperatures, relative flows, and history of the air-cooled heat exchanger problems). The alert may provide information about one or more determined correlations between air exchanger problems and a particular operating condition or combination of operating conditions. The alert may include one or more recommendations for and/or commands causing adjustments to operating conditions, adjustments to fan speeds, flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate air exchanger problems, prevent equipment (e.g., air exchanger) damage, avoid failure, or the like. For example, if an air exchanger problem rapidly develops, and, based on analyzing the growth rate of the air exchanger problem in view of current operating conditions, data analysis platform determines that the air exchanger problem soon will cross over a particular threshold (e.g., over a cost threshold, over a safety threshold, over a risk threshold, or the like), a command (e.g., a plant shutdown, a process shutdown, an air exchanger shutdown, a backup heat exchanger activation, or the like) may be sent in order to avoid equipment failure, catastrophic failure, air exchanger damage, plant damage, or some other damage.

Inlet air temperature may vary over season or time of day. Therefore, data analysis platform may monitor the air flow from the fan (e.g., based on air-flow sensor data). Data analysis platform may recommend or send to control platform a command to alter a fan speed based on the outside conditions. For example, fan speed and pitch of blades can be modified or diverters may be used. These modifications may be made manually (e.g., based on a recommendation) or automatically (e.g., by control platform).

If data analysis platform determines that fouling is or may be occurring, data analysis platform may recommend or send to control platform a command to wash the air exchanger bundle. Preferably this is done without shutting down the plant. An air-cooled system allows for easy access to the bundles and tubes, and a typical air-cooled heat exchanger will have two or more fans, each fan corresponding to a collection of bundles. This allows one fan to be turned off for bundle cleaning and fan service while the other fan(s) and bundles remain online.

Similarly, if evidence of effluent salts is observed, the data analysis platform may activate or recommend intermittent water wash injection on the process side to either specific bundles or all the bundles.

Similarly, if bundles are operating in parallel, data analysis platform may recommend or send to control platform a command to take one bundle offline and wash the one bundle while the other bundle is operation. If necessary, a bundle may be replaced while offline.

Data analysis platform may recommend or send to control platform a command to, depending on determinations based on the sensor data, increase or decrease the amount of flow placed over the tubes or through the tubes.

(9) Wetted-Surface Air Cooled Exchanger

Aspects of the disclosure are directed to a system that detects and corrects conditions that can affect operation of a wetted-surface air cooled heat exchanger.

Wetted surface air cooled heat exchangers are hybrid coolers that utilize both water and air to provide cooling of a warm process stream (liquids, vapors, or hydrocarbons) that flows through tube bundles. The process fluids or vapors are contained in a closed-loop tube bundles (no exposure to outside air). Open loop water is sprayed over the tube bundles, and air is induced over the tube bundles. In one or more embodiments, the water and air travel downward in an induced draft co-current flow across the tube bundle resulting in the cooling effect. In other embodiments, the air and/or the water may travel in different directions. Heat from the process stream is released to the falling water. Spray water is evenly distributed over the entire tube surface. Heat from the tubes is transferred by vaporization from the falling water to the air stream. Fans discharge air vertically at a high velocity to minimize recirculation and to facilitate evaporation.

Wetted surface air coolers can generally cool to lower temperatures than air alone due to the evaporation of water. Wetted surface air coolers typically use less space than an equivalent air-cooled cooler.

Issues in the tube bundles that may need to be monitored include maldistribution, fouling, leakage, and vibration. Sensors may be used to measure temperature, pressure, and flow of the process fluids.

The deluge of water over the tubes needs to monitored and measured to make sure an even flow. Pumps are used to lift water and these should be monitored for various issues such as vibrations and fouling. The rate of evaporation during the process may be monitored by measuring dry bulb and wet bulb temperatures of the water. Contaminants in the water and air should be monitored such as particulates, pollutants, dust dirt, pollen, corrosive agents, and biologics. The water and/or air may need to be filtered and/or cleaned, and the water blow-down rate and makeup rate may need to be changed. In some embodiments (e.g., cold-weather operating conditions), measures may be implemented to mitigate or prevent freezing and/or icing.

Sensor information may be gathered by one or more sensors and transmitted to data collection platform. Data collection platform may transmit the collected sensor data to data analysis platform, which may be at a plant or remote from a plant (e.g., in the cloud).

Data analysis platform may analyze the received sensor data. Data analysis platform may compare the sensor data to one or more rules to determine if damage is occurring. For example, damage may be indicated if in one or more conditions: the deviations may indicate damage: (1) a large change is determined over a short time frame (e.g., 10% over 3 hours), (2) a smaller change is determine over a long time frame (e.g., 3% over 10 days that increase 0.3% each day), (3) the changes in the system match the fingerprint of prior changes that were detected and the changes resulted in damage to the system, (4) the changes pass a preset threshold. If abnormal conditions are detected, an alarm may be signaled.

For example, data analysis platform may compare current sensor data to past sensor data from the heat exchanger, from other heat exchangers at the same plant, from other heat exchangers at other plants, from a manufacturer, or the like. Data analysis platform may determine if one or more data characteristics of the sensor data match data that may indicate the heat exchanger problem. Data that may indicate the heat exchanger problem may, alone or in a combination, be considered a fingerprint. When current sensor data matches a fingerprint of a particular condition, data analysis platform may determine that the condition is happening or potentially developing in the current system as well. Data may be collected over many years from many different locations, and data analysis platform can match the current data to fingerprints of past data or situations. Thresholds used for particular rules may change or be adjusted over time based on past fingerprints calculation tools.

From the collected data, as well as data collected from other heat exchangers, data analysis platform may run process simulations. Data analysis platform may use one or more possible variables in these calculations, including temperature, pressure, flow, composition, properties of components, physical properties of fluids based on composition. Optimal operating conditions and limits of equipment (e.g., from vendor) may be taken into account.

Data analysis platform may further run process simulations to suggest changes to flow compositions and operating parameters to avoid or limit damage. In some aspects, data analysis platform may communicate with one or more vendors regarding the results of the simulation, and receive recommendations from the vendor on how to change or optimize operation or geometry of the equipment. The results of the process simulation may further be used to determine how quickly a problem occurs, to identify one or more fingerprints for the problem, and/or identify one or more signatures for how the problem occurs. Data analysis platform may use this information to create or expand a searchable database.

In some embodiments, data from the sensors may be correlated with weather data at the plant. For example, if a rainstorm is currently happening at the plant, the surface temperature, operating temperature, another temperature, and/or a pressure of the heat exchanger might drop. In another example, if a drought and heat wave are currently happening at the plant, the surface temperature, operating temperature, another temperature, and/or a pressure of the heat exchanger might increase. The data analysis platform may determine, based on the correlation of the weather conditions to the changes in temperature data, that problems with the heat exchanger are due to weather conditions, and not, e.g., due to another problem, such as a part failure, fouling, or the like.

In some embodiments, data from different types of sensors may be cross-checked to confirm conclusions drawn from that data, to determine data reliability, and the like. For example, temperature readings from skin thermocouples may be compared to temperature readings from a thermal imaging camera, thermal topography may be compared to photographs, or the like.

In some aspects, data analysis platform may use additional data from the heat exchanger or from other equipment connected to the heat exchanger (e.g., in the same plant, in a plant upstream of the plant, etc.) to determine additional information about the heat exchanger operation or problem. For example, if a problem occurs at a consistent rate or increases at a first rate when a first operating condition exists, and the problem occurs at the consistent rate or increases at a second rate when a second operating condition exists, the data analysis platform may determine such a correlation by comparing the heat exchanger sensor data to other data. One or more examples of an operating condition may include, e.g., the plant is operated at a particular efficiency, a particular amount of feed is used, a particular operating temperature of a piece of equipment upstream of the heat exchanger is maintained, a particular amount of catalyst is used, a particular temperature of catalyst is used, weather conditions, and the like. In some aspects, a particular operating condition or combination of operating conditions may be determined to be more likely to cause development of a problem or worsening, stability, or stabilization of the problem.

In some aspects, data analysis platform may determine if the heat exchanger is approaching a known damage or failure condition. Data analysis platform may use historical data from the heat exchanger, data from other heat exchangers at the plant, data from other plants, data from a manufacturer, specification data, or other data to determine how a heat exchanger problem might develop, stabilize, cause failure, or the like.

In some embodiments, data analysis platform may determine one or more failure modes in which to classify a heat exchanger problem. For example, a particular heat exchanger problem may occur in more than one way or due to more than one cause, and therefore might be detectable based on one or more data indicators from one or more different sensor types. Furthermore, different failure modes may be associated with different corrective measures. For example, a first failure mode might be a result of a first problem, might be detectable by a first type of sensor data, and might be correctable by a first action, while a second failure mode might be a result of a second problem, might be detectable by a second type of sensor data, and might be correctable by a second action.

Based on the sensor data, process simulations, fingerprint analysis, and/or other data processing, data analysis platform may determine one or more recommended changes to operation of the heat exchanger, such as decreasing temperature, pressure, or feed flow, or increasing recycle flow. For example, collected data could be used to measure or calculate loss of efficiency due to a problem. Data analysis platform may use simulation results to suggest, for example, adjusting one or more operating conditions to improve performance of the unit.

In some aspects, if a heat exchanger problem or one or more conditions that may cause the heat exchanger problem are detected, an alarm (e.g., a visual and/or audible alarm) may be triggered. The alarm could be an alarm at a plant, an alarm that is sent to one or more devices, an alarm on the heat exchanger, an alarm that shows on a web page or dashboard, or the like.

In some aspects, if a heat exchanger problem is detected, control platform may take one or more actions, which may be triggered, requested, or recommended by data analysis platform. Alternatively or additionally, data analysis platform may trigger an alert to one or more remote devices (e.g., remote device 1, remote device 2). The alert may include information about the heat exchanger problem (e.g., temperatures, pressures, flows, history of the heat exchanger problem). The alert may provide information about one or more determined correlations between the heat exchanger problem and a particular operating condition or combination of operating conditions. The alert may include one or more recommendations for and/or commands causing adjustments to operating conditions, adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate the heat exchanger problem, prevent equipment (e.g., heat exchanger) damage, avoid failure, or the like. For example, if the heat exchanger problem rapidly develops, and, based on analyzing the growth rate of the heat exchanger problem in view of current operating conditions, data analysis platform determines that the heat exchanger problem soon will cross over a particular threshold (e.g., over a cost threshold, over a safety threshold, over a risk threshold, or the like), data analysis platform may send a command (e.g., a plant shutdown, a process shutdown, a heat exchanger shutdown, a backup heat exchanger activation, or the like) in order to avoid equipment failure, catastrophic failure, heat exchanger damage, plant damage, or some other damage.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. One or more non-transitory computer-readable media storing executable instructions that, when executed, cause a system to:
   receive first sensor data comprising first flow data measured by a first flow sensor associated with a first passage along a flow length associated with a heat exchanger, the first flow data associated with the first passage along the flow length associated with the heat exchanger;
   receive second sensor data comprising second flow data measured by a second flow sensor associated with a second passage along the flow length associated with the heat exchanger, the second flow data associated with the second passage along the flow length associated with the heat exchanger;
   analyze the first and second sensor data to determine whether a difference between the first flow data associated with the first passage and the second flow data associated with the second passage is greater than a threshold;
   based on determining that the difference between the first flow data associated with the first passage and the second flow data associated with the second passage is greater than the threshold, determine that there is a maldistribution in the heat exchanger;
   based on the determination that there is a maldistribution in the heat exchanger, determine a recommended adjustment to an operating condition of the heat exchanger; and
   send a command configured to cause the recommended adjustment to the operating condition of the heat exchanger.

2. The one or more non-transitory computer-readable media of claim 1, storing executable instructions that, when executed, cause the system to:
   compare the first and second sensor data comprising the first flow data associated with the first passage and second flow data associated with the second passage to past first and second sensor data associated with the first and second passages to determine if there is a deviation between the first and second sensor data and the past first and second sensor data greater than a threshold deviation.

3. The one or more non-transitory computer-readable media of claim 1, storing executable instructions that, when executed, cause the system to:

compare the first and second sensor data comprising the first flow data associated with the first passage and second flow data associated with the second passage to different sensor data associated with a different heat exchanger of a same type as the heat exchanger to determine if there is a deviation between the first and second sensor data and the different sensor data greater than a threshold deviation.

4. The one or more non-transitory computer-readable media of claim 1, storing executable instructions that, when executed, cause the system to:
correlate the first and second sensor data comprising the first flow data associated with the first passage and second flow data associated with the second passage with weather data corresponding to weather at a geographic location of the heat exchanger and a time that the sensor data was collected; and
determine, based on correlating the first and second sensor data with the weather data, whether the weather at the geographic location of the heat exchanger caused a deviation in an operation of the heat exchanger.

5. The one or more non-transitory computer-readable media of claim 1, storing executable instructions that, when executed, cause the system to:
based on the operating condition of the heat exchanger, trigger an alarm.

6. The one or more non-transitory computer-readable media of claim 1, storing executable instructions that, when executed, cause the system to:
cause display of the recommended adjustment to the operating condition of the heat exchanger on a graphical user interface of a computing device.

7. A method comprising:
receiving, by a data analysis computing device, first sensor data comprising first flow data measured by a first flow sensor associated with a first passage along a flow length associated with a heat exchanger, the first flow data associated with the first passage along the flow length associated with the heat exchanger;
receiving, by the data analysis computing device, second sensor data comprising second flow data measured by a second flow sensor associated with a second passage along the flow length associated with the heat exchanger, the second flow data associated with the second passage along the flow length associated with the heat exchanger;
analyzing, by the data analysis computing device, the first and second sensor data to determine whether a difference between the first flow data associated with the first passage and the second flow data associated with the second passage is greater than a threshold;

based on determining that the difference between the first flow data associated with the first passage and the second flow data associated with the second passage is greater than the threshold, determining, by the data analysis computing device, that there is a maldistribution in the heat exchanger;
based on the determination that there is a maldistribution in the heat exchanger, determining, by the data analysis computing device, a recommended adjustment to an operating condition of the heat exchanger; and
sending, by the data analysis computing device, a command configured to cause the recommended adjustment to the operating condition of the heat exchanger.

8. The method of claim 7, comprising:
comparing, by the data analysis computing device, the first and second sensor data comprising the first flow data associated with the first passage and the second flow data associated with the second passage to past first and second sensor data associated with the first and second passages to determine if there is a deviation between the first and second sensor data and the past sensor data greater than a threshold deviation.

9. The method of claim 7, comprising:
comparing, by the data analysis computing device, the first and second sensor data comprising the first flow data associated with the first passage and the second flow data associated with the second passage to different sensor data associated with a different heat exchanger of a same type as the heat exchanger to determine if there is a deviation between the first and second sensor data and the different sensor data greater than a threshold deviation.

10. The method of claim 7, comprising:
correlating, by the data analysis computing device, the first and second sensor data comprising the first flow data associated with the first passage and the second flow data associated with the second passage with weather data corresponding to weather at a geographic location of the heat exchanger and a time that the sensor data was collected; and
determining, by the data analysis computing device and based on correlating the first and second sensor data with the weather data, whether the weather at the geographic location of the heat exchanger caused a deviation in an operation of the heat exchanger.

11. The method of claim 7, comprising:
causing, by the data analysis computing device, display of the recommended adjustment to the operating condition of the heat exchanger on a graphical user interface of a computing device.

* * * * *